United States Patent
Rhoads et al.

(10) Patent No.: US 12,254,611 B2
(45) Date of Patent: Mar. 18, 2025

(54) INFORMATION-CLIENT SERVER BUILT ON A RAPID MATERIAL IDENTIFICATION PLATFORM

(71) Applicant: Digimarc Corporation, Beaverton, OR (US)

(72) Inventors: Geoffrey B. Rhoads, West Linn, OR (US); Tony F. Rodriguez, Portland, OR (US); David A. Cushman, McMinnville, OR (US); William Y. Conwell, Portland, OR (US)

(73) Assignee: Digimarc Corporation, Beaverton, OR (US)

( * ) Notice: Subject to any disclaimer, the term of this patent is extended or adjusted under 35 U.S.C. 154(b) by 0 days.

(21) Appl. No.: 18/473,901

(22) Filed: Sep. 25, 2023

(65) Prior Publication Data
US 2024/0233109 A1    Jul. 11, 2024

Related U.S. Application Data

(63) Continuation of application No. 16/944,136, filed on Jul. 30, 2020, now Pat. No. 11,769,241.

(60) Provisional application No. 62/956,845, filed on Jan. 3, 2020, provisional application No. 62/909,706, filed on Oct. 2, 2019, provisional application No. 62/880,507, filed on Jul. 30, 2019.

(51) Int. Cl.
G06T 7/00 (2017.01)
G06V 10/25 (2022.01)

(52) U.S. Cl.
CPC ............ *G06T 7/0004* (2013.01); *G06V 10/25* (2022.01); *G06T 2207/20004* (2013.01)

(58) Field of Classification Search
None
See application file for complete search history.

(56) References Cited

U.S. PATENT DOCUMENTS

| | | | | |
|---|---|---|---|---|
| 5,134,291 A | * | 7/1992 | Ruhl, Jr. | B07C 5/342 250/341.8 |
| 6,914,678 B1 | * | 7/2005 | Ulrichsen | G01N 21/474 356/429 |
| 7,130,465 B2 | * | 10/2006 | Muenzenmayer | G06V 10/56 382/172 |
| 7,449,655 B2 | * | 11/2008 | Cowling | B07C 5/3425 209/579 |

(Continued)

*Primary Examiner* — Anand P Bhatnagar
(74) *Attorney, Agent, or Firm* — Digimarc Corporation

(57) ABSTRACT

Items are identified in a waste stream for purposes of recycling, using deterministic and/or probabilistic techniques. Imagery of the waste stream from multiple viewpoints permit creation of a 3D depth draped image representation, from which one or more 2D planes can be synthesized. Phase-coherent patches of recoverable encoded data can be identified from among soiled and crumpled object surfaces, and used in combination to recover object identification information. Recognition of certain items can trigger further image processing that is specific to such items. (Detection of a catsup bottle, for example, can trigger image analysis to discern the presence of catsup residue.) Information about recognized objects can be provided to external data customers, e.g., to track grey market diversion of particular products into unlicensed territories. These and other features and advantages, which can be used alone or in combination, are detailed herein.

28 Claims, 22 Drawing Sheets

(56) References Cited

U.S. PATENT DOCUMENTS

| | | | |
|---|---|---|---|
| 8,706,456 B2* | 4/2014 | Mather | B01J 19/002 |
| | | | 703/6 |
| 9,372,180 B2* | 6/2016 | Kolb | G01N 21/9027 |
| 9,424,635 B2* | 8/2016 | Killmann | B07C 5/3416 |
| 9,734,569 B2* | 8/2017 | Beach | B07C 5/3412 |
| 2005/0080520 A1* | 4/2005 | Kline | B65F 1/0006 |
| | | | 701/1 |
| 2014/0132756 A1* | 5/2014 | Ma | G09G 3/3466 |
| | | | 345/589 |
| 2016/0091614 A1* | 3/2016 | Akers | G01T 7/00 |
| | | | 250/261 |
| 2017/0011362 A1* | 1/2017 | Whitman | B65F 9/00 |

* cited by examiner

The (8)(5) STCM

FIGURE 4: ScreenShot of example Object-ID-event streams

Figure 5 – The 6 Main Categories of Information-Clients

Figure 8: Candidate Universal Recyclate Hexagonal Signature for a HyperSep system; the pattern itself might be call HyperComb
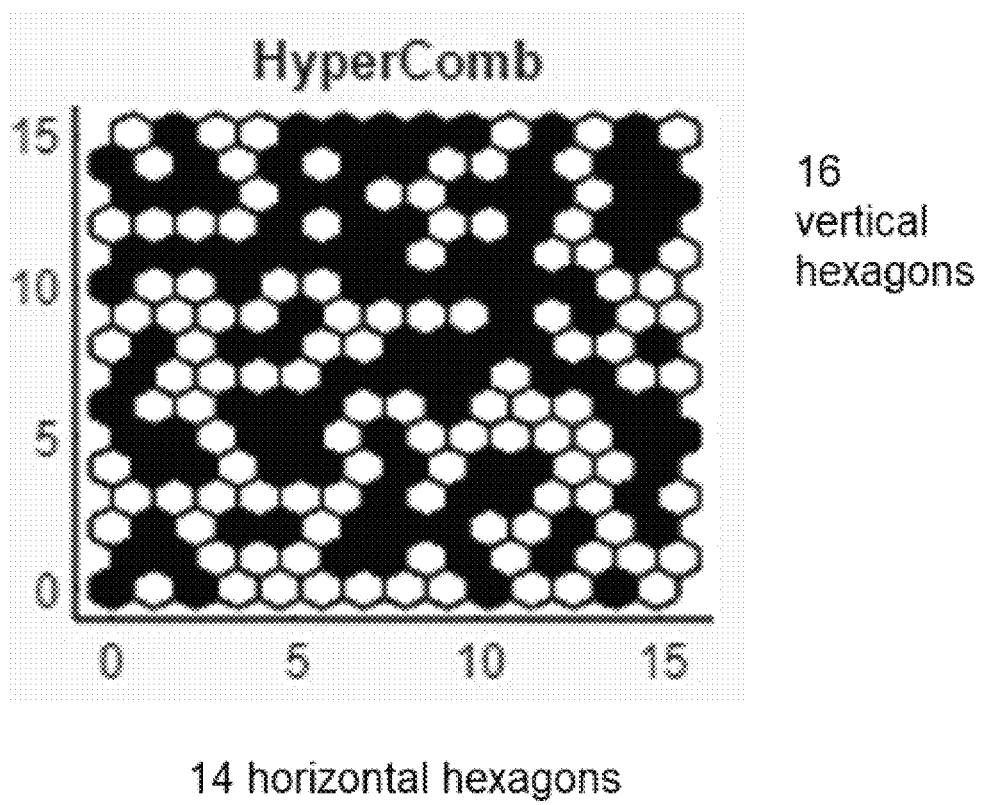

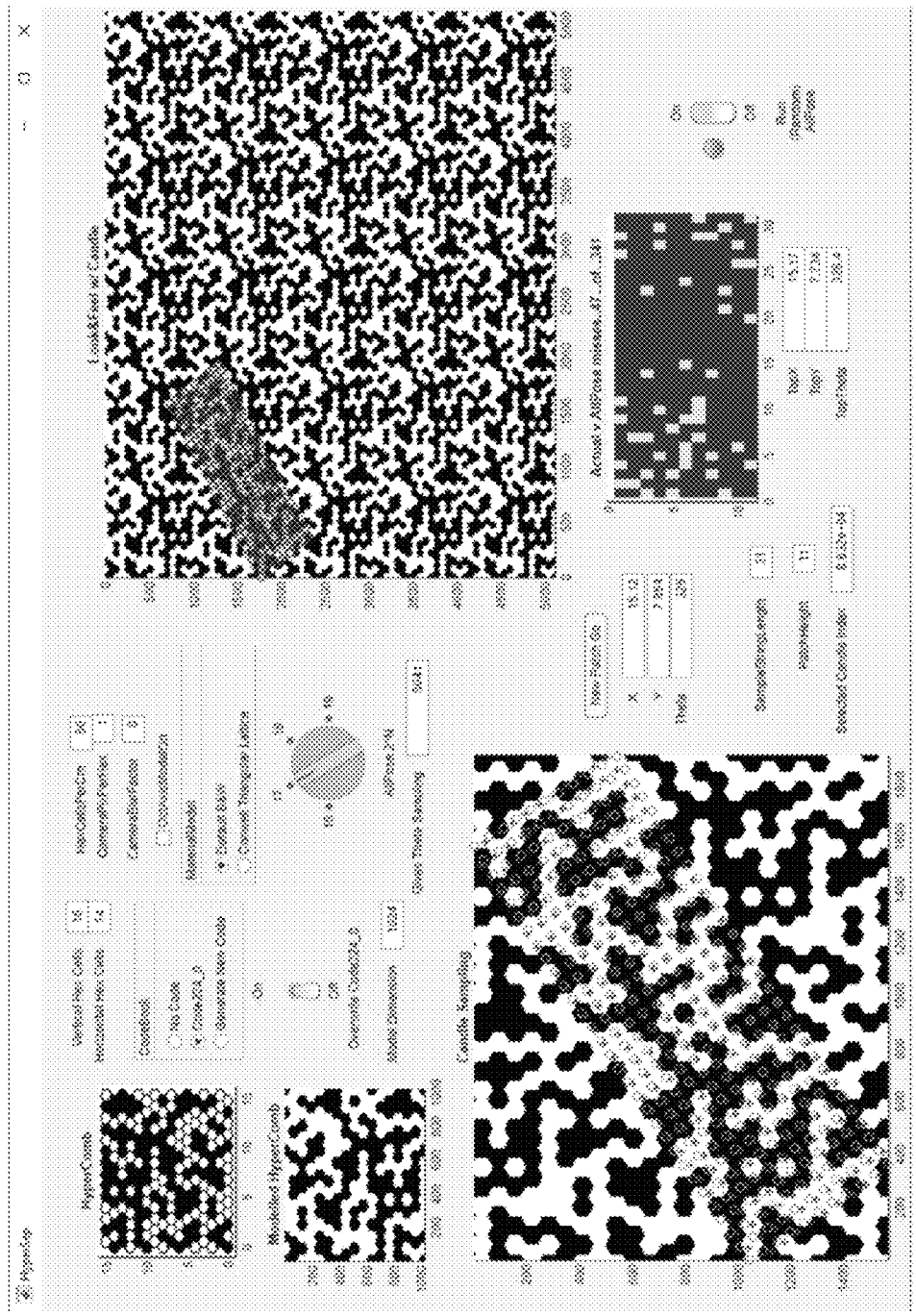
Figure 9 - Screen Shot of the Interactive R&D program used to study the interaction of Coiled-AllPose Decoding Approaches, here showing the nominal 31 by 11 primitive ribbon parametric choice

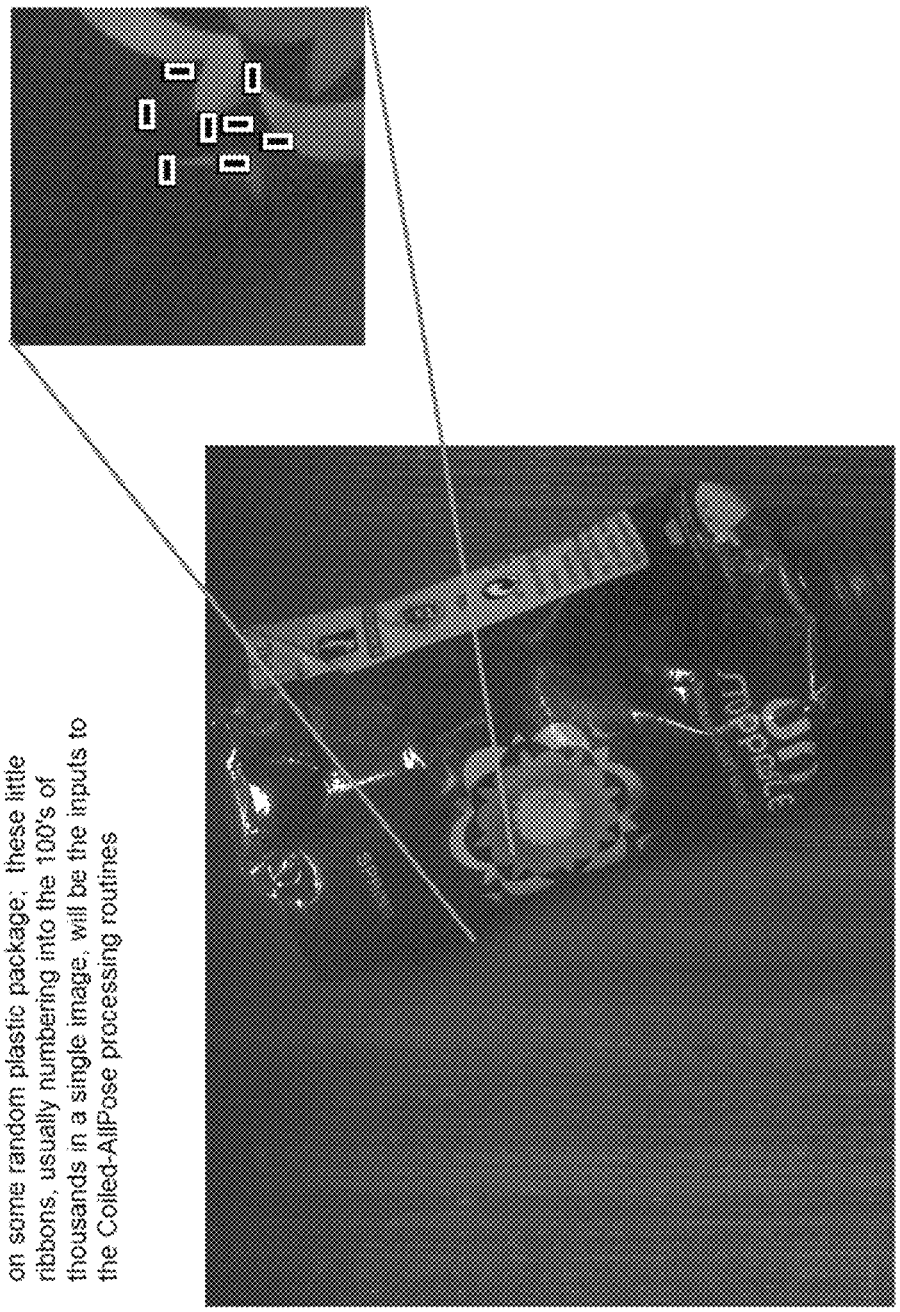

Figure 10

A very small random set of 31x11 Coiled-AllPose sample ribbons are displayed on top of a zoom-in on some random plastic package; these little ribbons, usually numbering into the 100's of thousands in a single image, will be the inputs to the Coiled-AllPose processing routines The ribbons are typically even smaller than are here depicted and they include 4 states of orientation, also including NE-SW and NW-SE Figure 12 – Coiled AllPose Clumping of the top 50 ribbon correlate values, out of the full set of 128K correlation possibilities Figure 13: Compression of 'scale' when the surface normal of the Hex Tile is parallel to the long axis of the 31x11 Ribbon Sampling Figure 14 One of many different current views of developing an inventory method, with standardization, of at least plastic types and families

INFORMATION-CLIENT SERVER BUILT ON A RAPID MATERIAL IDENTIFICATION PLATFORM

RELATED APPLICATION DATA

This application is a continuation of U.S. patent application Ser. No. 16/944,136, filed Jul. 30, 2020 (U.S. Pat. No. 11,769,241), which claims priority benefit to US Provisional Application Nos. 62/956,845, filed Jan. 3, 2020, 62/909,706, filed Oct. 2, 2019, and 62/880,507, filed Jul. 30, 2019. These previous patent documents are incorporated herein by reference.

TECHNICAL FIELD

The present technology concerns, e.g., small-surface-area object identification, with particular focus on the role of such object-identification in recycling.

In part, the present technology synthesizes applicant's earlier technologies into a sum greater than the parts. These earlier technologies include work on recycling (e.g., patent applications 62/968,106, filed Jan. 30, 2020 and PCT/US20/22801, filed Mar. 13, 2020), plastic shaping (e.g., pending patent applications 63/040,487, filed Jun. 17, 2020, and 63/038,735, filed Jun. 12, 2020), on pose determination (e.g., published patent applications 20190266749 and 20180005343, sometimes termed "Coiled AllPose"), on spectrally-based item identification (e.g., published application 20140293091, sometimes termed "Spectra ID"), on neural network-based item identification (e.g., U.S. Pat. No. 10,664,722—sometimes referenced as AI methods), on other forms of item recognition (e.g., U.S. Pat. Nos. 8,565,815, 9,129,277, 9,269,022, 9,414,780 and 9,858,681, which in places are said to concern "Thingerprinting" and freckle transforms), and on digital watermarking technology (e.g., publications 20170024840, 20190171856 and 20190332840, and patents including U.S. Pat. Nos. 6,590,996, 7,027,614, 7,738,673, 9,245,308, 9,959,587 and 10,242,434, sometimes collectively termed "watermarking" or "Digimarc Barcode"). These cited documents are incorporated herein by reference.

INTRODUCTION

The world is quite literally swimming in plastic waste, and we have an opportunity to help stop it.

However, many experts agree that existing approaches to recycling and managing waste will not enable the significant improvements needed to dramatically curtail global pollution and the expansion of landfills everywhere. The United States recycling rate by weight is reportedly less than 10%.

One aspect of the present technology is a new platform-based system aimed at solving this problem. It combines the best of what is available today with far more explicit approaches to directly identifying materials such as plastic. An aim is to recover a higher proportion of recyclables than has previously been practical, and to produce recyclate of a purity that is higher than is now generally achievable, due to the accuracy with which even soiled and crumped source items are identified.

Existing materials recovery facilities (MRFs) have several shortcomings. For one, careful presorting is generally required, and that's simply not scalable as more waste is generated, nor is it economically feasible as labor costs increase and the market value of materials decline. It also creates significant barriers to consumer participation, to the extent that the pre-sorting problem extends back into the home and into businesses.

Another issue is that current waste sorting systems are probabilistic, e.g., relying on near infrared, hyperspectral and other optical characteristics that are correlated with certain types of materials, but are not deterministic in their identification. Moreover, only limited classes of plastics can be identified with the prior art probabilistic techniques. Many others go unidentified and are burned as refuse.

Much technical work, and even ISO standardization, has been directed to the problem of separating plastics for recycling. However, such efforts have been hampered by lack of an effective, automated, rapid way to identify source materials with a fine level of granularity and a high level of accuracy. The prior art has also suffered by inability to determine whether plastics were previously used as food containers or not, limiting the purposes for which the resulting plastic can be used—and the prices such recyclate garners.

Some attempts have been made to read visible codes on packaging and other mixed media in waste flows. But the reality of most recycling centers is that the waste is dirty, bunched together and crumpled. Numbers and codes that are intended to communicate what types of plastics are contained in packaging are often soiled by smeared food, grease or other contaminants, making them difficult to detect for even the most powerful cameras and sensors.

The recycling industry, including consumer brand manufacturers, needs a better way to quickly identify various types of recyclable waste to help divert as much recyclable material as possible from landfills and the world's waterways. This disclosure, in part, clarifies and extends so-called deterministic forms of identification, and also details cooperation of such technologies with probabilistic forms of item identification.

The urgency for solutions is heightening year after year. Governments and regulators are exploring the introduction of several new fines and requirements that may have a dampening effect on profits for large-scale plastic producers and consumer brands, especially in the food and beverage and cosmetic and personal care sectors.

Aspects of the present technology help address the foregoing and other issues, while providing other features and advantages as well.

Certain embodiments of the present technology help tip recycling into a profitable enterprise by identifying materials at ever-smaller scales, with ever-finer granular listings of identities, from evermore filthier and cluttered streams of waste. With reliable waste supplies provided by urban area materials recovery facilities, aspects of the present technology can enable recycled materials to out-compete virgin (linear) materials supply. The circular economy will emerge as a corollary of classic economic behavior, instead of as a consequence of some form of directed social engineering. Profits will drive growth. Entrepreneurs will slowly replace scolding publics and public officials as the motivators and movers to next levels of recyclate supply. MRFs may someday pay normal citizens for their garbage. Dare to dream.

The foregoing and other features and advantages of the present technology will be more readily apparent from the following detailed description, which proceeds with reference to the accompanying drawings.

BRIEF DESCRIPTION OF THE DRAWINGS

FIG. 8 depicts an illustrative data marking pattern that may be tiled across an item surface.

FIG. 9 depicts an illustrative user interface that incorporates aspects of the present technology.

FIG. 10 illustrates ribbons of encoded signal that can be recovered from imagery of a crumpled plastic item.

DETAILED DESCRIPTION

Figure 1:
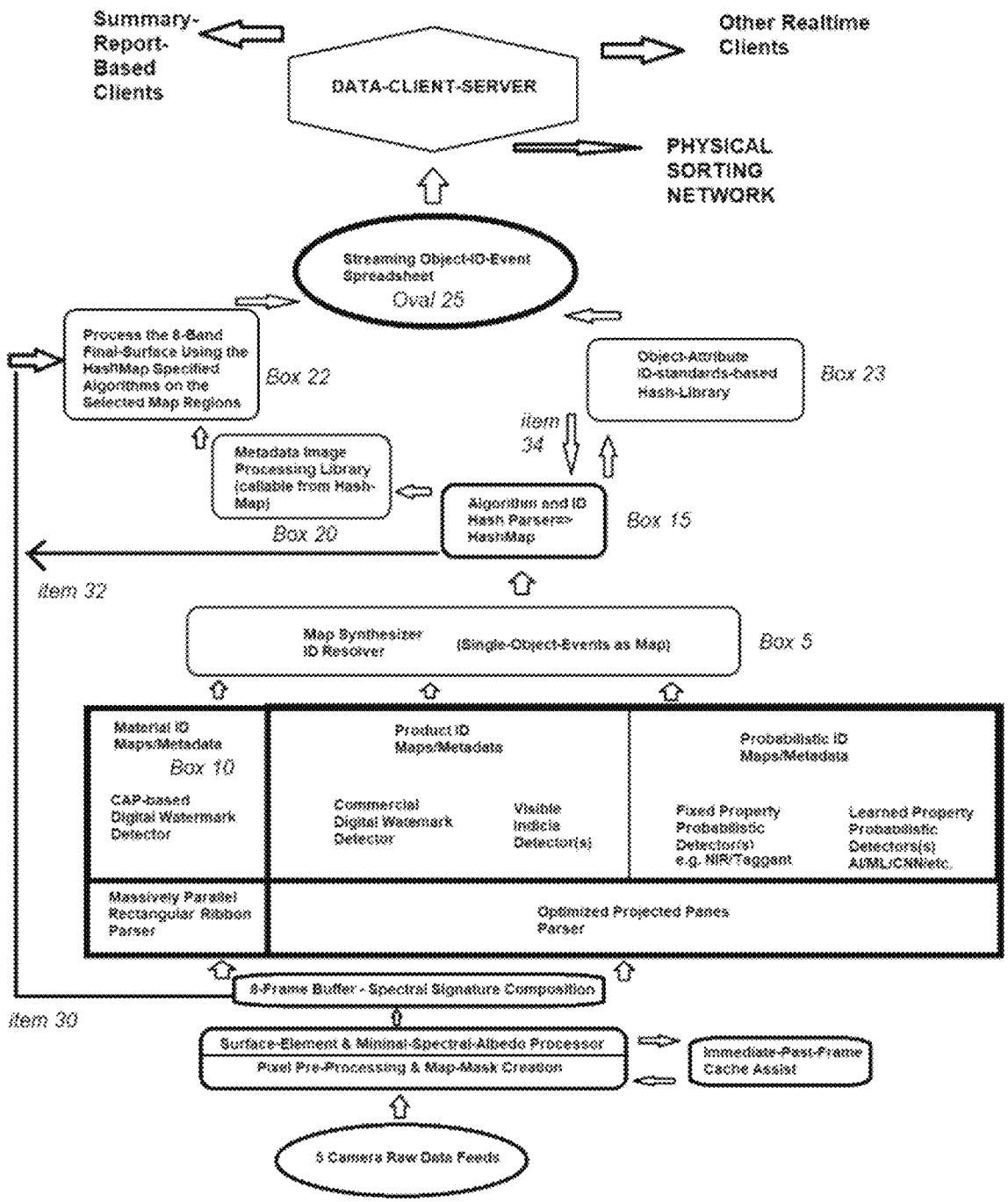
FIG. 1 provides an overview of aspects of the present technology.
Figure 1A:
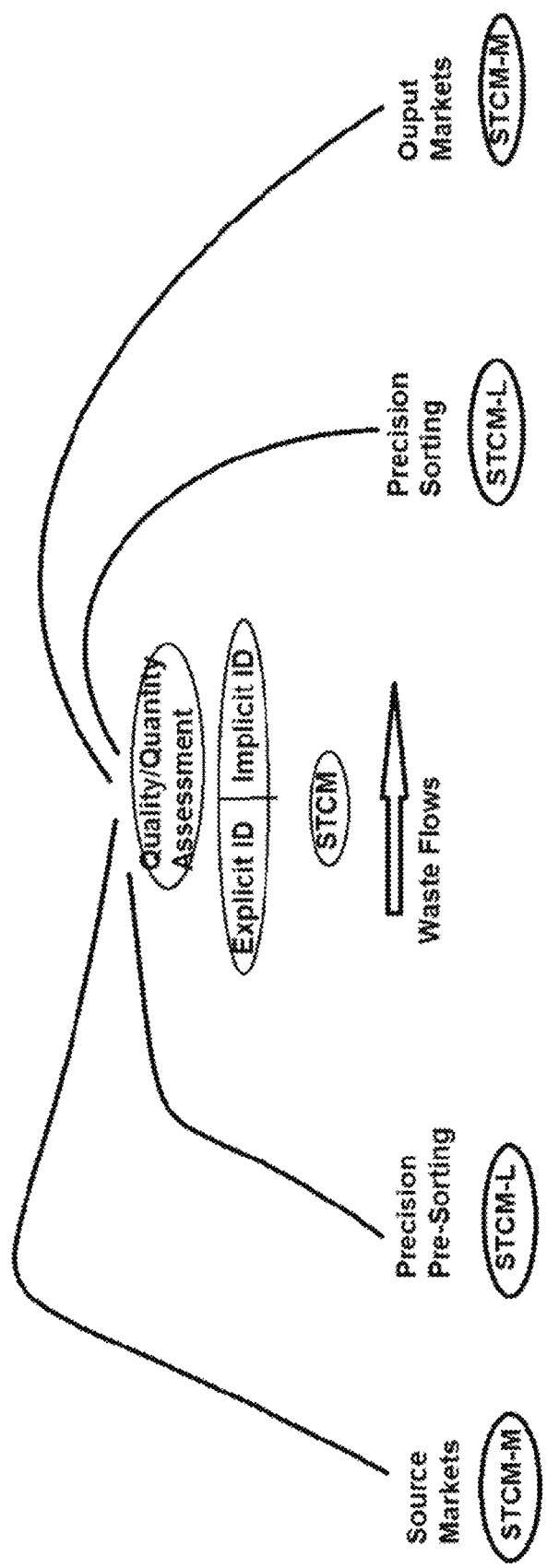
FIG. 1A illustrates certain stages in which aspects of the present technology play a role.

FIG. 1 is a depiction of a sample embodiment incorporating aspects of the present technology, which applicant sometimes terms a Rapid Material Identification Platform, or RMIP. FIG. 1A illustrates where sorting capabilities (e.g., a SpectraTopo Camera Module, or STCM, as detailed below) fit into the raw materials-flow points within materials marketplaces.

Figure 2:
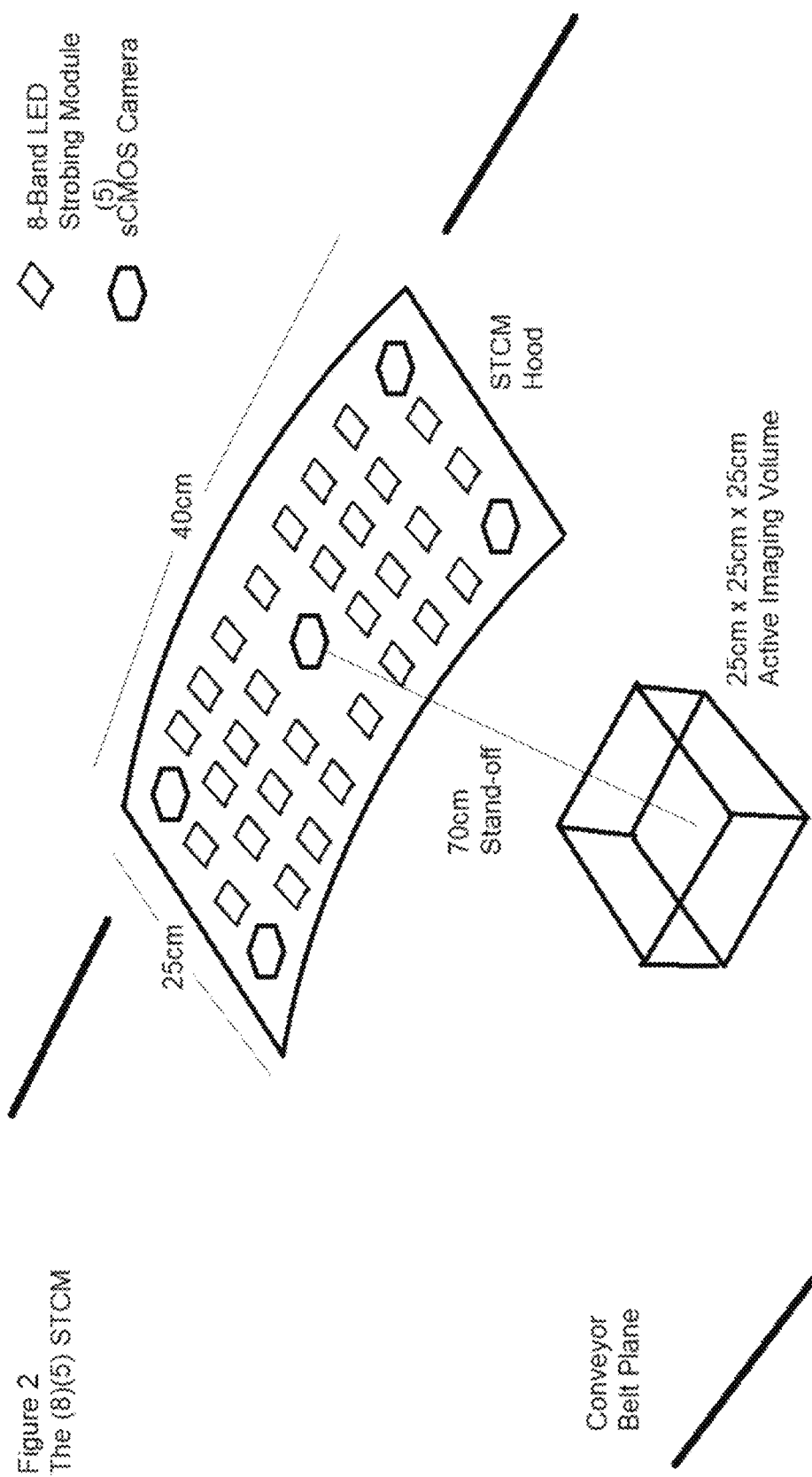
FIG. 2 illustrates details of an illustrative SpectraTopo Camera Module (STCM).
Figure 3:
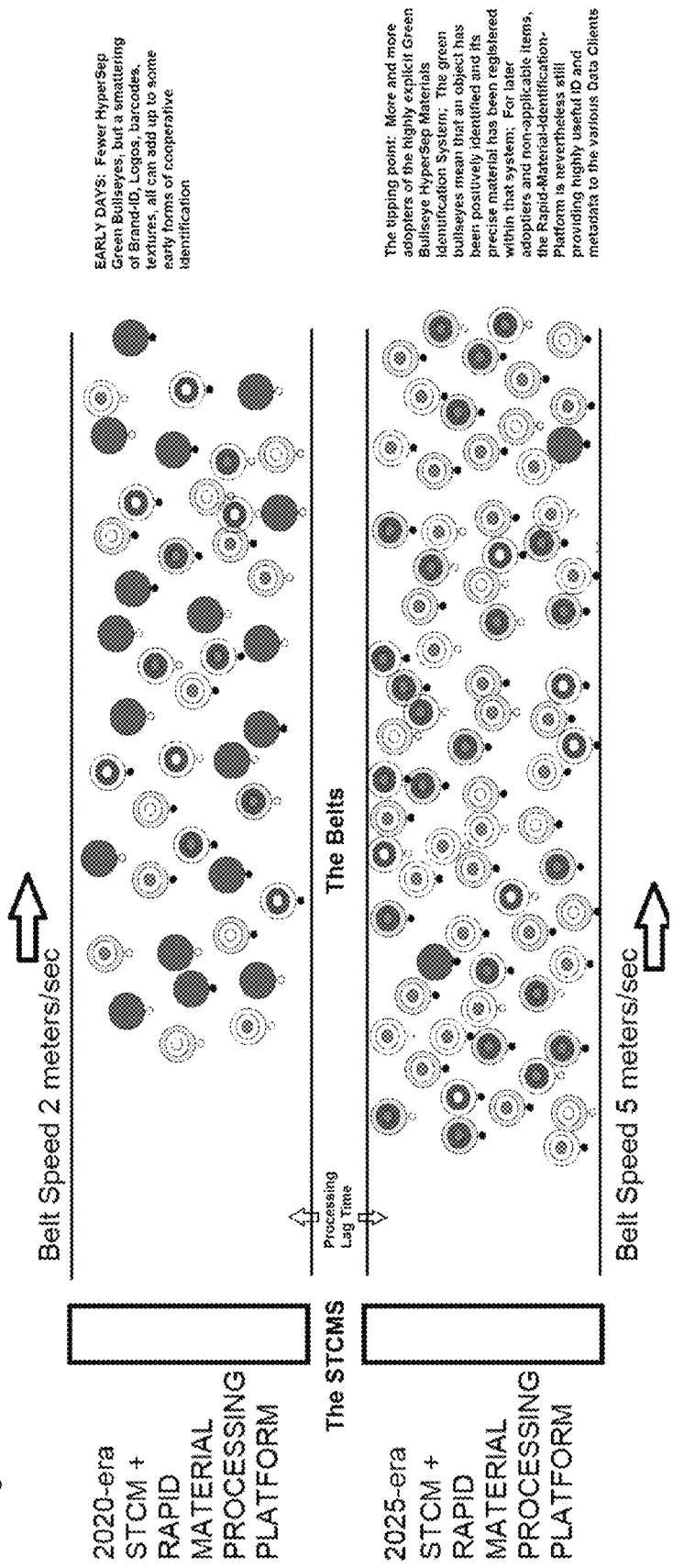
FIG. 3 illustrates short-term and longer-term identification of objects by different technologies in an illustrative waste stream.
Figure 4:
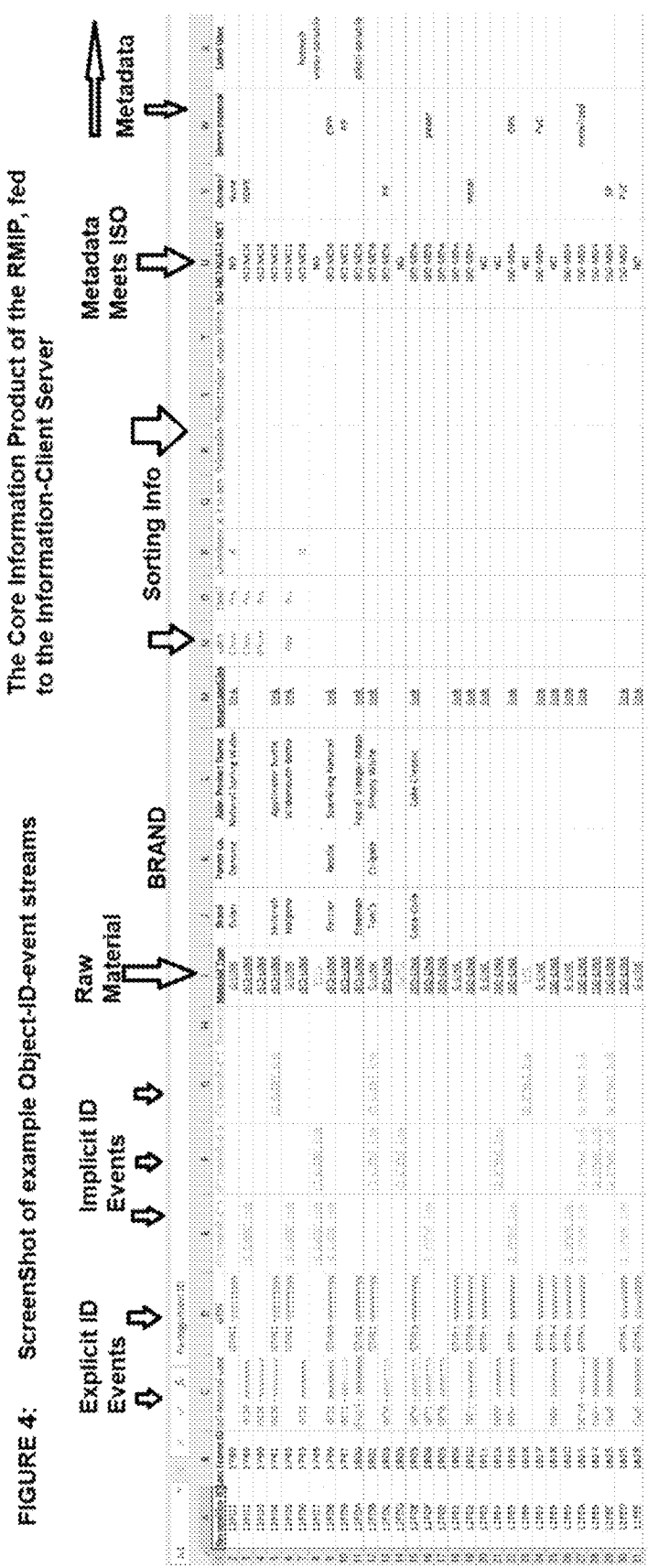
FIG. 4 is an illustrative form of report generated by a materials recovery facility, detailing items of waste that have been encountered.

FIG. 2 shows an illustrative SpectraTop Camera Module, installed above a conveyor belt. Based on data collected by such a module, different forms of data processing identify multiple objects of waste passing by on the belt, as shown in FIG. 3. A result of this processing is a wealth of information, parts of which are shown in FIG. 4. Applicant believes this granular information about a community's waste can have considerable commercial value.

We will return to FIG. 3 repeatedly. It shows items identified on a conveyor belt. Two conveyor belts are shown—the upper belt shows things as they may be identified in the short term future, and the lower belt shows things as they may be identified several years from now. The all-red markings denote unidentified objects (which become scarcer as time passes). Each identified object is indicated by a bullseye, which may or may not have a green center, a blue intermediate ring, and/or a yellow outer ring. These three indicia signal the type or degree of object identification. Most desirable is a green center. Below each bullseye is a dependent dot, which indicates the quality of metadata associated with the identification. A key of these symbols appears in FIG. 6.

FIG. 4 shows a resulting real-time stream of unique object-ID-events, where each object-ID-event generates and collects as much information as possible on the object being scanned. The very act of separating "an object" from residual materials (think, for example, a splayed half-eaten sandwich), is important to this discretization of the object-ID-event stream. This is called image segmentation in the image processing industry. FIG. 4 shows an example of what this data stream of object events can look like in a spreadsheet perspective, although this form of data representation is not essential.

The FIG. 4 spreadsheet can include many more columns of data than shown. One column that is usually included stores position data for the referenced item, e.g., x- and y-coordinates in a particular frame of reference. With use of depth sensing cameras, and/or stereoscopic processing of 2D camera data, such position data can include x-, y- and z-information. (The frame of reference may be coordinates on the conveyor belt. The belt may be marked, once, or at intervals, with a synchronization mark, to which the frame of reference can be established, e.g., 37.5 inches after a red stripe across the belt, and 1.8 inches from the right edge of the belt.)

If one imagines that the spreadsheet of FIG. 4 now becomes placed into real-time, one will witness a new object-ID-event line showing up for each and every object flowing by an optical sensing system, and this information flow is an information product of this technology. This list for a 25 cm swath of belt, which can be laterally-replicated to an arbitrary width via modular addition of units, will desirably be generating a great many lines per second, perhaps even many dozens or more per second in a not so distant future, running at say 5 meters per second on a conveyor belt.

In the current art, the primary and often sole "client" for real-time object identification data is the MRF's physical sorting system, which often takes the form of air-jets or other physical separating equipment designed to eject identified objects from the waste stream to a desired alternate destination. To use the term "information client" for such current usage is a bit of a stretch . . . there usually is simply a data pipe going from the optical sorter to the physical sorting system at least for the real-time data. The operation performed, as dictated by the data flow, becomes a physical sort command. Such information has not previously been regarded from a network perspective with multiple clients all wishing to get access to the real-time data.

Figure 5:
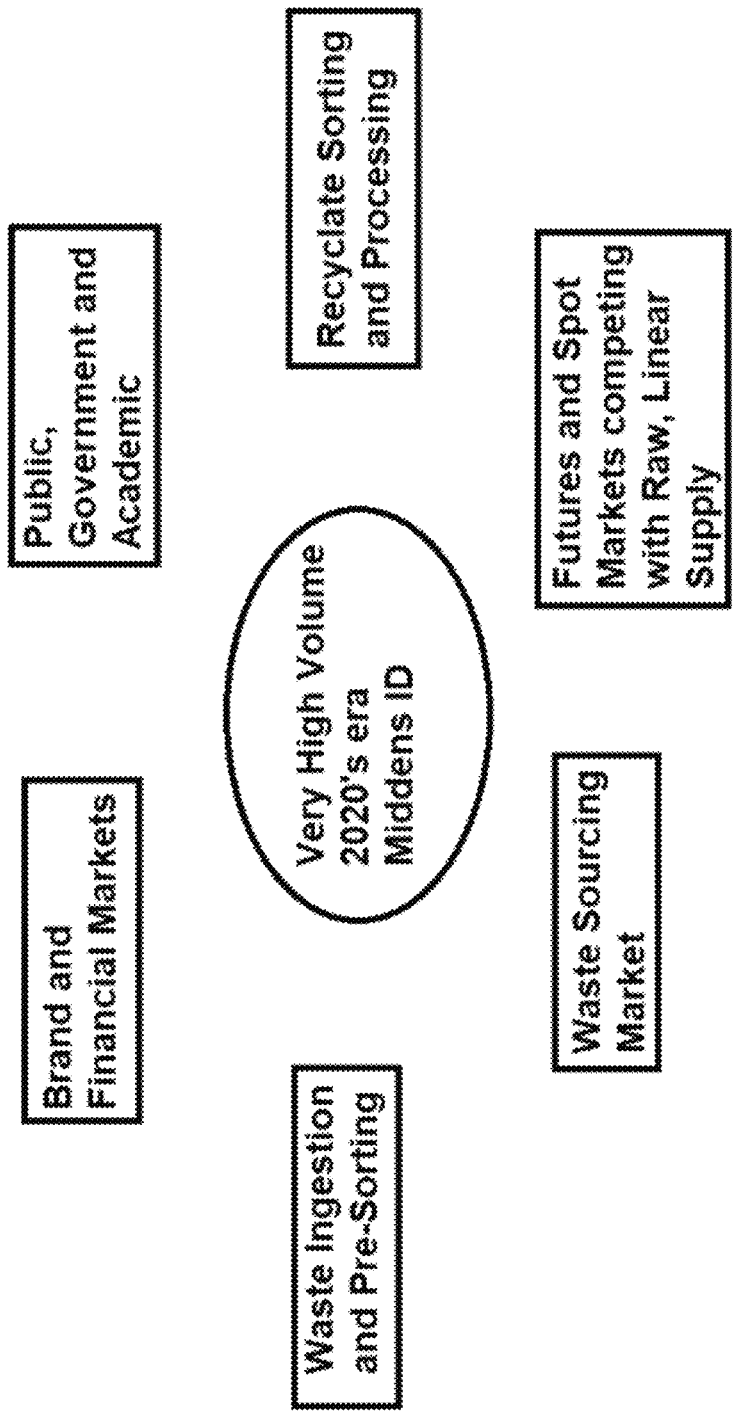
FIG. 5 introduces players in the information economy that can employ information derived from waste sorting.

In contrast, the present technology anticipates an ecosystem in which there are many clients for this real-time information, well beyond the post-ID sorting system, assuming richer, more accurate, smaller and more useful identification information is gleaned from more and more objects. A step function in object identification and qualification can beget a step function in a true networked client-group. FIG. 5 depicts an illustrative categorization of this large expansion of probable information clients, where each client in the diagram is capable of much more granular breakdowns, including the classic "sorting machine" of today.

Figure 7:
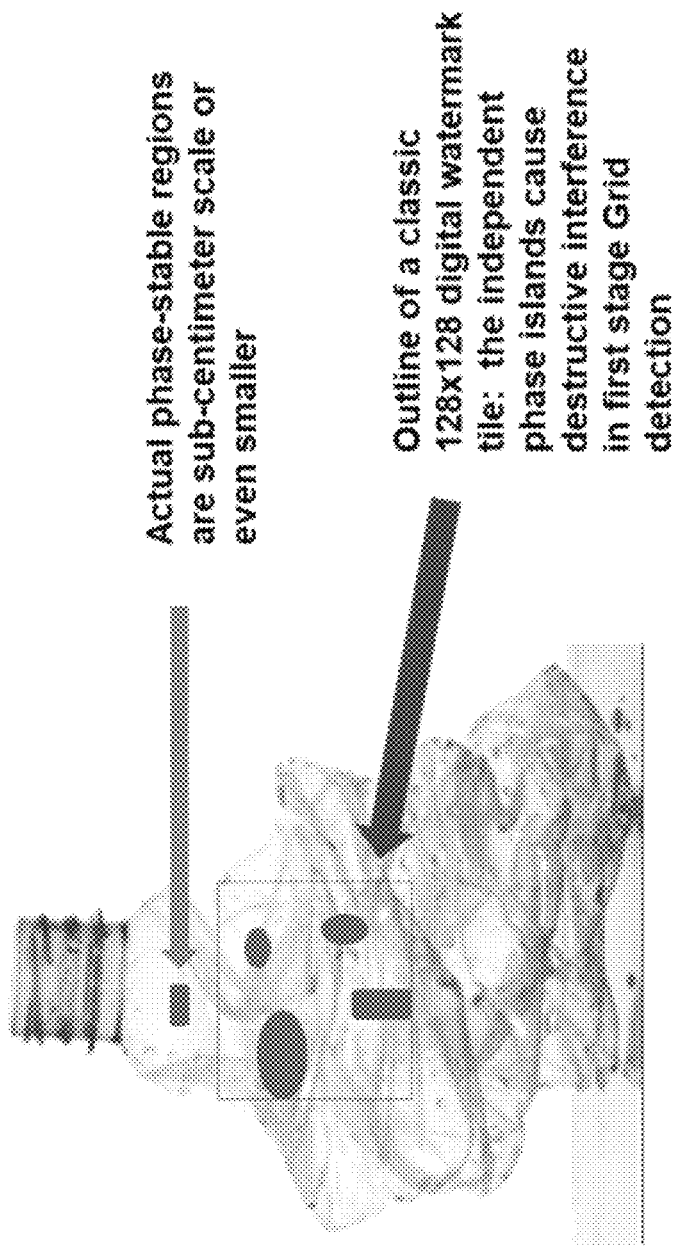
FIG. 7 illustrates multiple millimeter-scale regions from which encoded information may be read from a crumpled plastic bottle.

The first two words in the title of this disclosure, information-client, are explained in this section, in conjunction with FIG. 5, with more details to follow. FIG. 4 is the source of information to these clients. It is the gold in the garbage flows. The green-bullseye graphic indicates an object identified with the most informative information. This is a key aim of the STCM+RMIP preferred embodiment—making sure that the physical sorting system keeps evolving toward higher quality and quantity recyclate supply. But the RMIP adds additional layers of explicit identification, with the first, outer ring of a bullseye indicating that an object has been identified by globally adopted standard digital identification of the GTIN (Global Trade Item Number) encoded on the object. As the FIG. 4 graphic shows, not every object may not get its GTIN decoded, nor will every object get a green bullseye (signifying an ISO-compliant identification of the precise material it contains), but perhaps starting around 2025, such explicit forms of accurate object ID will reach a 90-something percent level of redundant identification of objects. The following discussion of FIG. 7 etc. delves into the "qualification" aspects of identification as well, depicted in FIG. 3 as the filled or empty circle below the main targets, indicating that some object has met ISO specifications on "qualification metadata" or not. FIG. 4 shows this explicitly as a column, then with the suggestive horizontal point off the page, noting that these potential metadata fields go on and on and on, but they will need to be corralled into sequences of evolving ISO standards, alluded to by the 1's 2's 3's and 4's in the figure. Yes, we are identifying objects, but we are also attempting to meet ISO standards of measurement on the size, purity, surface dirt level, crumple state, "sleeve issues," glues, etc. on each and every object. It's great to know what it is, but measure and store the attributes of the object itself too.

We next turn to the engine that feeds the server—the waste identification data.

Defining and Specifying an Information-Client-Category Server Based on Object-ID-Event-with-Metadata Flows For the server part of the client-server architecture there is a mature technical infrastructure that takes events, packages them with express metadata (and often with links to networked sources of more metadata) and delivers same to a set of real-time consuming information clients. Networked financial trading systems are a model.

An illustrative embodiment of the present technology builds on such existing infrastructure. Better put: taps into it. There are various companies that specialize in the database aspects of asynchronous event logging, including sophisticated immediate attachment of metadata and links to discrete events; their offerings can be used. Such offerings can be used in the server aspects of the detailed systems.

The STCM unit of FIG. 2 (or some contemporary less-well-endowed optical system) is the source of the data from which object events are continuously discerned and reported. FIG. 3 makes it graphically clear that there is a three-tiered level of object identity being implemented, often with an object attribute flag (the small dependent dot) indicating associated metadata. FIG. 4 also makes these distinctions by highlighting the explicit and implicit forms of object identification that become the operational driving-fields of what a server must do for its clients. This section explains how this three-tiered ID+metadata flag architecture is defined and implemented.

Figure 6:
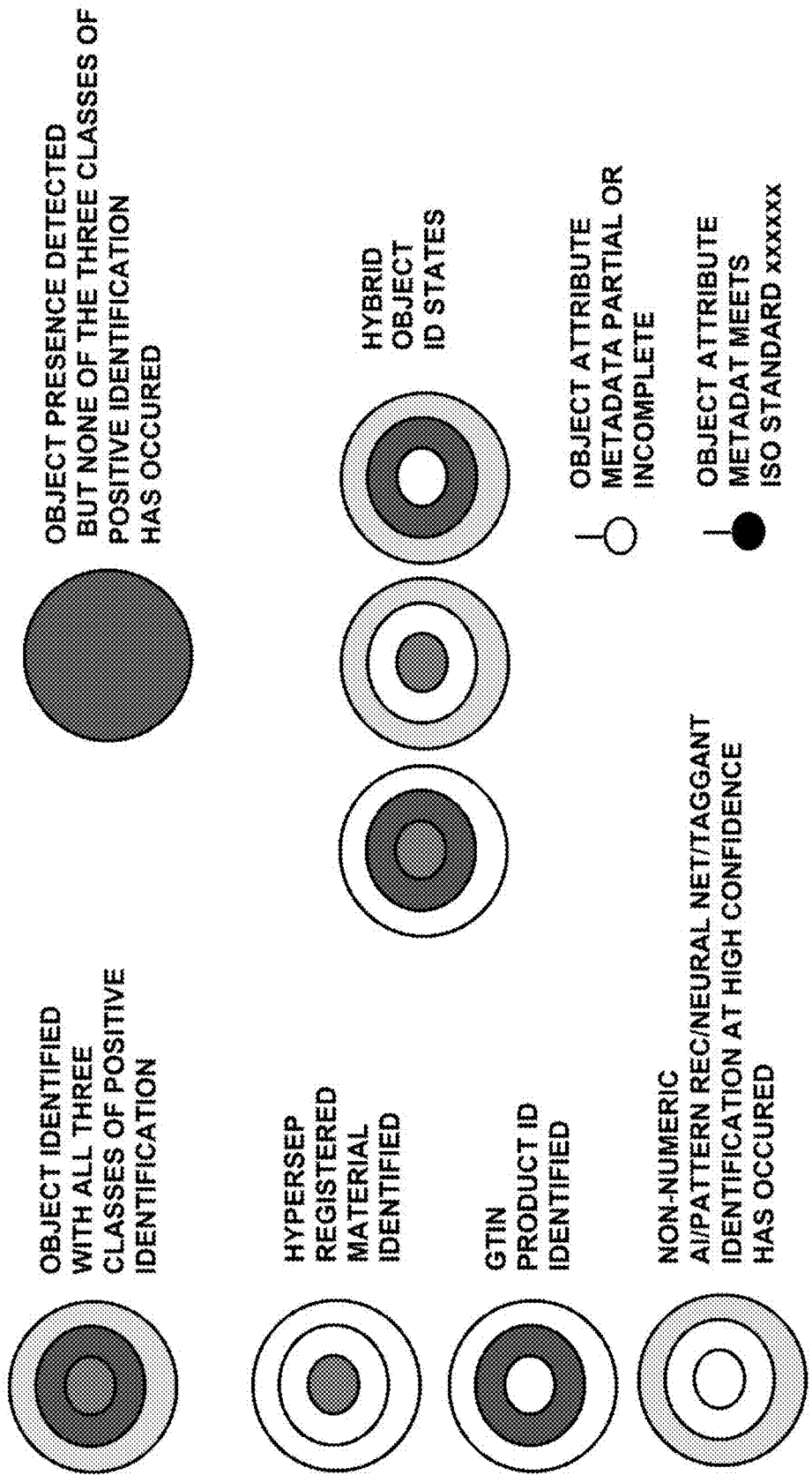
FIG. 6 is a graphic symbol key, detailing that different items may be identified by different identification technologies.

Identification level 1, the green bullseye in FIG. 6, is appropriately reserved for deterministic plastic identification that yields precise identification of material types, in compliance with an ISO standard taxonomy. Such standard may identify materials such as high density polyethylene type 72, or polystyrene type 5, or aluminum alloy type 6016-T6, etc. Various ISO standards are in place today, but the depictions in the figure (and subsequent figures) contemplate that such standards have the opportunity for significant expansion and evolution, hence these slightly more abstract depictions. That is, the explicit use of the word "type," above, along with the higher-level abstractions of the figures, is an explicit reference to the fact that the current ISO standards can be extended and granularized by employing this technology. This can be realized by employing even the present Digimarc Barcode marking technology, where the code's "payload space" is quite large and accommodating for such identifiers. Reserving this most basic level of identification, tier level 1, to the material itself is historically appropriate since, after all, this technology itself is centered upon recycling. Identification level 2, the blue intermediate circle in a bullseye, is explicitly reserved for a deterministically-identified GTIN identifier, itself part of a national and international family of standards-based identification of objects. GTINs are familiar to artisans in the consumer-packaged goods industry and other industries. As alluded to in FIGS. 6 and 3, it is a potent combination when an STCM/RMIP or equivalent discerns both a standardized material ID as well as a GTIN for some large fraction of objects (i.e., a green center, surrounded by a blue circle).

Identification level 3, the outer yellow circle, is essentially all other forms of identification that are capable of being codified and standardized. A very simple example of this is text extraction that unambiguously identifies an item. Another simple example is a search for and reading of specifically tailored iconography such as the colored and enumerated symbols currently utilized in the recycling industry and shown in FIG. 14. More broadly, a yellow outer ring encompasses extraction of human symbols, meaning that such symbols are intended as explicit visible elements to be seen and understood by people. Other simple examples are the types of identification systems used in contemporary waste sorting systems, often based on infrared (e.g., NIR) and/or fluorescent properties of objects, but also including any variety of "implicit" identification that relies on probabilistic, statistical confidence measures as opposed to the deterministic decoding of bits. (A technical nit: even the decoding of bits is a statistical confidence based endeavor, but it is qualitatively different in its nature.) It is likely that by 2025 or 2030, there may be dozens of "standardized" implicit identification approaches that can be implemented, undoubtedly with artificial intelligence and machine learning leading toward several. FIG. 4 pays homage to this potential and likely expansion by including a "reserved" field, and showing that whatever the underlying identification methodology might be, so long as it can be ginned up into an ISO standard and then labeled as such a standard, then such an identification "module" has a home in the grand scheme of FIG. 4.

A later section explores these explicit (deterministic) (level 1 and 2) versus generally implicit (probabilistic) (level 3) identification tiers. The point for this server section is that these three tiers are central to the preferred server's operation. Why? Because the existence versus non-existence of these three levels of identification directly impacts which object information gets logged, and which object information gets directed to which information clients. Certainly the sorting system client cares mainly about the level 1 identification (being the material involved; a level 2 GTIN can be used to fetch material identification data via indirect methods, such as a database lookup keyed from the GTIN) to directly control the physical sorting system. It is then the server's job to declutter the most verbose forms of the line-item entries of FIG. 4, and then send a stream of appropriate IDs and their spatial locations on the 2-dimensional belt plane (among the greyed values underlying the "sorting" label depicted in FIG. 4) to recipients. Likewise with the presence or absence of the GTIN identification field: the server needs to sort out which filtered broadcast packets are sent to which clients. Details of these types of filtering and abridged-packets being sent down separate client pipes are known in servers and TCP-IP networks.

Not to be forgotten in the server discussion is the extendable direct-metadata and linked-metadata that is graphically represented by the empty versus filled dots, positioned below the round colored targets in FIGS. 6 and 3. Metadata is an open-ended concept. The significance of the empty dot versus the filled-in dot includes the following: ISO in particular is concerned with standards around which all companies can build and maintain their products and data processing services. Given that metadata about some objects is so much of a free-for-all in terms of what might be included or what might not be there, there remains a need to ensure minimum standards of expected metadata fields and the quality of that metadata. This dot notion posits that such social processes have occurred in order to form these standards, and optical data interrogation techniques will be ongoingly developed in order to follow such standards and report findings in the appropriate metadata fields. If an object has such procedures followed, then it gets a filled-in dot under the three-tiered colored target. If not, the dot is empty. The dot says I am ISO metadata complete relative to the latest and greatest ISO standard XYZ.

As the technology evolves in practice, more and more of the explicit initial data populating the fields of FIG. 4 ought to move toward links as opposed to explicitly stored data. In C++ programming terms: use pointers instead of the data itself. A point here is that any consumer of the flowing spreadsheet items of FIG. 4 will need to be able to resolve those pointers to be able to fetch the pointed-to data. In this section's case, the initial consumer of the RMIP's object-ID-events is the information-client server of the application's title. The server's job at this point can be seen as a filter-and-re-route operator with generally one stream of data coming from the RMIP, leading to up to six categorical sets of clients as per FIG. 5, where each categorical client set can further break down into either further sub-categories or even individual clients themselves. So one pipe of data in, and a branched set of streams of data out. The server is serving a stream of asynchronous events. If such streaming itself involves links and pointers instead of the underlying data itself, then the consumers of the streams must naturally have access to the data being pointed to and/or linked.

Drill-Down on the Object-ID-Event Stream and the Recognition-ID Event Line

Referring again to FIG. 4, we describe most of the example fields and then circle back to consider the computation loads being borne by the server in its task of determining how these long lines get properly stored and how they get pruned before being sent to a wide variety of clients. Many of the higher-level aspects of FIG. 4 have been covered. It should be kept in mind that these FIG. 4 examples are simply baseline starting examples for a data structure that by definition will evolve.

Column A of FIG. 4 represents the discretization of the object-ID-event process itself. Has a discrete object been found? If so, tally another recognition event and increment the counter. This simple act of isolating an individual object and assigning a unique ID to that isolated object, however, is not so simple. Imagine that a large milk carton is imaged, which happens to have a second unrelated scrap strip of metal overlaying the milk carton. In probabilistic identification current art systems, it often would be the case that the milk carton would be identified as two separate objects. This same possibility lurks within a platform approach to object identification, to be sure, but by using a multitude of identification methods that include deterministic identification, the rate of over-counting objects should be greatly reduced, as objects with precisely identical information, though separated by some other object, can be identified as a single object rather than two or more.

The Frame ID of FIG. 4, column B, is straightforward. This indicates the last frame in which an item is present in the camera data streams. Metadata fields far to the right will provide much richer detail than this, especially with ISO-meeting metadata objects. If we lurch forward a bit in this disclosure we will find a posited frame rate of 160 frames per second hovering over a belt moving at 5 meters per second (sometime between now and 2030), giving a healthy set of objects passing by in only a few frame intervals, all leading toward those goals of many dozens of objects per second per STCM unit.

Columns C through H concern the levels 1 and 2 item identification: ISO and GTIN. Such identification is desirably future-proofed both in how the Materials-ID of column C and the GTIN-ID of column D include generation identifiers within the IDs themselves, and in the additional implicit ID columns that allow for any identification approach that can make it through the rigors of ISO qualification to be included and push the "reserved" column to the right. Further sections of this disclosure detail how this is accomplished. But the information-client server view of these columns is operational: the presence and/or absence and/or combinatorics of these IDs informs how the server serves its myriad clients.

Column I is a summary column. What is the item; what is its material (or set of materials within the very common case of multi-material objects)? The most specific answer to such questions most probably will come from an ISO material ID. But if an ISO material ID is not found, we might nonetheless have a high confidence object material ID based on a GTIN identifier extracted from an item. Both of these IDs are in the explicit ID class. Even without a high-confidence decode for column C or column D, the item may have been flagged by a recognition module AI/text/color/shape/etc., ISO-qualified implicit ID variety 2—column F. And column F has a look up table matching that ID event to some specific material. The more data helping the task, the better. So getting IDs on three or four or five columns are all more than welcome, just increasing the overall confidence in the correct answer.

Columns J through M are labeled "Brand" in FIG. 4. These are exemplary stand-ins for additional information that at least a successful GTIN decode will bring. Such additional information can include, e.g., what type of food or oil or bleach or enamel paint or anionic soap or other kinds of contaminant might likely still be on the object, and thus serve as information for the sorting machines and subsequent contamination management decisions during sorting. The last column here, the "smartlabellink" is itself an explicit reference to this mushrooming of information and information-webs that become the consequence of a GTIN decode.

Columns N through T are blandly labelled sorting. This list, too, is truncated greatly simply to keep FIG. 4 from getting too unwieldy, and alludes to all that data that the sorting machinery, as well as the pre-sorting and ingestion machinery, will want to access to. These "sorting" columns will also contain any deducible information on the physical attributes of the object that are relevant to subsequent sorting mechanism, such as a robot or a more advanced blower network, where the physical handling requirements of such sorters can make use of attributes such as the object's size, probable weight, fold condition, grip point targets for a robot, etc. Blowing systems in particular can better understand the probable aerodynamics associated with specific objects, provided the system defines which aerodynamic properties of an object they are most interested in (shape, weight, etc.), and collects data indicating such properties.

Attention is also drawn to Column U. There are multiple "object attributes" one can attach to an object given the proper CPU/GPU budget. Whether an attribute is worth the effort to extract depends on whether there is an information client that can make use of such information. Column U indicates whether an ISO-standardized attribute was extracted, or not. That is, going back to FIG. 3: does the item merit a filled in lower dot, or is the dot un-filled? Columns V and to the right detail data for relevant ISO metadata fields, either with literal data or with links/pointers.

The Technology Underpinnings of a Recyclate-Materials-Marketplace

This section briefly expands on FIGS. 1 and 5. FIG. 1 concentrates more on where the sorting capabilities (e.g., STCM, see below) fit into the raw materials-flow points within the materials marketplaces, while FIG. 5 is a broader view of the information markets that result from RMIP (which may or may not have an STCM implementation).

Markets are founded on functioning technical cores. In the 1970's, a recycling facility manager might telephone buddies at the materials cooperatives, telling them that next week there will be a new few tons of paper recyclate available, will they buy it for $50 a ton please? But things are different now. Referring to FIG. 5, we find that singular box on the lower right labelled "futures and spot markets . . . ." This is today's analog of the telephone—an extraordinarily simple summary of an extraordinarily complicated modern marketplace. No more phone calls to the buddy at the cooperative. The strength of a market increases as both suppliers and demand are better coordinated.

An MRF's management and stakeholders need to determine how to participate in raw-materials marketplaces, given that they are the ones mining information about the quality and volume of recyclate. To what extent do they want to expose their internal FIG. 4 data streams? Is it to their advantage to publish daily summaries to specific futures markets? (Applicant does not mean to suggest that MRFs are not already participating in these marketplaces. Rather, applicant posits that order-of-magnitude enhancements provided by the present technology can lead toward entirely new strategies on how to better plug in and eventually take over as dominant suppliers, being leaders in a surge of more stable and cheaper supply.)

There are technical-specification ramifications to the information-client server once these questions are answered by MRF management. Perhaps in many cases there will never be an external low level data feed outside the walls of the MRF; the MRF may only externally export highly filtered summaries instead, but in other cases, perhaps with state-run monster materials flow such as in mainland China, then such external publishing of real-time data might become absolutely central, as it was with 1980's and 1990's era concepts of just-in-time manufacturing. Again, this section simply elaborates some of the motivation for the technological innovations detailed herein. Further elucidation of how material flow ID assists the refinement process allows for a more detailed discussion on how "upgrade shifting" of final recyclate becomes a fundamental consequence of this technology. Real-time certification of recyclate contamination level is but one of several technical improvements that yield immediate increases in recyclate value.

The Economic Role of "Visibility" in the Stability and Pricing of the Futures Market Turning once again to the RMIP raw data output of FIG. 4, there is more information available than even the most sophisticated futures market could ever exploit. Hence the earlier presented notion that MRF management must filter or liberally edit this information, also of course including further processing of this data into more analytical forms of data, fit both for human consumption but also very importantly, for AI/machine learning types of market analysis.

We can use the simple word "visibility" in the title of this section to connote what precisely the MRF management decides to pro-actively ship out of their walls, by the second, by the minute, by the hour, the day, the week, the month. All such choices are possible, and in time, once we find ourselves in 2025 and 2030, it is quite likely that finer time-scale granularity will be valued by competitors in the buyer marketplace for materials, and, due again to the stability and step-function better purity-prediction capabilities deriving from the present technology, overall market competition may turn this visibility into another profit-center for the MRF itself. The information products from the server can represent a high margin business all to itself. The existence of next gen AI/machine learning virtually guarantees this heretofore non-existent profit source.

Figure 14:
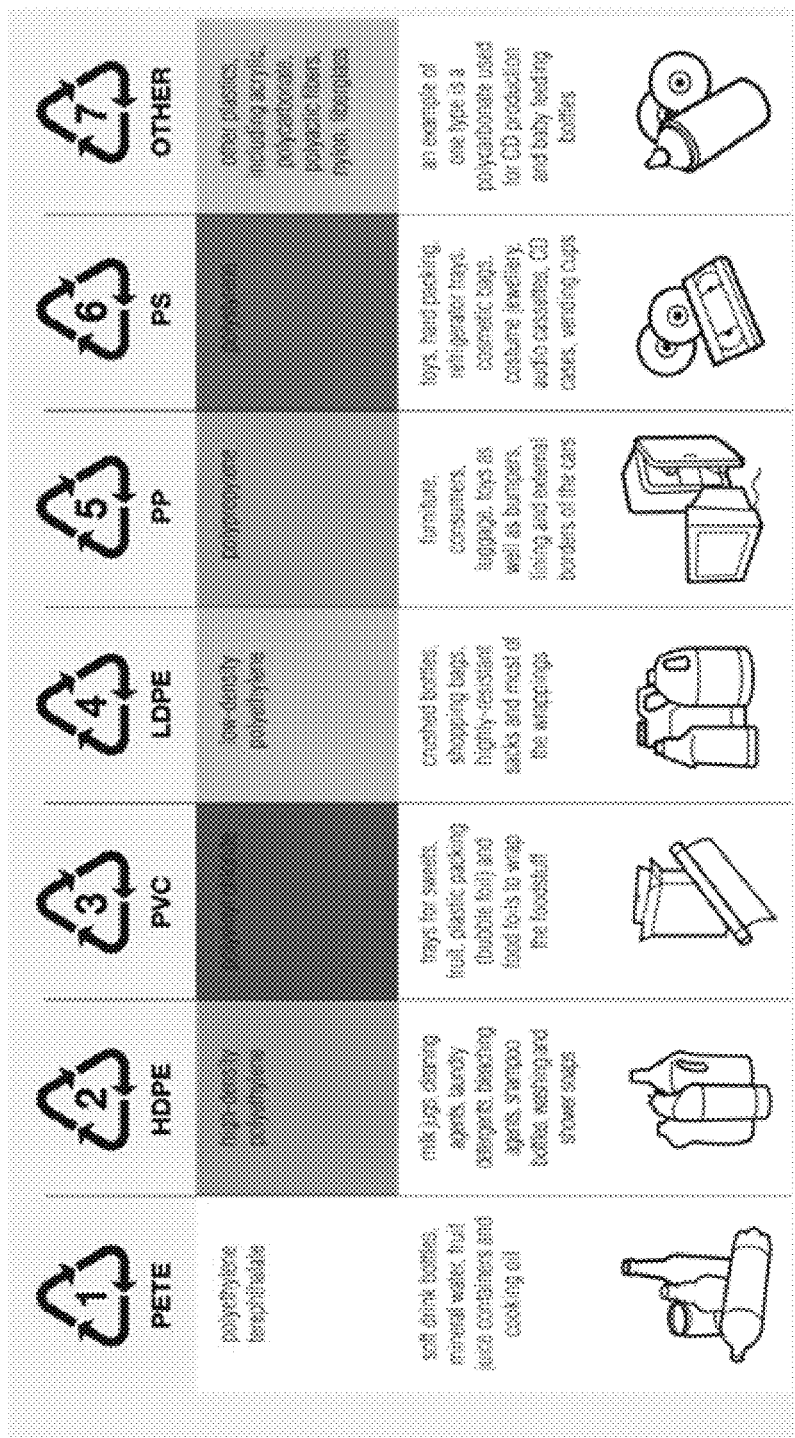
FIG. 14 details a prior art system for identifying different classes of plastics.

A Contemporary Inventory of Recyclate Materials and Their Identification Attributes FIG. 14 presents one approach to developing inventories of different types of—in this case—plastics. The practical use of these codes in identification of recyclables is limited to consumer information. By visual inspection, the consumer should be able to determine whether the item is recyclable in their municipality. Unfortunately, the identifier provides no automated machine vision identification for MRF's.

Complicating matters, these identifiers do not provide sufficient granularity with respect to materials purity. The recycling markets appear to be requiring greater refinement and quality assurance of the recyclates of interest. This has resulted in trade associations' and standards organizations' vigorous interests in expanding on these codes, which will grow from these 7 to hundreds in the near future. An example of this is a plastics resin classification system used in China per the direction of Standardization Administration of the People's Republic of China (SAC), which defines material codes for 140 different types of plastics, in document GB16288,2008 (e.g., Code 37: methyl methacrylate-acrylnitrile-butadiene-styrene plastic). The explicit identification approaches of applicant's technology, both with contemporary digital watermarking like the Digimarc Barcode indicia, and with near-future types described further below, expand the address space of material identity, essentially indefinitely. If manufacturer X creates a new formula of LDPE plastic, for example, it might behoove them to apply for a special sub-code over and above the "main standardized code" that might be in place for LDPE in general, across all vendors/manufacturers. Likewise, entirely new families of plastic may show up, hopefully with the purpose of lower environmental impact and or higher recyclability, also making use of this limitless coding address space for identity.

Attributes such as the laundry list of properties and functions of purity levels (plastic X burns at 550 degrees at this purity level Y, but burns at 600 degrees at this other purity level Z), become prime candidates for a more precise world of rapid materials identification. The current practice inherent in FIG. 14, beautiful as it is, is nevertheless constrained by the need to educate and keep things simple for a very wide public audience. Not so with an effective nearly infinite address space of identity as laid out in this disclosure.

Defining an "Identification Platform" for Recyclate Materials

The word "platform" can take on an overly large number of meanings, tuned usually to specific industries and activities. This word speaks to the accommodation of more than one silo'd approach to identifying materials, and even more specifically, to the accommodation of evolutions of identification approaches even within some specific kind of identification, say, digital watermarking. A point here is that even if an overall system decided to spend three to five years keying in exclusively on digital watermarking as the central method of identifying material, then it still makes sense to build identification "modules" and show how they plug into "a platform." But this technology goes beyond a single approach to identification, central to the preferred embodiment as digital watermarking might be, and instead becomes more explicit about the platform and its immediate organization into "deterministic" and "probabilistic" identification, as explained further herein.

And a platform is as much about future-proofing as it is about accommodating some stable of current identification methods. The introduction of new materials and the innovation of novel ID methods, most definitely including neural network/AI approaches to class-based identification . . . . All this demands a platform.

A platform also opens up the potent technical capability of communication and cooperation between modules. Confidence levels are increased through sharing of information, one module to another. The richness of purity estimation can combine with the richness of metadata cross-linking, all brought about because modules are configured to share information—enabling each to leverage information gleaned by others.

An important aspect in a section attempting to better explain the disclosure's use of the term "platform" is quality control metrics and standards—and current and future ISO standards in particular. The platform enforces the rules and standards du jour. Specifications and requirements for the modules to plug into the platform become known and trusted vehicles for standards implementation. The ISO standards leaders can specify, and engineers can then work to the specs. The "platform" thereby serves as the de facto implementer of the standards.

Anatomy of an Existing and Near-Future Explicit Identification Platform Approach Applicant has over two decades of patents and recent patent filings within the general field of digital watermarking, and more specifically on the application of digital watermarking to physical surfaces and the reading of those watermarks from surfaces via a variety of methods. This past and current art is unequivocally a candidate module for the RMIP platform (as well as the STCM unit) described below. As a practical matter, it is highly likely that a Digimarc Barcode module, or perhaps some digital watermarking method rebranded specifically for recycling, will dominate capital spending in the 2020 through at least 2022 time period. So this short section is only short because there is a vast set of filings and publications that the reader is referred to on this particular identification module, as identified in the first paragraph above.

The 2030 Inexpensive and Fully-Scaled Model: Towards Millimeter-Scale Optical Surface Location, Orientation and Identification within Modestly-Mixed/Occluded and Highly Contaminated Material Flows, with Subsequent Groupings of Surface Elements to Represent an Integral Sortable Object Much of the remainder of this disclosure derives its technical underpinnings from this section. The arbitrarily chosen year 2030 is used so that some fuller expressions of certain elements can posit a relatively cheap industrial scale implementation, most notably in the areas of camera resolution, image data throughput, LED-based lighting schemes, and certainly Teraflop-scale (and higher still than Teraflop) parallelizable processing units (or cloud processing). If these 2030 definitions and hardware capabilities actually show up in 2025 or sooner, our world will be better for it. We can nevertheless explain and implement these principles using today's relatively expensive machinery. The engineering task then becomes to make implementations cheaper by scaling, and by the march of technological progress.

A central aspect of the RMIP is to produce the data flows represented in FIG. 4—the stream of data about individually identified objects. As stated, this begins as an image segmentation problem. Inspired by the ideas graphically contained in FIG. 7, this section first describes the breaking up of image data from generally a multitude of separate cameras into elemental patches: very small, usually-rectangular, patches for explicit (digitally modelled) forms of surface identification, and small square or rectangular patches for a variety of implicit forms of surface identification and/or characterization. A complicated 3-dimensional topography of surfaces on a conveyor belt, zipping by at more than one meter per second, is the assumed subject matter that the cameras are viewing. A disconnected tapestry of estimated surface states and attributes comprises a type of pre-processed data entity which is then applied to both deterministic (digital watermarking, barcodes) and probabilistic (many algorithms both current and future) surface identification and qualification stages. This very direct combination and coordination of best-of-breed underlying identification methods is one aspect of a preferred identification platform (RMIP) and its future-proofing. Digital watermarking is a preferred embodiment in this disclosure, but the global marketplace is going to move as measured in decades, and the truly preferred embodiment overall is to recognize that big boats take some time to turn and that all valid identification methods need to have their proper home as a large industry slowly evolves.

One concept developed in this section is that there exist streams of integral singular sortable objects with typical physical-spatial-volume scales between just under one cubic centimeter up to supra-liter-sized jugs and boots, and that each such object, as a general rule, has highly contorted (crumpled), dirty, glare-ridden surface states not too unlike a classic cubist painting. Assume the worst, and if a pristine package flies by, all the better. Within the field of digital watermarking where objects are marked with 2D sheets of coordinated 1's and 0's, the usual state of the resulting surfaces can be seen as a phase-fractured mosaic transform (sometimes termed an origami transform, or the here-below introduced crumple transform) of what started out as a smooth square-based grid.

Historically, there is some good news associated with defining a new entity named the crumple transform that attempts to encapsulate this situation. From roughly the early 1990's through today, the art of laying down 2D square-sheets of 1's and 0's onto objects has largely stayed the same, while the reading of those 1's and 0's has been through many chapters of ever-increasing complexity in how such I/O sheets manifest themselves in the pixel outputs of cameras. The overloaded word "Pose" is one semi-reasonable way to summarize the topic. A reasonable state-of-the-art (2020) example of this might be a Chapstick lip balm container that is obliquely posed before a point of scale scanner at the grocery store, presenting tightly curved surfaces, further transformed by the arbitrary angle it is being presented to a camera set-up. A lengthy forensic analysis of such an image of the Chapstick tube, assuming it has been "pre-marked" (i.e. digitally watermarked with the Digimarc Barcode technology) with a sheet of 1's and 0's, would show an intuitive tube-like distortion of these sheets, which then translates into a technical challenge to a digital watermark reading system to quickly assess, first, the very existence of these 1's and 0's, and then their orientation in this tube-like form, and finally properly decoding the 1's and 0's. Indeed, the Chapstick tube as an example is pretty close to the very latest state of the art in modest-CPU-load decoding of so-called curvilinear/affine transforms. What's still missing in this scenario—but what shows up in abundance in a recycling conveyor belt setting—is the phase fracturing as well, the crumple transform. The historical cadence of evolution in watermark reading is due for a next challenge, and the phase fracturing of the crumple transform is a worthy one—a next level of Pose transform complexity.

Later sections dive more deeply into some typical scenarios and numbers, but let's begin to characterize a particular implementation. The sections on "HyperSep" and its underlying Coiled-All-Pose disclosure posit, for example, 31 pixel by 11 pixel elementary processing pixel ribbons (the more accurate word "waxel" will replace the more intuitive idea of the pixel in the following detailed disclosure). In a typical recommended camera system set-up, where at-belt resolutions (projected onto objects lying on a conveyor belt) are roughly 8 pixels per millimeter, this gives tiny surface strips of about 4 millimeters by 1.4 millimeters. And, as will be discussed further, millions of these basic strips per second are examined on a multi-meter wide conveyor belt. One aspect of this disclosure is that the extremely small physical size of "integral surface patches" inside the waste flows (e.g., patches exhibiting internal phase coherency, rather than fracturing) begs for smaller scale phase-elements, such as these ribbons, rather than relatively large 128×128 waxel blocks, which are already challenged by our Chapstick example. See FIG. 7 once more, which illustrates how smaller phase islands are depicted in relationship to a large "classic" block from the first two decades of digital watermark reading. As an intuitive matter if nothing else, one can visually see the motivation towards finding smaller patches more attuned to the elliptically-oriented random phase islands of some arbitrary crumpled object.

An idea behind the data-element qua rectangle, as opposed to a square, derives directly from the crumple transform. Simply put, squares exhibit phase-decorrelation as they grow within a highly affine sub-region, whereas strips do so as well but they do so while "scale adapting" to whatever particular line they find themselves along within the affine sub-region. Phase-decorrelation does indeed grow if you keep the assumption of a fixed scale for the tilted region as a whole. But if you let the assumption of scale also roam freely, you can recover much of the phase correlation for some elongated ribbon along the tilted surface. This ability to handle a "range of scales" of a Pose transform has been part of digital watermarking since the mid 1990's, and this ability to detect across scale thus allows data-rectangles the chance to "find their best scale." One wants to find patch sizes that can correlate to objects up to roughly one-half-waxel decorrelation-levels. (The waxel notion, or the fundamental spatial unit of the 1's and 0's encoding, is extensively covered in numerous previous patents and patent filings referenced herein).

The called-out numbers of 31 and 11, above, are a matter of empirical choice. This disclosure finds it prudent to simply go with solid choices so that the math principles can be clearly elucidated. Other choices might derive from empirical data, which is further derived from questions such as: how crumpled are the bulk of the crumpled objects, and what is the camera pixel resolution at the belt? These and other questions can hone the proper pixel ribbon dimensions. The odd (v. even) choice is an artifact of the Coiled AllPose (CAP) technology and can easily be typical power-of-two numbers (e.g., 32 by 8) if one is not connecting into a Coiled AllPose ("CAP") processing module. 11×31=341 fundamental pixel units. This is an excellent and appropriately large number of "coin flips" whereby the binomial distribution of heads and tails, centered on 170 and 171, has steep enough fall offs from these centers such that say 30, 40 or 50 "flipped bits" caused by a "proactively marked object" can begin to form the weak-signal basis of an overall detection system. When first hundreds then thousands of thus "flipped bits" ribbons start piping though a detector, both CAP-like detection logic as well as machine-learning/AI trained neural nets can do the job of sniffing out these batches of marked strips, first alerting the detector to the probable existence of a signal, followed by reconstructing the phase strips from their cubist form and back into the native square-grid state. This is the short version of how the explicit identification works, i.e. digital watermarking via Coiled AllPose as prose.

Diving down a further level, the binomial distribution of 341 bits indicates that the probability of 341 random coin tosses resulting in 200 or more heads is 0.00082, or less than 1 in 1000. If captured imagery reveals that 200-or-more bit positions in a 31×11 element area have values that match an excerpt of the tiled HyperComb pattern (FIG. 8), this is due to random chance less than one time in a thousand. That is, there is a 99.9+% chance that such imagery depicts a watermarked ribbon. Yet this high confidence is achieved with 341-200, or 141 elements not matching the Hyper-Comb pattern (such mismatches possibly being due to distortion, soiling, glare, misregistration, etc.).

In actual practice, the statistics are even more favorable. This is due to applicant's preferred use of oct-axis filtering of the imagery prior to attempting watermarking reading. As detailed in applicant's cited publications, such as 20180005343 and 20190266749, the oct-axis-filtered value of each image pixel is based on comparisons with each of its eight neighbors. Each of these eight comparisons per pixel, in essence, is a coin-flip. So instead of 341 events, there are 2728. But half are redundant (the comparison of neighboring pixels A and B is used in producing a filtered value for pixel A, and in producing a filtered value for pixel B), so there are really 1364 generally-independent events (homage to "independent" being an ideal rather than a practical phenomenon).

Of 1364 events, a 99.9%+ probability that a HyperComb pattern is depicted occurs when 740 of the pixel value comparisons match expectations from the HyperComb pattern. This is just 58 more than the 682 matches that would be randomly expected, i.e., a 54.3% match to HyperComb expectations. Yet this modest correspondence to the HyperComb template yields detection confidence greater than 99.9%.

This section is then a nutshell version of what later sections disclose in implementation detail. A singular, sortable integral object manifests itself—at least within the "explicit identification paradigm" of both CAP and Digimarc Barcode technology—as families of these ribbons begin to Pose-correlate and a rough "extent" of an object shape also manifests. As the cubist pieces of phase are collected and re-assembled, so too does an object shape and size emerge. Then the 1's and 0's can be piped into the decoder and a digital identity emerges with tunable high confidence.

More on Phase Coherency

Figure 19:
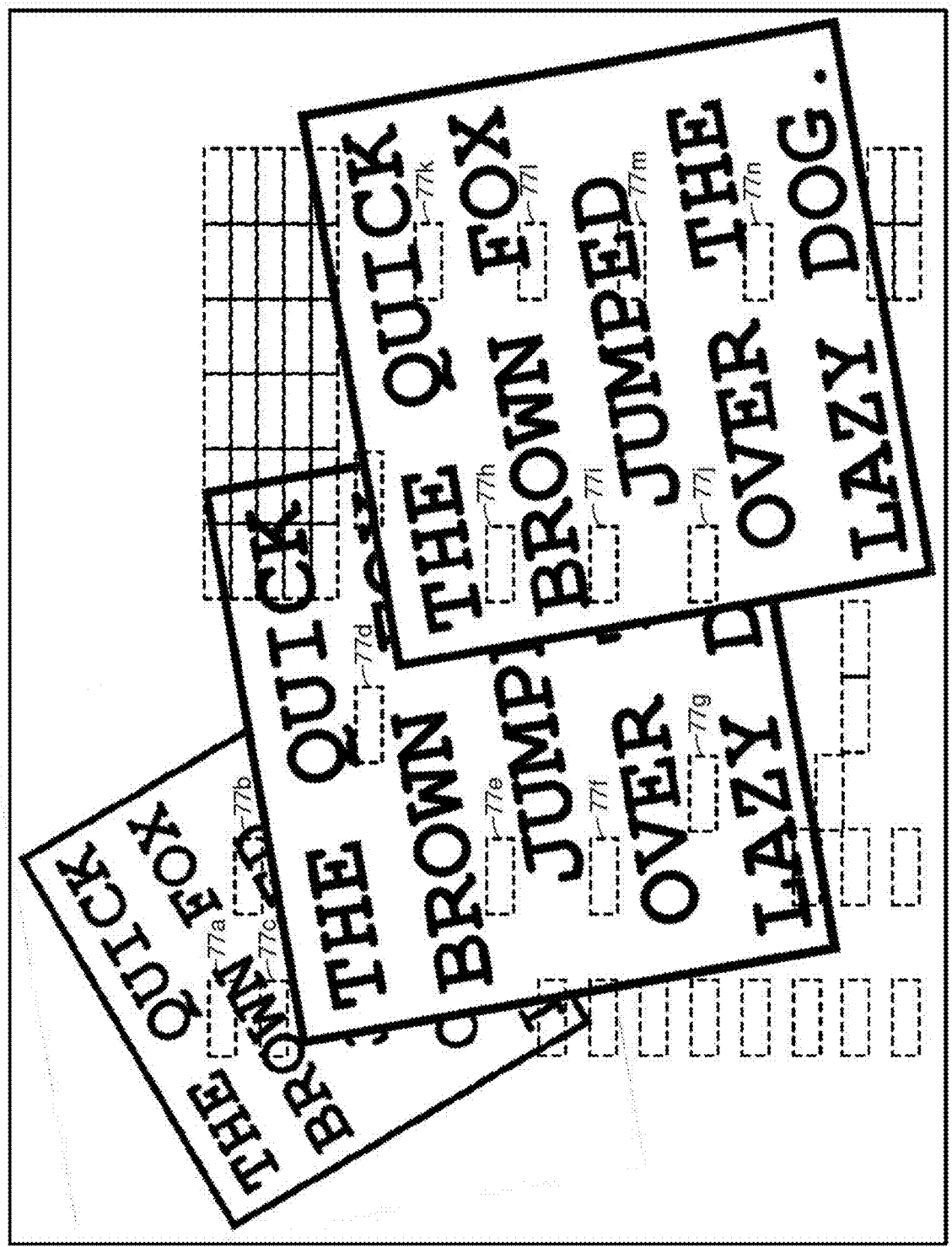
FIG. 19 shows the locations of different ribbons of watermark signal found on discrete objects in a waste flow.

FIG. 19 is a frame of image data including three different items, and an array of "ribbons" (dashed rectangles) sampled from this imagery. To aid explanation, the bold square items in the figure may be regarded as different watermark blocks—either from different items, or from a common item (but appearing separate due to intervening folds, wrinkles or distortions). The upper left corner of each square is the origin of that watermark block. The blocks have different scales, rotations, and/or translations. Since it is unknown whether the blocks appear on a common item or different items, watermark data should be extracted from each block separately. The task is to identify, from pixel data, which pixels should be grouped together for watermark extraction as belonging to a common watermark block.

Relationships between the ribbons indicate whether corresponding excerpts of the imagery depict a common item without a fold or other interrupting distortion therebetween. That is, the ribbons can be analyzed to discern whether different item excerpts depicted in the imagery are "spatially coherent" with each other.

An example of spatial coherency is as follows: The distance between ribbons 77$h$ and 77$i$ in the pixel frame may be 87 pixels in the Y direction, and the distance between ribbons 77$i$ and 77$j$ may be a further 87 pixels in the Y direction. Imagery encompassed by each of these ribbons can be analyzed to identify the position, in watermark waxel space, it depicts. The imagery encompassed by ribbon 77$h$ may be found to depict an excerpt centered at waxel row 26 of a watermark. The imagery encompassed by ribbon 77$i$ may be found to depict an excerpt centered at waxel row 51 of a watermark—a distance of 25 waxel rows from ribbon 77$h$, if it's the same watermark. The imagery encompassed by ribbon 77$j$ may be found to depict an excerpt centered at waxel row 76 of a watermark—a distance of 25 waxel rows from ribbon 77$i$, if it's the same watermark. The ribbons, uniformly spaced-apart by 87 pixels in the image frame, are thus found to also be uniformly spaced-apart by 25 waxels.

This consistency indicates the three ribbons are spatially- or phase-coherent. They are concluded to lie on a common surface for which a mapping between pixel space and waxel space is invariant.

If 3 ribbons that are uniformly spaced apart in the image frame of reference encompass pixels that are phase coherent with each other, then those pixels should depict regions of a watermark that are uniformly spaced apart in waxel space (with allowance for "wrap-around" caused by tiling of watermark blocks).

More generally, if the relative spacing between three ribbons in the image coordinate system is proportionate to the relative spacing between the three ribbons in their respective waxel coordinate systems, then the ribbons are phase coherent, and lie in a region of imagery depicting a single watermarked object without a fold or other interrupting distortion. In such case, the phase of the watermark progresses uniformly with spatial distance.

In contrast, if three ribbons have a relative spacing in the image coordinate system that cannot be mapped by a linear equation to their respective positions in waxel space, then the ribbons are not phase coherent, but are fractured, and are not suitable for use together in extracting a watermark payload.

A sparse or dense sampling of ribbon data can be extracted from an image, and analyzed to determine which ribbons are phase coherent with which other regions. A group of ribbons that are phase coherent with each other depict different locations on a surface of a common item that lacks disqualifying folds or wrinkles between the depicted locations. By finding several such groups of coherent ribbons within an image frame, the image can be segmented into regions, each depicting an item surface that may be processed to extract a corresponding watermark payload. (Two of more different groups may correspond to the same item, but are dealt with separately for watermark decoding because a fold, wrinkle, or other distortion interferes with the phase coherency.)

The 2030 SpectraTopo Camera Module (STCM)

The arbitrary future date of 2030 again is used in order to calm the heartburn on both costs of development and ultimate costs per module of an optical design that appears to optimally support the millions of data ribbon model of the last section. With a non-trivial estimated design and prototype cost somewhere in the high 7 figures for producing a dozen or so initial prototypes, these STCMs can indeed be built and operated right away. Per-module costs of around $25K US are rather steep and would need to support radical increases in recyclate sorting quality and quantity in order to support these prices. But 2025 and 2030 ought to see both the development costs and the per-unit costs plummet, so hence this disclosure will key in on an "(8)(5)" version of an STCM, knowing that less endowed versions can be built much more cheaply. 8 refers to the number of LED spectral bands utilized in the lighting system, and 5 refers to the number of independent cameras in a module. The precise selection of the 8 bands is ultimately a matter of empiricism as well. The common use of spot color inks in product packaging, for example, would argue against choosing all narrow band selections for the 8 LED bands. Instead, spectra of the 8 LED bands desirably should collectively span all wavelengths from 400 nm to say 950 nm.

A (4)(3) version, with 4 LED bands and 3 cameras, is an exemplary step-down from the full (8)(5) version, bringing with it less cost but presumably less sorting identification and sorting capabilities. Even a (4)(1) is presumably possible, for cost reasons, where one is still employing 4-band spectroscopic diversification, and the "hood" mainly just houses the multitude of individual LED elements. The (4)(1) arrangement is also envisioned for a mobile-camera "field" version of an STCM, where motion of the camera itself can potentially fill in certain topographic information as described in applicant's patent publications 20150005644 and 20140293091, the disclosures of which are incorporated by reference. FIG. 1 thus summarizes at an abstract level these three basic STCMs: the (8)(5) straight STCM, the (4)(3) so-named STCMl with l for "lite" and then the (4)(1) STCMm with m for mobile.

Figure 15:
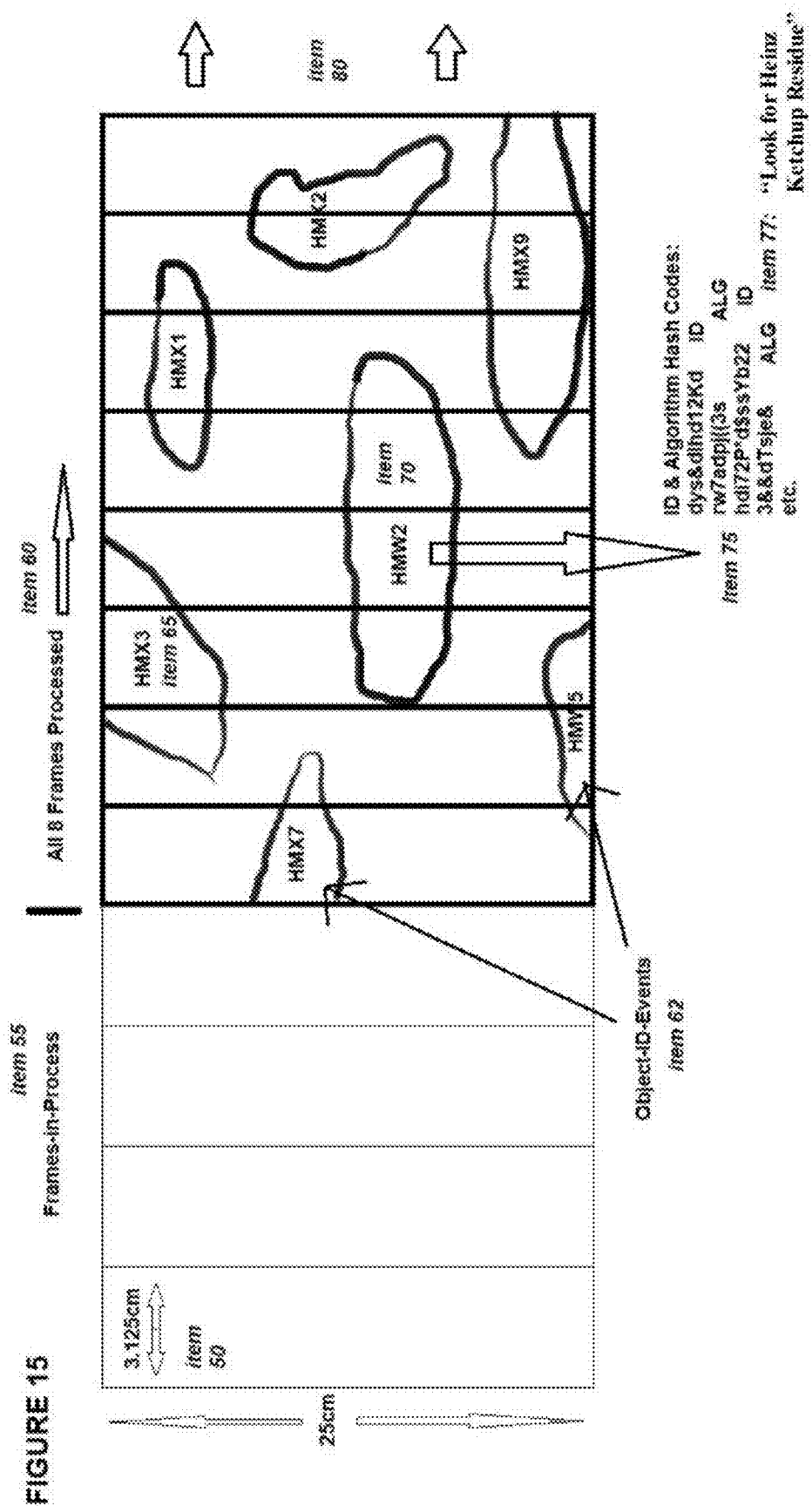
FIG. 15 details aspects of the frame-based processing of different regions of a waste conveyor belt.

FIG. 15 shows an overview of an (8)(5) STCM module, with a typical example belt-width of 25 centimeters, an along-belt length of 40 cm, and a standoff distance of the cameras from the belt of 70 cm. The active imaging cross-belt dimension of this unit is meant to be precisely 25 cm such that modules can be butted up against other identical modules, to give any number of meters desired for a full conveyor belt width. There will of course be a very slight field-of-view extension of any given STCM, say to 25.5 cm, so that when one STCM is butted up against a second one, to together ensure that there are no dead spots on the underlying belt.

The lighting system is designed to substantially fill every void in the hood structure between the camera viewing cones needed by the cameras, with their collective light as best focused (or more likely, evenly diffused) onto a 25 cm by 25 cm area as possible. The figure itself represents this packing schematically. Just like an operating room with plenty of light illuminating a patient, the hood is there for protecting the lighting and cameras but mostly for providing the real estate to attach more and more of the LED modules. LED lighting specialists understand that getting all of the actual light emitted by the LEDs down onto the 25 cm^3 volume is not possible to achieve at a 100% efficiency level, and that a certain moderate amount of light inefficiency will need to be tolerated. But again, the general rule behind the hood is: fill it up with LED lighting in all places where the cameras don't need to occupy the real estate. One of the benefits of the 25 cm cross-belt modular approach is that spillover of light outside of the strict 25 cm by 25 cm active imaging zone is quite fine IF that spillover occurs into the adjacent module's active zone. This brings up the technical point that all hood-modules, which also effectively defines a single (8)(5)STCM, are following identical frame-by-frame scripts in terms of when given LEDs are on and when they are off. Effectively the 5 cameras are also modules, albeit the corner cameras might have slightly oblique optics relative to the center camera. The 8-band LED strobing modules are desirably identical modules for mass-production cost reasons, and also for "quick replacement" when mean-time-between-failure statistics catch up to some poor module on some given day. That night or the next morning a technician simply replaces any faulty LED module that may have gone flaky during the last 8 hour shift.

Heat is also a major design factor for these hoods. The strobing of these LEDs generally leads toward higher peak currents and higher overall temperatures. Heatsinking of the LEDs is typically required.

The cameras themselves can have their nominal focal planes slightly varied about the economically-determined height-dimension of objects passing by, where one or two cameras can be nominally focused closer to the belt plane itself, while others might be nominally focused 10 or even 20 cm above the belt. Depth of focus is a key parameter for the design of these lenses, where, lighting efficiency put aside, a longer depth of focus (usually a higher f number) is thus desirable. As far as explicit identification of surfaces is concerned, as in digital watermarking, there will come a point where appreciable loss-of-signal strength will be encountered at certain levels of blur caused by some object surface being significantly above or below some given camera's nominal focal plane. The 4 off-axis cameras can even use various well-known tilted focal plane configurations, or, pro-actively choose not to have such tilted focal planes if one wishes to create a veritable 3D mesh of five focal planes. The point of noting all of this right up front in the discussion of an (8)(5) STCM is that these physical limitations are among the driving rationales for going with 5 cameras in the first place: produce an imaging volume, e.g. 25 cm×25 cm×25 cm volume, hereafter called 25 cm^3, wherein usually at least 2 to 3 cameras are getting good views of some semi-occluded, dirty glinty surface, with reasonable focusing properties.

A following discussion of polarization speaks to methods of mitigating such glintiness. The combination of all 5 cameras produces decent results, and the march of technology improvements will bring down the costs of these arrangements as well as improve the signal to noise ratio pixel-data collection within some chosen active viewing volume (as in the 25×25×25 cm example). It should be noted that modern specialty cameras are available specifically designed to better deal with large depth of field imaging problems in genera. Likewise cameras that explicitly measure polarization states of light are very likely candidates for inclusion in the STCM design scheme. An example is the Sony Polarsens image sensor. Its sensor array is overlaid with a spatially-corresponding polarizer array, comprised of four different angled polarizers (90°, 45°, 135° and 0°). An image frame consisting just of data from the 90° polarized sensors can be extracted for analysis. Likewise for each of the other three polarization states. Moreover, differences can be computed between, e.g., the 90° "image" and the 45° "image," etc., and such difference images can likewise be analyzed. (This Sony sensor is available in a variety of configurations. The IMX250MZR is illustrative. It is a monochrome CMOS sensor, with 2464×2056 pixels. A color counterpart is the Sony IMX250MYR.)

The 8 bands of LEDs can follow a "four on during one frame" cadence. Each frame chooses to fully light up all banks of LEDs of 4 of the 8 bands. The next frame cleanly and succinctly then turns on some new combination of 4, usually including at least one LED band from the last frame. It should be noted that the details of pulsing an LED generally does not imply that a given LED element is "on" for a full frame time. The more typical situation will be that an individual LED will be "on" for only a fraction of a frame time. This technical detail allows for finer control of the LEDs, where empirical testing should show that various structured lighting principles can be utilized in the STCM; an example would be that LEDs of the same band might be turned on in one end of the hood (e.g., the front) at a different time that the same band of LEDs in the opposite end of the hood (e.g., the rear). Such finer-scale tuning of the LED on-states can also play into potential uses of polarized-light cameras, as noted above.

All in all then, generally half the light of the entire LED array is illuminated for all frames. This is a far cry from the situation where light is either filtered or separated out into spectroscopic bands, where often one finds final light levels reaching 10% of available light or even much lower. For camera systems working at 160 frames per second and even using modern scientific CMOS sensors which are quite sensitive, the need to keep the LED lighting some stand-off distance that is typically greater than 50 cm from imaged objects demands careful approaches to keeping the overall light levels at sufficient values. This 8 Band, 4 always-on, approach is one way to do it. From a machine-learning, artificial intelligence viewpoint, this can be phrased as "spectral diversity in the feature vectors"—a concept that is informationally akin to the human concept of breaking the light spectrum into linear bands. This also allows for both higher resolutions and maximum quantum efficiency of so-called monochromatic sensors reaching into the very near IR (just barely past 1 micron in the red). The bandpass values of the 8 LED light elements themselves are explored in applicant's patent publication 20140293091 concerning Spectra ID. Generally speaking, 5 LED bands in the visible light range, and 3 LED bands in the near infrared, have proven to be good choices for the 8 bands. The consistency of LED band behavior will become a factor in systems which employ probabilistic identification methods such as AI, where one batch of LEDs might have slightly different spectral signatures than some other batch, and thus these systems will need to be either re-trained, or the better option is to train such variability in to the identification network. Recyclate materials and most notably the various families and sub-families of plastics will weigh in heavily on the engineering/cost tradeoff studies needed for some specific STCM module to be product-finalized.

One 8-frame cycling logic sequence for the turning on and off of the LED bands might look like this:

TABLE 1

| Frame # | LED BAND | | | | | | | |
|---|---|---|---|---|---|---|---|---|
| | 1 | 2 | 3 | 4 | 5 | 6 | 7 | 8 |
| 1 | 0 | 1 | 1 | 0 | 1 | 0 | 0 | 1 |
| 2 | 1 | 1 | 0 | 0 | 0 | 1 | 1 | 0 |
| 3 | 0 | 1 | 1 | 1 | 0 | 0 | 1 | 0 |
| 4 | 1 | 0 | 0 | 1 | 1 | 1 | 0 | 0 |
| 5 | 1 | 0 | 0 | 1 | 0 | 0 | 1 | 1 |
| 6 | 0 | 1 | 1 | 0 | 1 | 1 | 0 | 0 |
| 7 | 1 | 0 | 1 | 0 | 1 | 0 | 0 | 1 |
| 8 | 0 | 0 | 0 | 1 | 0 | 1 | 1 | 1 |

Another might look like this:

TABLE 2

| Frame # | LED BAND | | | | | | | |
|---|---|---|---|---|---|---|---|---|
| | 1 | 2 | 3 | 4 | 5 | 6 | 7 | 8 |
| 1 | 0 | 0 | 0 | 0 | 1 | 1 | 1 | 1 |
| 2 | 1 | 0 | 0 | 0 | 0 | 1 | 1 | 1 |
| 3 | 1 | 1 | 0 | 0 | 0 | 0 | 1 | 1 |
| 4 | 1 | 1 | 1 | 0 | 0 | 0 | 0 | 1 |
| 5 | 1 | 1 | 1 | 1 | 0 | 0 | 0 | 0 |
| 6 | 0 | 1 | 1 | 1 | 1 | 0 | 0 | 0 |
| 7 | 0 | 0 | 1 | 1 | 1 | 1 | 0 | 0 |
| 8 | 0 | 0 | 0 | 1 | 1 | 1 | 1 | 0 |

Each such pattern could then repeat indefinitely for each 8 frames in a row. LED lighting can be quite accurately timed such that no light from a previous frame is "left over" for the next frame, apart from possible fluorescing objects which is a whole separate topic. If the conveyor belt is moving along at 5 meters/second, and a camera system is framing at 160 frames per second, the belt moves 3.125 cm in a frame time. This works out to allow for every object passing through a 25 cm length of belt within the active imaging volume to have exactly 8 separate states of the LED Band cadence take place while it is within the active volume. Thus every non-occluded surface element will be sampled, albeit with slightly different camera angles, using light from all 8 of the LED combos. As spectroscopy is a linear physical phenomena, first order production of a multi-spectral signature for some specific patch of surface can be produced by inversion of the matrix of ones and zeros above, with then a multiplication of that inversion by the acquired luminance values from the surface patch during each of the frames, where a given patch is "located" and matched to itself across all 8 frames. A Hadamard transform is used in a particular implementation, to determine the individual components by such a matrix inversion arrangement.

Further details of precisely how image data from each of the cameras is collected and processed to form both volumetrically located surfaces as well as surface 8-Dimensional multispectral values are provided in later sections. The point here is to introduce the higher-level concepts embodied within the STCM design and purpose. That 25 cm×25 cm×25 cm active imaging volume is where millions of these information-rich image ribbons and patches are produced, all over e.g. 8 frames times of a 160 fps camera system, or 50 milliseconds to be exact. The downstream explicit and implicit identification processing modules, as well as the surface QA analyzer module, all take their data feed from this STCM unit pixel-data output stream.

Specific to the explicit identification modules such as the Digimarc Barcode detection module or the to-be-described CAP detection module, the information coming from 5 cameras being illuminated with 8 different combinations of LEDs is a rich source of redundant information helpful to combat many classic distortion sources within digital watermarking proper. For luminance-only based digital watermarking, the redundancy of image viewpoints alone, along with the ability to weight certain bands of LED over others in terms of signal to noise ratios at the waxel level, provides overall boosts in the ability to accurately decode and verify watermark payloads. When either chrominance-based digital watermarking is employed, and/or microtopographic deformation based digital watermarking is employed, this additional information of multiple camera views and multiple bands of lighting are even more important for the highest accuracy decoding of embedded 1's and 0's.

One or more of the cameras can be a conventional RGB color camera instead of the previously identified black and white cameras, as the coupling of the different-spectra illumination with the different image sensor color filters yields a further diversity of data (e.g., resulting in narrower-bandwidth spectral sensing, for some wavelengths—narrower than the bandwidth of the LEDs that output red, green and/or blue illumination).

Specific to implicit identification modules, 8-band spectroscopic surface measurements can be key to nuanced identity separation (via spectral diversity) within related families of plastics and metals. Near infrared spectroscopy has a long history in recyclate processing and sorting. The STCM based approach is another way to produce spectroscopic data that has its own unique design and cost trade-offs to consider. Even without the digital watermarking advantages produced by the STCM approach, the STCM approach deserves a stand-alone trade-off study for implicit identification. In combination with explicit ID modules, we believe the STCM approach has superior properties.

Highest Level Architectural View of the Processing of Camera Data into the Object-ID-Event Streaming Spreadsheet FIG. 1 illustrates how the raw data outputs of the 5 cameras inside the STCM unit are transformed into the data-rich object-ID-event spreadsheet outputs of FIG. 4. This section briefly discusses this diagram, pointing out the primary features of the overall cadence of computational actions, while later sections drill down further on the serial-time stages and parallel-time processing that occurs inside a heterogeneous computational environment. This figure is presented first because it encapsulates the "platform." This is all about how a massive global societal need is solved via the synthesis of best practices, rather than through energy and money wasting isolation of approaches. The competition for better technology—always encouraged and inevitable—is played out on the platform real-estate field. May the best technology modules garner a place on the platform itself and resource allocations from that platform.

FIG. 1 highlights the importance of the Identification parallel stages of the overall platform. The lower part of the diagram, starting with the 5 camera data outputs, performs the image-data processing steps that A) prepare the data properly to the input requirements of any and all Identification modules, and B) construct a three dimensional data surface that post-ID algorithms will operate on, largely tasked with generating copious amounts of metadata for the identified objects. The middle section highlights the various identification modules, operationalizing the idea that any identification method should be considered and integrated if it provides quantifiable additional value to the overall platform. Then the upper section not only shows the just-mentioned metadata-producing stages, but also points out the key role of so-termed HashMaps, an approach addressing what might otherwise turn into an exponentially intractable level of computational requirements as ID-events become associated with metadata attachments. The very top of the diagram highlights the object-ID-event spreadsheet output being fed into the previously described Information-client server network. These serial and parallel processing steps are detailed in the next few sections.

First Stage Single-Frame-Time Processing of the Raw Image Data Output from the STCM The following disclosure focuses on the (8)(5) configuration of an STCM. Artisans can down-convert processing principles to lower numbers of cameras or lower numbers of LED discrete bands, as appropriate for different implementations.

Given that for an 8-LED-band configuration it will take 8 full frame times to collect all spectral diversity data from each unique surface patch of an object passing through the 25 cm^3 active imaging volume, this brings up the question of whether or not processing of the raw camera data needs to "wait" for all 8 frames of data to be collected. Though we must wait 8 frames for the construction of a final data output, this certainly doesn't mean individual frames can't begin to be processed as singular data entities. Each and every frame time, there is plenty of low-level processing that can be accomplished on not just a single camera's data output, but also on stereoscopy-based processing of surface data location and orientation which coordinates and combines image data from 2 or more cameras. Furthermore, the term "stereoscopy" is used here as just a baseline to even higher levels of the sleuthing of surface states, where even additional logic can be applied to the folding of surfaces as in origami. (Given potential advances in either or both of LED technology and camera technology, it would be advantageous to increase the frame rates to even higher than the nominal fps used in this disclosure of 160 fps; the anticipated higher frame rates would allow for redundant spectral diversity (generally from differing directions) than that given just by the 8 frames.)

As described earlier, five different cameras are all imaging the same 25 cm^3 active imaging volume, where each camera has its unique viewing angle as well as an associated nominal best focus sheet. The word "sheet" is replacing the word "plane" here, paying homage to the idea that modern lens design allows for various approaches whereby the optimal focus surface need not be strictly planar nor strictly "tilted" precisely at the angle that the sensor is tilted. This is a secondary design matter but nevertheless demands an explicit statement. Each camera's classic focal depth of field is thus a design consideration for the optical engineers that implement the lenses of the five cameras. First order approximation, with a heavy emphasis on cost-containment, would be to just use one lens design for all five cameras, a solution which is acceptable if higher effective f-number lenses are being employed (f5 and higher for example, assuming a stand-off range of the camera at 70 cm or even further). Alternatively, the five lenses can be of two or more different designs to optimize performance, e.g., to achieve better focusing performance throughout the 25 cm^3 volume while maintaining slightly lower f-numbers for more light throughput and resulting better signal to noise ratios on captured camera image data.

The immediate human-intuitive image data outputs of the five cameras is pretty much just the same object within the same 25 cm^3 volume, but with each view a bit different as in stereoscopic imaging. In our application focus of separating recyclate materials out of the range of waste materials input ranging from nicely separated to poorly separated and heavily overlapping muck, the highly redundant resulting stereoscopic baselines are inherently dealing with a diversity of imaging angles that are strongly associated to the optical concept behind glare, a.k.a. specular reflections. A specular glint from one specific surface area present in cameras 2 and 5 may not be quite as glinty in the other 3 cameras, for example. And in cases where polarization-capable cameras are being employed, such systems can enhance these differences and measure them properly, e.g., where it is expected that camera 3 will be producing unique image data versus camera 5.

Then there is the issue of occlusion of objects, and more notably partial occlusion, where for example two of the "left outer" cameras can peek behind some more elevated scrap of paper and see a plastic surface below that paper, while the other 3 cameras are occluded by that piece of paper. Another redundancy-of-5 benefit is also a classic one: more data means more ability to average and sum data together, increasing the overall signal to noise ratios in what will still be a weak-light application due to the LEDs being required to have the stand-off distances they do. The sensitivity of current-generation SCMOS (scientific CMOS) cameras will greatly help in achieving better signal to noise, but in 2020 these camera chips are still expensive even in high volume purchases. The expectation is that if unit demands press into the tens of thousands of units or more, prices will come down dramatically closer to the well-known, quite affordable pricings that have driven the mobile camera chip prices to crazy low levels.

So, back to the five cameras' data output streams, we first consider the pixel dimensions of an individual camera's SCMOS sensor. Positing an extremely modest 1K by 1K sensor gives roughly a 4 pixels per millimeter resolution with the 25 cm^3 imaging volume, and reiterating 160 frames per second, yields 160 million digitized 8 to 16 bit pixel values per second streaming out of each module camera. This number is close to 2020 norms, especially in SCMOS sensors which might have certain design optimizations for multiple digital stream outputs. Of course larger sensors (e.g., 2K by 2K, and 4K by 4K) yield still finer resolution within the imaging volume. (An illustrative sensor is the Sony Pregius IMX420LQJ-C.)

We then have five 160-digital-value-per-second data streams as our raw data pipes, where given the 4-on-at-a-time scheduler described above for the LED banks, and given a general design spec stating that any given 4-on state should maintain an overall luminance level of X lumens (X to be empirically chosen and verified), plus or minus 20%, then we find that these five data streams are just cranking out what appear to the human viewer to be just subtly flickering black and white images of the same object as it passes through its 8 frames of time on the imaging stage. Example high spectral diversity objects can be made, as test targets, whereby subtle flickering on one frame to the next, can then more clearly show that individual color regions of some test object have differing lightness and darkness patterns depending on which 4 of the 8 LED banks are turned on during any given frame. For machine-learning and Artificial Intelligence practitioners, this test-object demonstration will speak volumes to the type of information diversity and/or feature vector richness that the 8 LED cycling arrangement gives rise to. For digital watermarking purposes as well, for all cases of luminance-only encoding, chroma-encoding and microtopological encoding, the different frames will instantly convey the richer information sourcing that all can lead toward detection of then decoding of the crumpled sheets of 1's and 0's.

Focusing on the task of a first stage processor of these five separate data streams, we can state a typically-desired output-goal. In short and in words, each frame time ought to produce a coarse estimate of all of the "visible" candidate surface-elements of all objects that might be travelling through the 25 cm^3 imaging volume. "Visible" is in quotes so that we can define exactly what is meant by this term at this juncture, which is, where any single camera of the five, but most usually all cameras of the five, are probably deriving their pixel-luminance-data from such estimated surface elements. If one camera might be seeing it, then it is a candidate surface element that maybe the next frame time (and the next frame time after that) it might also sec. Along with this baseline goal of first developing a raw inventory of such candidate surfaces, we seek several other goals: estimate the precise x, y and z location of each sub-millimeter-scale candidate surface element; estimate the surface normals of each candidate surface, i.e. if one were a flea living on a given candidate surface and you look straight up, which direction are you looking; and estimate the averaged luminance value of every candidate surface element. With wider-baseline STCM modules, the cameras' collective data streams can assess the bi-directional reflectance function of a given surface, over the angles from which the cameras view the surface. In some embodiments, image streams from a neighboring STCM module are employed to characterize object surfaces that are very near the edge of one module's 25 cm^3 volume.

Using less technical terminology, the first stage processor produces a coarse guess at the 3-dimensional object surfaces, often of multiple macro-objects within the 25 cm^3 imaging volume. But at this first very early stage, these are basically disconnected surfaces, with the word "surface" being used down to even a pixel-size smallness in area. As a technical matter, however, there is really no need to connect up that vast multitude of candidate surface elements and their associated listed properties of the previous paragraph. A simple tabular listing of the inventory (e.g., in Excel spreadsheet form) will do. An expediency step can be added wherein a listing of near-neighbor surface elements is added to any given surface elements, which then relies on the idea that each and every surface element has been given a unique serialized identity, something which is already required as a raw programming necessity. Thus, element 3472948 might include metadata fields which say that elements 3374746, 3484636, 3528475 and 2567483 are its four closest candidate surface elements it. These neighbor/buddy fields are always calculable in later stages of processing, but again for expediency, such a list of neighboring elements can be compiled even in a first stage of processing.

So the output of stage one is a synthesis of the five camera feeds into a derived listing of candidate surfaces. For the time being, we will posit that these surfaces are quite small, generally being at the same physical scale as one pixel itself in one of the cameras. Additional per-element tabular data can specify which cameras saw which surfaces, listed as simple 1 through 5 camera encodings for example, where if a given camera probably contributed to the listed attributes, then its number is present in the listing for any given candidate surface. One can appreciate that this gives rise to a massive amount of redundant data fields, ripe for compression. Implementation must thus consider what additional performance gains can be gleaned by the cost of calculating and storing all these metadata values. Other per-element tabulated data can include quality metrics such as that cameras 3 and 4 got glint signals on this patch and were thus not good contributors to the estimated surface attribute metadata. Perhaps an implied point of this paragraph is that once an overall surface candidate listing has been generated with some fixed number of inventory candidates within some given frame-time, then all sorts of additional calculation and fields can be attached to those listings.

In short, decades-old stereoscopy and the more recent Pose estimation techniques (both those of the applicant as well as from other sources), form the basis on which the present technology estimates the surface configuration. The earlier-cited patents give various examples of how images from differing vantage angles can produce 3-dimensional surface estimation. Other than the important sub-topics of partial surface occlusion, already discussed and discussed in subsequent sections as well, and generic crumpling and filthiness, most of the basic approaches to 3-D object modeling are well covered in the prior art. See also the cited "Thingerprinting" work, such as U.S. Pat. No. 9,269,022. Likewise, U.S. Pat. No. 9,858,681 on so-called "freckle transforms" also represents an important prior art for the generation and estimate of metadata for these candidate surface list outputs of the first stage processor. And as a very generic statement about the physical processing basis of these surfaces and their metadata, both "the cloud" as well as commercially-available GPU/VPU/TPU/FPGA/ASIC boxes will no doubt provide engineers with interesting cost/performance trade-off studies. For example, 2019-era commercial offerings such as Nvidia's Titan RTX and Titan X, and similar GPU/TPU offerings, are well suited for these rather complicated operations above. Likewise the Intel Movidius Myriad X VPU provides vector processing capabilities that are well suited to processing multiple camera feeds of image data. All in all, 2019-2020 offers several competitive approaches to processing these five 160-data-values-per-second sources to produce and coordinate these higher-attribute-level "pixels" which are effectively primitive surface structures in 3-dimensional space.

Much of this section delved into the subtleties and considerations involved in single-frame-time processing of the five camera images into a single output. For the sake of clarity and conciseness, this paragraph summarizes the specific steps and the specific output of the single-frame-time stage. Five cameras output their 1K by 1K images into a dedicated stereoscopic processing unit which has been modified to accept five images from differing angles rather than the classic two images. Each pair of two-image combinations is fed into a classic stereoscopic image creation function; the pairs being 1-2, 1-3, 1-4, 1-5, 2-3, 2-4, 2-5, 3-4, 3-5, and 4-5, where the numbers correspond to a camera in the set of five. This gives 10 raw 3 dimensional surfaces from each pair, where the luminance value assigned to the surfaces can be the average value of the two cameras (or in the case where one of the two pixel values from each camera has glare, then the non-glared value can be chosen, and where both pixels have glare, a saturated value of 255 can be placed into the resulting surface luminance value as a flag that both pixels had glare). These 10 surfaces all have Z-axis height coordinates as a result of the stereoscopic routine. A local-integrity analysis of these Z-values should be performed on all 10 surface outputs, with then a mask being developed for each of the 10 surfaces denoting where said surface has lower than a thresholded level of integrity (e.g., due to glare). With masked areas then ignored, a 10-surface average surface is then constructed from the component 10 surfaces. A so-termed "minimum albedo" is then assigned to the final thus-constructed surface as its output luminance value, where the lowest valued pixel-luminance from the five cameras is used as the assigned value. Given proper masking routines as above, occlusion of some surface A by some other surface B being in front of surface A, as seen by one of the cameras C, should be pre-mitigated by such masking, but the practitioner is encouraged to verify that these occlusion-conditions are not negatively affecting this choice of the minimum albedo values. The output structure of this single-frame-time process is therefore an X-Y-Z-L valued array of 1K by 1K. The X and Y variables are inherent to the memory addressing and can be exactly co-registered to the 1K by 1K imaging array locations of the central camera of the five cameras. Advanced stereoscopic post-processing routines can be considered which can refine the X-Y-Z values such that the X and Y values have very minor, often just sub-pixel shifts in their locations as their Z values move closer to and further from the belt. For ID modules (to be later described) such as digital watermarking, these sub-pixel refinements can lead to increased read rates of the watermarks. Standard interpolation methods should be applied to the fractional X-Y values, reprojecting a "final output surface" back onto a uniform X-Y grid back-projected onto the surface of the belt. So even if this advanced stereoscopy refinement is used, the output of this stage one remains a 1K by 1K array of minimal-albedo values (e.g. 8, 10, 12 or 16 bit values) and a 1K by 1K array of Z values, or heights above the belt, also with a bit-depth commensurate with the accuracy of the underlying data.

8-Frame-Time Processing of the Single-Frame First Stage Output into a Second Stage Output At 160 frames per second, and a conveyor belt running at 3.125 cm per frame any given object or objects will pass through the 25 cm^3 volume in precisely 8 frame times, letting all candidate surface elements experience all 8 discrete LED on-states. Each of the individual frame times will pump its five camera data streams through the first stage processors, producing 8 candidate surface lists with their 1K by 1K arrays of luminance values (minimal albedo) and Z values. (It should be noted that though the belt itself is moving 3.125 cm for a given frame time, the strobing of the LED elements will be at a much shorter time frame than the $1/160^{th}$ of a second for the frame-period itself. Typically for objects which are anticipated to have so-called waxel sizes of 40 waxels per centimeter, this would indicate an LED strobe time, or on time, of approximately 50 microseconds. To best prevent motion blur, still shorter exposure increments are desirable, such as exposure intervals below 15 or 10 microseconds.)

As with the disclosure on the first stage, we can begin discussion of the second stage by describing its goal: Sort through the 8 frame-times worth of candidate surfaces from the individual frame-times, and then create a master surface candidate list that includes A) grouping the stronger candidates into "relatively verified" well sampled surface candidates, and then B) a sub-tier of less verified candidate surfaces that may have been subject to a large amount of occlusion or constant glint/glare or very low contrast dirt, but that nevertheless hold potential information for the to-be-discussed Deterministic and Probabilistic Identification parallel stages, and C) a discarded or weaned list of candidate surfaces which were very tentatively covered in a few of the frame times but which did not make the cut on being well sampled over the full 8 frame-times. List C can be stored as a simple mask, say with value set to zero, while list B and A can also be part of the same mask, with list A having a value of 1, and list B having values (weights) between 0 and 1 all depending on their measured quality. So master lists A and B can actually be combined into one single master list where a quality/quantity set of metric fields captures the relative information quality of each surface element on the master list. The "LED phase state" of each surface on the master list can be estimated and stored in this second stage output list. Further details on this metric are provided below, but as a summary, one can appreciate that any given surface enters into the 25 cm^3 volume at some particular frame time which is a modulo-8 frame time of one of the 4-on LED states, and furthermore that such surface element might be closer to the very edge of the 25 cm^3 volume and other might be almost 2.5 cm into the volume at the nominal center of the frame exposure time of all the cameras. Certainly the modulo-8 index is a central parameter for 8-channel decomposition, but even the placement of a surface within a single-frame slice of volume [which is a 3.125 cm (along-belt)×25 cm (cross-belt)×25 cm (altitude from belt) volume] can be an important "LED phase" parameter that at the very least, machine learning neural-net implicit-identification later stage processing can take full advantage of (as they say: just more dimensions on the feature vectors which will generally be 100's or 1000's of dimensions in size, as can be desired in machine learning).

Similar to the first stage, the original second stage list of surface candidates gets additionally refined in signal to noise ratios on the individual metadata elements, and it proves wise to calculate neighbor-index meta-data. Indeed, in the nitty gritty processing of "master surface candidates" from 8 individual frames worth of single-frame surface candidates, the very nature of imaging will dictate that whereas one candidate surface during frame N may be precisely located over some pixel Z in that frame, the same physical surface might be at a half-pixel offset 125 pixels away and its independent surface estimation first stage processing assigned several surface element IDs to the very same surface, merely because its center was at a half-pixel location rather than whole-pixel. Such details will only matter to algorithm engineers working these very subtle issues, but digital watermarking specialists understand that one-tenth-waxel deviations are a typical threshold for where digital watermark payload reading quickly begins to decorrelate, and hence frame to frame slight changes in the underlying candidate surfaces need to be tracked, all producing one final surface candidate center-location which is made up of a grand mix of 8 underlying surface locations (x, y and z, all three).

Using slightly less technical jargon then, the second stage produces a master list of surface candidates after all 8 frames have weighed in. There still is no notion of "objects" yet, just a million individual surface element candidates that themselves have some noise present in their x, y and z location values.

Recall that each of the 8 frame times produces two 1K by 1K arrays, the L (luminance or minimum albedo) and the Z (height) arrays. A third 1K by 1K weight mask array can also be (and generally should be) assumed, with the above mentioned 0, 1 and something in between coding scheme. Call this latter array the M-array for weighted Mask.

As the ninth frame in a camera sequence begins, this means that 8 frames of image data were taken for the 3.125 cm by 25 cm swath of belt that is now proceeding out from the 25 cm^3 imaging region. We have collected all the optical data we need for this strip. So these 8-frame. 3-array outputs must now be combined into a 25 cm by 3.125 cm strip-surface. This strip surface final output will have an x-y array of 128 by 1K if the x is the along-belt axis. The output arrays of this surface will be 128 by 1K in its XY dimensions. There will be an M-array, a Z-array, an L-array for combined luminance, and then 7 "channels" of spectral data which are re-composed from the specific 8 combinations of LEDs that were on for the specific frames that applied to the specific 3.125 by 25 cm strip.

The 128 by 1K M array is primarily constructed from the individual M-arrays of the individual 8 frames. If pixels from all 8 frames of M-arrays had 1's for "good data," these pass through as 1's in the final 128 by 1K M array. Pixels with a few, up to 8, 0's in their individual frames ought to take on a 0 in the final M strip-array. Then pixels that had some combination of 1's, fractional values, and perhaps only 1 or no 0's can become some empirically determined value between 0 and 1. These Mask values will be utilized by a variety of later stage processing including the ID modules and the metadata image processing routines.

The 128 by 1K Z arrays are straightforward averages of the 8 frames, with the additional consideration of not using values that might have zeros in their mask values.

The 128 by 1K L array is generally a straight addition of the 8 individual frames, with similar exclusion of poor-mask values. Purists will note that though this is now strictly "luminance" in the human visual system sense, it is nevertheless the best representation of the overall albedo value of a surface. Luminance as a word is used in a colloquial manner so as not to get too pedantic.

The spectral channels, in short summary, are applying the inverse matrix equations of table 1 (or table 2, if that sequence is chosen) above which summarized the LED on-states as a function of frame time. The "LED phase" mentioned above lets one know which "row" of LED lights goes into the top of the 8 by 8 matrix, followed by the next frame and the next until all 8 rows are filled. This matrix is inverted. Each and every pixel then has their 8 L values from 8 frames multiplied by this inverted matrix. The result of this multiplication is the estimated amount of albedo for a given pixel (surface) as a function of each LED band. Each band could have been pulsed all by itself and found similar answers, but for both redundancy purposes as well as 4 times more light, this Hadamard approach to strobe lighting, with subsequent Hadamard re-composition of the band albedos, was chosen. The "average" of the 8 bands is generally then the L value for a given pixel. As with "chromaticity" being broken out from luminance in normal color cameras, this disclosure also splits out the L additive channel, where then 7 channels remain, which the earlier-cited Spectra ID patent document calls spectricity channels, which we will here refer to as S.

Thus stage two creates 10 individual 128 by 1K arrays: the M array, the Z array, the L array and the seven S arrays. Relative Stillness Versus Some Proper Motion of Objects as they Pass Through the 25 cm^3 Volume There are many additional nuances involved with the best and optimal creation of second stage candidate surface lists, some already covered and others still to be discussed, but there exists one nuance which for many and most real-world implementations of this technology somewhat demands attention: objects in many instances will simply not precisely follow with co-motion of the underlying belt. In lay terms, stuff is jostling and slipping and tumbling as an object, or some glom of objects, passes through the 25 cm^3 volume.

The interval of 8 frame times within a 160 frame per second camera system represents $\frac{1}{20}^{th}$ of a second. This is a very short time frame relative to some motion of a physical object. In camera imaging terms, this means that "raw frame-rate-steady translation." or more plainly "surface candidate x-y-z location shift" would be the main effect that one expects for some object even in high relative motion in relationship to the belt speed. Over 8 frames, this shift will for all intents and purposes be a constant. Possibly a few degrees of rotation might manifest itself over 8 frame times. It also should be clearly stated here that "pixel motion" of an object as projected onto the pixels of each camera will differ as a function of the height of a surface above the belt plane. A surface at the plane of the belt will have a lower "pixels-per-frame" rate of movement greater than a surface at the top of the 25 cm active cube, with surfaces in between being in between those two extrema. This projective optic effect is likewise "constant" in relation to a flat object, while it may be an appreciable level for algorithms within later stage processing where synthesizing integral objects become more of the processing task within classic image segmentation norms. An object with appreciable Z-axis extent will likely exhibit a varying degree of "pixels-per-frame" movement, and thus finding that movement becomes more evidence that some group of pixels belongs together to constitute one integral object.

So for the primary "constant motion" of the candidate surfaces across 8 frames, and for some object which covers some >1 cm by >1 cm projected area onto the five cameras, it can be appreciated that a simple fudge factor can be present within the second stage processing engine which effectively builds in a slop condition that as all 8 frames are assessed in then synthesizing a final surface estimate, in certain cases large connected regions of surfaces might exhibit this en masse motion of their x-y-z single-frame values. The same logic previously discussed on how the micro-differences of surface centers between frames can nevertheless synthesize into a final master surface, can likewise find a small-region x-y-z common translation parameter, which also makes use of typical patch stereo-matching algorithms common in video motion processing. There is no intent to trivialize this technical challenge, but there is even less reason to believe it will not be possible to include in stage two processing routines.

Qualification and Pruning of the Stage Two STCM Candidate Surface List

Subject to further details below on the various clients to which the stage two STCM output list are fed, there is nevertheless a common "not desirable" number of potential surfaces (now reduced to simply pixels that have "height" and other properties) on that final list that simply no downstream identification platform or surface qualification modules will ever care to be bothered with. Leading the list on non-desirables is of course an image/surface estimate of the very conveyor belt itself. Bear in mind that the "edge location" of a camera-image of the blank belt will definitely be of importance to later stages, since such edges will probably fix the location of where some object's edge starts. It is simply the blank belt's pixel values and height values themselves which are of little information value. Added to this baseline pruning list can be isolated surfaces that do not connect up very well with other candidate surfaces closer than a few millimeters away. Oftentimes next-stage algorithms may make use of certain gross features of these otherwise little-information surfaces, such as histograms for example. Similarity, e.g., in color histograms, is evidence that two surfaces are from a common object; absence of similarity indicates the opposite. This list can further include surfaces which may clearly contain obvious dirt, smudges, blurring artifacts or other "common sense" poorness metrics where it can be clear from the simplest of image processing routines that surface corresponding to these regions will simply not be usable by any downstream processing clients in the overall identification platform. This brief section simply points out that such standard housekeeping applied as a final stage within stage two, the cleaning out of list items that will clearly not be useable downstream, is a recommended step of the preferred embodiment. (And, it should be noted, if certain advances are made in probabilistic identification technologies such that these heretofore little information patches all of the sudden have a higher level of information than previously thought, then such surfaces and stage two output data items should not be pruned.)

So for one final summary on stage two, stage two output of the STCM unit is a cleaned list of rich metadata surface candidates, where their general lateral extent is on the order of one pixel as measured by the pixel scales of the five cameras. Due to some allowance for partially occluded objects, there may and often will be a few x-y element points which have 2 or even three z-level surfaces. Given that we have posited 1K by 1K detectors in our cameras, and 160 fps on a 5 meter/second moving belt, this give a frame-time slice of data at about 1K cross-belt, and 128 pixels along-belt (in the direction the belt is moving) or up to about 128K qualified surfaces per frame coming out of the STCM stage two, and about only half that number if the belt is only 50% occupied by actively separable recyclate objects. Byte wise, a given surface element thus being qualified and having some dozens of fields of associated metadata gives another dozen to two dozen bytes of information per list item in a verbose non-compressed version, but is compressible down to a few bytes per surface especially if the x-y coordinate of the surface have no need for explicit storage, being instead just innate to their indexing scheme as is typical in a digital image. We can safely say there are roughly 8 bytes per object list item and 64K list items per frame, or a total of 512K bytes of data per frame. At 160 fps, this gives a 80 Mbyte output flow from stage two of the STCM, a rather modest number in relation to some subsequent processing requirements that some of the platform downstream modules will be attempting to digest and process.

From a simple programming and efficiency standpoint, applicant suggest that the M-array is again utilized to signify these so-called "low or no information value" pixels/surfaces. Applicant suggests placing the value of −1 in the M-layer for such pixels, with most such values corresponding physical situation that the cameras were essentially imaging the background belt. Other values such as the Z, L and S arrays can all be left intact as an insurance policy. (In some arrangements even the analysis of the blank belt images can be used, for example, in camera calibration studies.)

The Deterministic/Probabilistic Identification Platform as Parallel Stages—Stages Three-A and Three-B Further processing of the stage two output lists, prior to the ingestion of those lists into the formally defined parallel stages of either deterministic or probabilistic identification, is usually dictated by which processing steps are common to each of these processing engines, and which are unique to one or the other identification processing engine. We first formally define these stage three parallel processes, and then discuss their preferred initial-processing of the stage two output lists. It will be seen that there will be common processing for both of these engines.

The bifurcation of stage three "identification of candidate surfaces" into deterministic and probabilistic tracks facilitates incorporation of additional identification processing engines, as they become available. As will be appreciated, many identification approaches are available. The present technology can use methods including: optical and near-IR probing of surfaces, coupled with spectral diversity, metrics on surface texture, glint and matte properties, and topographical shapes. All such properties can be gleaned from the output of the STCM and its first two stages. Indeed, given any specific identification algorithm that might be conceived, a large percentage of such new approaches will find deficiencies in the previously described stage one and stage two of this disclosure heretofore. This is not a problem at all, as such new pre-processing requirements of the raw camera data can simply be treated as add-on requirements to those earlier stages.

An example illustrates the point. Imagine a given probabilistic surface identification algorithm makes use of "connected corners" as part of identifying a certain type of PET plastic specifically in objects such as bottle caps. This algorithm might have some Gigaflop budget implication on the probabilistic identification parallel engine. The issue is that ideally some 25×25 kernel array of pixels should be performed, ideally in stage one, which has not been integrated yet into stage one. No problem: the necessary image processing is included in the next revision of stage one processing, and additional metadata fields are defined to convey results of such processing. We might call this new set of information the E-array, for some extra new processing layer that is covered by the M, L, Z and S arrays. Such metadata, in programming language terms, points to stored results of this new image processing. Some group of nearby surfaces then winds up pointing to similar results, and stage two surface list processing likewise are allowed to "average" these individual frame results and present higher signal to noise "connected corners" metadata that better applies to the 8-frame final resultant lists. This new fairly specific module within the implicit identification processing thus utilizes this information while other modules within the implicit engine and all the modules within the explicit engine all general ignore such metadata fields.

This example illustrates how the platform concept not only applies to intra-stage-three modules, but how such new platform modules affect upstream and downstream "next versions" of stages one and two, and perhaps stages four and beyond.

As the title of this section states, stage three is bifurcated into a deterministic identification engine and a probabilistic identification engine, running in parallel (with anticipation and support for cross-piping of interim results both intra-engine and cross-engine).

Deterministic Identification refers to all instances where some object has been proactively marked and/or encoded with a data symbology, including digital symbologies of 1's and 0's. It thus refers to anything that can either be decoded or otherwise recognized as a symbol, such as text, numbers, pictograms, logos, etc. It also can be overtly visible to humans, or covert such as in digital watermarking, highly-explicit taggants, infrared-illuminating barcodes or fluorescent markings, etc. In short, deterministic identification entails the explicit decoding of symbols, be those symbols 1s and 0s or alphanumeric or pictographic Probabilistic Identification is the logical inverse of deterministic identification: the set of all material surface identification methods which do not involve the decoding/reading of data symbols, visible, invisible or otherwise. Simple examples might be the near-infrared spectral characterization of surfaces and the matching of such measured data to material families having those characteristics. Broader-band taggants or spectral inference are also included in these implicit methods. Perhaps most important are machine-learning/artificial intelligence approaches to image analysis. For example: certain parallel ridging textures, with various shades of red coloring and having sizes within 5 cubic centimeters might thus "train" a machine learning set-up to recognize specialized plastic caps. Brand-specific textures and colors can be used to reach >90% recognition rates for a wide range of packaging types provided one is economically capable of training and storing a library of visual feature vectors associated with certain families of materials.

Subsequent sections detail illustrative identification modules, placing each into one or the other category, and elucidating their properties.

Panes and Ribbons: The Two Basic Forms of Inputs for the ID Modules of Stage Three FIG. 1 shows that there are only two basic forms of generic input to the wide variety of ID modules, be those modules of a deterministic or a probabilistic sort. "Panes" refers to turning the X-Y-Z-M-L-S surfaces as output by stage two, into an artificially created, synthesized 2D "camera view" of that surface, such that both existing and upcoming ID algorithms can just operate as if they are receiving the output from a single camera. This is an application of projective geometry. One can see in FIG. 1 that basically all ID modules, other than the to-be-described Coiled AllPose HyperSep ID module, are expected to accept these "pane" geometric transformations of the stage two XYZMLS arrays.

In some such arrangements, a 3D depth-draped image on a surface is created, using multiple images from several cameras. In other such arrangements, 2D panes are created via projective views of a surface, with mitigation of surface-normal luminance variations.

In a particular embodiment, the multiple camera imagery is synthesized to estimate a 3D representation of items on conveyor—preferably in multiple spectral channels. Each surface in the 3D representation has a surface normal. These surfaces are virtually flattened to create a 2D representation that can be submitted for payload extraction, e.g., by a digital watermark detector. This is done by distorting each tilted pane so that it is virtually restored to a plan presentation, i.e., a planar surface parallel to a virtual sensor plane. A cosine-based expansion of data can be employed. If a 3D surface pane is inclined at 20 degrees, it is expanded in the 20 degree tilt direction by the inverse of the cosine of 20 degrees. This is done for all surfaces—like smoothing a crumpled piece of paper and restoring it back to its original size. (Analogous to inverse origami—an unfolding process.)

Stage three can additionally tailor different synthesized panes to different detectors. For example, different spectral bands have different usefulness in conveying data, depending on the encoding technique. In a chroma watermark (e.g., as taught in U.S. Pat. No. 9,245,308), the cyan-magenta axes convey most of the signal. The different spectral bands of captured imagery are combined in a weighted relationship appropriate to decoding such a signal. For example, if a first color channel expresses the encoded information with a 10:1 signal-to-noise ratio, and a second color channel expresses the information with a 20:1 S/N ratio, then the two channels can be weighted in a 1:4 ratio, respectively.

To the extent that the Z-values of these 3D surfaces indicate folding, crinkling or bending, then stage three desirably applies a local inverse transform that counteracts such distortion—such as the correction of tilt by a cosine function as just-described. Where a 3D surface is found to have some curvature to it, then the 2D pane derived from this surface is processed to mitigate the curvature, e.g., by appropriate sampling. For a curved cylinder, for example, the sampling can slightly tighten in the spatial domain as the sampling curves around from the center of the cylinder to its sides. Such de-warping, when producing a 2D pane, can provide significantly improved recognition (e.g., watermark decoding) results. The so-called "clean sheets of waxels" laid down in the marking process of objects can be partially restored via 3-D surface projective paning.

The later described Coiled All-Pose ID module expects a very large number of 31×11 ribbons of surface data, e.g., excerpted from such a 2D plane.

The Commercial Digimarc Barcode Marking Benefiting from the STCM

Use of the Digimarc Barcode technology in recycling has been described earlier. This disclosure now turns to how that explicit identification technology can benefit from the richer optical data sourcing inherent in the (8)(5) STCM arrangement.

We start with raw numbers: as an object passes through the 25 cm^3 volume, five cameras will be taking 8 independent frames of image data covering most upward-directed surfaces on that object. That is 40 individual frames of image data. Classic filtering and image processing 101 principles can all be applied to this simple math here, producing better pre-processed imagery input to the Digimarc Barcode reading process. Logical principles can also be applied to effectively throw out and/or weight various frames of data matched to specific object-surface candidates, such as throwing out specific frames that might have heavier glare on some specific patch of the object—present in some frames, but less present in others. Texture-contrast algorithms applied to small areas of an image, as is already done in digital watermark reading software, can be applied to individual frames of data and the spatially-local results added as new metadata fields in the surface lists, then later used on these 40 frames of data to "rank" some frames over others in their combinations into one or several image data set presented to the Digimarc Barcode reading software.

For chroma-encoded digital watermarking, and for micro-topologically encoded digital watermarking, the object-surface information contained in the STCM data streams is radically richer than a straight white-light/color camera prior art set-up.

The 8-bands of the LED illumination open up an entirely new set of encoding dimensions for chroma-encoding in particular. The bounds of these dimensions will largely be on the material-marking side; for example, on CMYK inks where inks on surfaces will generally be using cheap existing commercial solutions. But this need not limit future cases where relatively inexpensive new types of inks can be specifically deployed for recyclate sorting purposes, say for example a 5-ink printing solution or even a 6-ink solution, for specific high-economic-value items. Imagine for example that some global brand company wishes to really shake up its marketplace by introducing some new "hyper recyclable" package, and in so doing, they are willing to print their packaging in five inks rather than the usual four (or less). Such specially marked packaging, aimed specifically toward higher recyclability, would still look identical to consumers (or possibly even a bit "fancier" if the color gamut range is extended with the special inks). But to the STCM module, its spectral diversity after 8 frame periods of "4-on" LED pulsed frames would present a whole new dimension in identification and proper sorting. As nature illustrates, if some new ability to sense information is developed, then not soon after there will arrive new forms of objects showing up which are intended to stand out and exploit this new ability. The STCM is precisely this type of new perceptual window on the universe of fast moving garbage on a conveyor belt. And companies can exploit that new window to their commercial advantage.

For microtopologically-encoded materials and their surface textures, the STCM data streams are likewise an important advance over the white light color camera existing art, opening up a similar new data channel once the details of surface-topology reflectance are fully accounted for. See applicant's earlier-cited patent documents and U.S. Pat. No. 8,565,815 for details on how light interplays with object surfaces so-encoded with digital watermark signals, and how camera systems can attempt to properly account for and decode this new realm of 1's and 0's surface encoding. With now 40 frames of data typically on a single surface, with each frame being slightly differently-viewed due to different camera angles and different lighting angles, the table is set for full modelling on how any particular topological shape (dip, dig, dimple or micro-mound) on an object surface manifests itself as a 40-frame signature. Not only will this assist in the pre-processing of image data for ingestion into the Digimarc Barcode standard reader, but it also is a rich feature vector suitable for detection and identification by a suitably-trained convolutional neural network, or other machine-learning architecture. Additional details follow in later sections. For camera arrangements utilizing polarization-capable sensing, additional surface topology features should be measurable due to the underlying physics of plastics and their polymers.

This section notes how STCM data improves current 128 by 128 waxel, tiled-block approaches to detecting 1's and 0's presented in substantially-planar regions on various objects. As the cited patent documents describe, such 128× 128 waxel arrangement commonly employ two components—an encoded payload component, and a reference signal (which serves as a watermark-existence beacon as well as an orientation guide). Such arrangement is well suited where imagery is subjected to fairly modest geometrical transformations such as scaling and rotation, later morphing into curved packaging and oblique presentation of objects to cameras. But as the Chapstick tube discussion pointed out, the 128×128 reference signal arrangement shows its limits when the crumple transform enters the operational envelope—the crunched, crumpled dirty water bottle that presents only small, isolated, fractured islands of signal. The next section introduces a new candidate guide signal that is tailored to the recyclate-sorting application. This new guide signal is aimed at much smaller regions than a 128×128 guide signal is intended for, aiming toward typically sub 5 mm rectangles.

The "HyperSep" Hexagonal Guide Signal and Coiled All-Pose Detection of Such, Set within the Recyclate-Sorting Application Space This section's title borrows from a phrase used in the 2016-2019 Holy Grail project sponsored by the Ellen Macarthur Foundation, namely "hyper separation." The Holy Grail project aimed high to advance the state of the art in plastics recycling, and this specification seeks to continue that caliber of work in service of the Foundation's aims. We respectfully adopt the "HyperSep" name as an adjective to characterize a new type of digital watermark signaling structure—and associated signal decoding regimen—that is motivated by the recyclate-sorting challenge.

We hope this signaling approach will eventually become ubiquitous. But that may take decades. Thus, much of the specification concerns other aspects of the recycling platform, which can be profitably used while waiting for HyperSep approaches to incubate and proliferate.

FIG. 8 presents a very specific candidate guide signal based on 16 vertical by 14 horizontal hexagonal cells, where about half the cells are black and half are white. This serves as a squarish-block that can be tiled with other such blocks to the top, left, bottom, right—forming a quilt of arbitrary size. This is an illustrative signal that can serve as the HyperSep guide signal. We term it "HyperComb" internally.

Other such signal blocks are certainly possible, as shown in FIG. 9. This figure shows a screen shot from program used to study candidate guide signals along with aspects of Coiled AllPose processing that would be based on such signal patterns. Indeed, one could choose a hexagonal macro-block of underlying hexagons, as opposed to the 16×14 blocks we have chosen, and then tile these hexagon blocks, but various programming considerations make 16×14 blocks the choice used in the following discussion.

The physical manifestation of this block is about 3 mm by 3 mm, which encompasses 224 hexagonal on and off elements. (Applicant uses the terms "on" and "off" here instead of 1's and 0's in order to distinguish this guide signal from the co-existence of an encoded payload signal.) Larger or smaller blocks can naturally be used, but 3 mm by 3 mm suits the present need due to factors including A) camera-pixel-scale assumptions, B) materials-encoding principles especially with microtopological encoding, C) consumer and package designer aesthetics considerations, D) processing-load considerations of a detection system, and E) sufficient informational diversity considerations represented by the 16×14=224 independent "bits" of the black and white regions. To this last item, the specific choices on which 112 hexagons are white and which are black is very explicitly a unique spatial signature, highly distinguishable from "random surfaces" once you tile these things over centimeters and tens of centimeters of surface area. It is this "flipping of coins" at precisely known locations, always subject to high noise perturbations, but as detailed above, once one counts 1000 coin flips or 10,000 coin flips over some local region of a crumple-transformed object, the power of the binomial distribution eventually shows up and a detection system can A) begin to get higher and higher confidence that a HyperSep object is present, and B) begin to stitch together the highly torn-asunder phase islands that once was a nice clean sheet of 1's and 0's (the payload signal variety), and then properly decode the payload that precisely identifies, with near 100% certainty, what exact type of materials that identification code is riding on.

This last paragraph indirectly introduces the notion that just as with the current Digimarc Barcode standard of digital watermarking where there are two separate signaling structures, one for the payload (1's and 0's) and the other for existence/orientation (sometimes termed the reference signal), so too with HyperSep there will be these two separate signals. The hexagons of the fundamental tile are co-existent with the generally larger areas (larger than 3 mm by 3 mm) which make up the signal specifications for the payload signal. For classic 128 by 128 digital watermarking tiles of payload 1's and 0's, the manifested physical extent of such sheets of 1's and 0's approach and sometimes exceed 5 square centimeters or larger. The illustrative HyperSep embodiment utilizes precisely the same 128×128 signaling definition used in the Digimarc Barcode technology. This means that the HyperSep payload signal is defined on a scale much large than the HyperSep guide signal.

This brings up a subtle but important point: the tight 3 mm×3 mm structure of the HyperSep guide signal is aimed at letting a detection system know that a HyperSep object is present, and provide initial clues of the basic crumple-transform parameters characterizing the crumpled surface presented to the five cameras, each producing 8 frames over the 25 cm^3 volume. It then becomes the payload-reading algorithm's job to fine tune the phase-fracturing structure of these much larger 1's and 0's payload sheets, still assisted by the very weak signals present in the HyperSep hexagons, but ultimately guided by distortion-resistant spread spectrum payload signal decoding. So though the hexagons of the guide signal are specifically designed to be weakly detectable down to an approximate 3 mm by 3 mm block size, the decoding of the payload signal will still require piecing together and phase-defracturing some small accumulation of the fractured phase islands. For payload bit-levels of 100 bits or even more, one still requires at least about 1 square centimeter of total-integrated-area for clean payload decoding on rather-less-crumpled samples, and possibly several square centimeters of jumbled islands for more distorted and crumpled objects.

FIG. 10 further clarifies. In the enlargement to the right of this figure we see a very small but representative set of 31×11 pixel ribbons that are well placed to get higher correlation values over their particular regions of a HyperSep marked surface, where such ribbons are solid in their outline. They are also exaggerated a bit beyond their true 31×11 pixel area. Other ribbons may not have high correlation values because either the object is too distorted or they straddle phase-fracture zones which inherently de-correlate signals, but these are not depicted in the figure. All it usually takes for the first inklings of a fuller detection sequence is for some small set of these ribbons to produce correlation values higher than some threshold, and then checking to see if these ribbons indicate the same rotation states (within an empirically-determined threshold error tolerance), and likewise indicate consistent translation states. If so, a candidate signal is likely present and worthy of further pursuit.

Some objects may be folded so that one surface fragment may take on 20°. 30° or larger rotations relative to other surfaces on the object, but the present disclosure concerns itself with crumpled surface fragments that are within 10 or 20 degrees of rotation of each other.

In detecting a single 31×11 ribbon of the HyperSep guide signal, a detection (correlation) threshold may be set at a level that yields a high false positive rate, in isolation. But when combined with several other such detection events, an arbitrarily-small false positive detection can be reached. (If a single detection event signals a 50% probability that a HyperSep signal is present, then 2 detections signal 75% confidence, and 3 together are correct 87.5% of the time. 99.98% confidence is achieved with 12 such detection events.) If an initial ribbon is detected, this triggers examination of surrounding areas of imagery to see if other detection events, indicating consistent rotation and translation, can build the case for a >99.99% (typically) detection of the HyperSep guide signal. If some of the ribbons have higher correlation (with a 31×11 excerpt of the HyperSep guide signal pattern) than the threshold value, then a smaller number of detections can establish 99.99% confidence.

In FIG. 10 it can be appreciated that even if many of the elemental ribbons are not producing good correlation signals, the few that are producing good signals also reinforce the statistically unlikely coincidences of rotation and translation states of those detections. A data structure (e.g., table) can set out empirically-determined combinations of (a) ribbon detection counts, (b) correlation values, and (c) similarity in rotation and translation, that collectively indicate a confidence level of 99.99% (or whatever value is desired for a confirmed detection event). If lower ribbon correlation values are observed, then more detected ribbons are required. If the indicated rotation states are tightly clustered, fewer detected ribbons are required than if the rotation states are further dispersed. Etc. A confirmed detection event is then associated with gathering metadata values of the orientation/translation coincidence values, and these values then seed first attempts to start to defracture the phase zones and attempts to pipe the appropriate individual waxel locations into a payload decoder stage. A current embodiment of this defracturing process, and proper alignment of waxel locations for payload decoding, are discussed below, but it is anticipated that as crumple-transformed objects are experienced at more mass scales, these defracturing techniques will most surely evolve and mature. Ultimately there will be a friendly battle between human-designer guided algorithms for doing this defracturing versus just machine learning feature-vector oriented decoding. The latter approach is expected to be the preferred implementation by the 2030 timeframe.

The presently-preferred defracturing approach (which we term micro-phase locking) proceeds by acknowledging that, on a very small region basis, the guide signal (sometimes termed "grid") can wander off from the large 128×128 estimate that early stages of classic digital watermarking produce. Techniques are employed to more finely track phases of the waxels locations before the oct-axis output values associated with those locations were piped into a spread spectrum decoding stage. Such techniques need to advance to a slightly more sophisticated form, fully cognizant of the crumple-transform vagaries. Most notably, that one needs to downright expect phase fracturing on relative small sub-square-centimeter regions. So these earlier techniques which often assumed somewhat gentle curving of waxel-phase sheets, must now be adapted to expecting phase breaks and thereafter identifying where such breaks might be, and then subsequently weighting certain waxel location to literally "zero" right at those locations where a break occurs and thus the waxel values at that location are probably much more noise than signal. A literal Voronoi region approach can be both envisioned and utilized to try to corral these pockets of phase coherence. The techniques also need to adapt to the notion that there will wind up being some pseudo-elliptical, and sometimes just polygonal, region of phase stability within that region, and the task of these micro-phase locking algorithms are not simply to identifying fracture-border outlines, but to also estimate the precise waxel-phase that exists inside the thus-measured sub-region shapes. The phase islands are thus defined and their specific phases identified. One useful and largely accurate assumption built into a modestly crumple-transformed object is that the phase-islands are far from "completely random." They instead simply have folds and breaks of only a few waxels, and that the large sheets of 128×128 1's and 0's can be recognized when one views square inch level regions and even larger. In this way, the microphase locking algorithms can get reinforcement of signals from surrounding islands, and, through classic iterative-type algorithms, neighbors A, B and C can help neighbor D refine its phase answer, then neighbors B C and D can go back and help neighbor A slightly refine its phase answer. The super details of algorithms such as these has historically been finally guided by massive amount of empiricism, where first estimates of how such algorithms should operate are rigged up with many internal parameters, then subject to often millions of distorted and contorted samples, with subsequent tuning of the step-processes and internal parameters for global optimization of the exact mass-shipped functioning code.

The disclosure will circle back to this transition phase between the snippets of minor detections that occur on some small set of camera-pixel ribbons into the waxel-phased decoding of oct-axis values, but we need to get back to the deeper question of how do these 31×11 (or other chosen ribbons) get detected in the first place. What is the current preferred embodiment for raw pixel ribbon correlation detection?

HyperSep and the Use of Coiled AllPose (CAP) First Stage Hexagon-Guide-Signal Detection The preferred embodiment for detecting presence of a HyperSep marked surface is "Coiled AllPose" detection, as detailed in the earlier-cited patent publications, and adapted to the 16 by 14 block as detailed in this section. (FIG. 9 reviews the parametric and choice considerations that go into this implementation of CAP.)

A starting premise is that the packaging industry can dictate certain standards, and one such standard may be that these HyperSep hexagonal patterns will always be applied to objects with a known scale: say, 50 hexagons/centimeter on the vertical axis. Why start with this specific point? Because if physical objects moving across standardized recyclate sorting equipment ALWAYS have the same scale of hexagons, then the task of detecting these HyperComb patterns gets a bit easier. Classic watermark detection must often cope with 2×, even up to 5×, range of scale, whereas an agreed-to application of recyclate sorting has the opportunity to greatly reduce expected scale variation down to 10 to 20%, given that some objects still will have different scales in the depth dimension, manufacturing tolerances might be a few percent, and most importantly, affine-presented surfaces will commonly present themselves to cameras as apparent scale changes. So scale as a general pose unknown remains a factor, but its range of possible values is not nearly so large as is commonly encountered in most digital watermarking applications.

As noted, our preferred pixel ribbon size is a 16 by 14 "oct-axis waxels." We wish to correlate the HyperSep HyperComb pattern against ALL possible rotations and ALL possible translations of such ribbons, as imaged by the system cameras. Each camera may be designed so that captured pixels have the same scale as waxels ("watermark elements"), i.e., 50 per centimeter. But applicant prefers to have higher camera resolution to achieve some measure of over-sampling (which can assist other identification methods as well, such as reading classical 1D and 2D barcodes, and for various AI/ML based recognitions).

The Coiled AllPose patent documents describe how an M×N image patch can be split up into N M×1 linear vectors of values (i.e., a 31×11 ribbon can be split up into 11 31×1 linear vectors of values). These individual vectors are correlated with a rather lengthy vector of samples gathered along a path that takes it through all rotation and translation states of the guide signal pattern (i.e., the 16 by 14 hex pattern of FIG. 8). Being only 31 bits long, the raw binomial distribution mathematical laws referenced earlier set a baseline expectation for the distribution of how many bits will just randomly agree with some 31-bit arbitrary string. The use of the oct-axis filter, or still better the freckle-transform-inspired direction-preserving oct-axis filter described in a later section, is good at producing nicely distributed 1's and 0's even in somewhat smooth image regions, and thus empirically, when one is correlating some random string of 31 bits values against arbitrary images of arbitrary scenes, the resultant correlation values are not too dissimilar to the known-minimum breadth distribution represented by the pure binomial. As noted above, the binomial distribution that interests us more than the one associated with 31 coin flips is the one that is associated with the number 31×11 or 341 coin flips—or more accurately the 1364 coin flips involved in oct-axis filtering. Various expedients are employed, described below, to effectively combine all CAP correlations of the 11 different 31-long correlations into a full ribbon total of 341.

To summarize, if a 31 element row of imagery depicting some object—dirty and crumpled but marked with the HyperSep hexagons—exhibits a correspondence with the HyperComb pattern that is an element or two beyond the 50% due to random chance, and if several succeeding rows of imagery do likewise, this indicates presence of a known excerpt of the watermark pattern with a mathematically-known confidence. Even if a threshold confidence level for individual ribbon detection is set modestly, e.g. at 90%, 95%, or 99%, the coincidence of several such ribbon detections with consistent Pose states, and generally in proximity (e.g., within a 256 by 256 pixel patch, stretching further if Pose correspondence is high), indicates that these are phase islands excerpted from a common watermark pattern formed on a single object. (Ultimately, a trained classifier, such as a neural network, can be used to discern which combinations of Pose coincidence and spatial proximity are sufficiently unlikely as to merit a conclusion of single watermark pattern on a single object.) The confidence of such aggregate determination can be based on the confidences of the individual ribbons. When confidence in this aggregate determination exceeds a threshold, such as 99.99%, a decoding operation can be launched, helped by the pixel region defracturing routines.

The good news is that all this correlation stuff works quite nicely, being theoretically well grounded in a combination of the binomial distribution and a non-trivial look at how line vectors curve through Coiled AllPose space. The bad news is, from a 2020 context, the stored Coiled AllPose correlation vectors are verge on unwieldy. For even the 16V by 14H hex pattern of FIG. 8, a 128K long correlate vector just starts to provide a high enough density in Pose space such that a given 31-element input string will very likely finds its match along this long vector and report out a supra-threshold correlation value. And this length is going to be highly empirical in full implementations. Once scale ranges of 10% and 20% really come into the picture, it is possible these vector lengths may reach 1 million values or longer. Engineering work punctuated by empiricism is required to establish exact numbers, though even if these vector sizes do grow into the millions for certain large-scale-range applications, modern Nvidia and Intel processors are up to the task of processing such animals. The very nature of recyclate flows themselves, from one extreme of very dirty non-separation small element flows to well separated large minimally crumpled items, will fundamentally alter these operational numbers, from the ribbon sizes here postulated at 31 by 11, to the resultant Coiled AllPose vector correlate sizes of as low as 32K vectors to possibly well into the millions. The next section drills down further on processing requirements.

As a side note, we briefly discuss why 31, and why 11, and why the combo of 31×11. In the end, these choices will doubtless be shaped by a variety of factors, most driven by the assumptions made on the recyclate flows that will be examined and by processing power restrictions which may limit the innate density with which Pose Space is sampled. But the number 31 is chosen for this embodiment because as a curved version of this number roams through as a long loop through all of translation-rotation pose space of a 16V×16H hexagonal pattern, roughly at 31 pixels a half-waxel decorrelation "curve" starts to decorrelate from the starting parts of the 31. As more samples are added, the decorrelation starts transitioning from adding more signal with the extra length, to adding more noise. This choice is also guided by how densely one wishes to sample pose space, which in our case is with a nominal 128K long pose-space loop (see the cited Coiled AllPose documents). The choice of 11 is a bit more arbitrary and is also closely tied to the ultimate statistical behavior of the recyclate materials being identified and subsequently sorted. The idea is that for heavily crumpled objects such as smashed water bottles or stomped cans, the resulting crumple-transform phase islands tend toward elliptical regions instead of square and circular regions. Thus their innate phase fracturing will have an elongated nature. As a later section shows with the different orientations of these 31×11 ribbons, we actively search the four N-S, E-W, NE-SW and NW-SE candidate orientations of these ribbons, with a sampling strategy that if these are dense enough, some small family of ribbons will couple in these properties of the flowing waste streams. 11 is a number that gives us more raw correlation sites to make a correlation, while not growing to much higher numbers and either decorrelating too fast on certain small phase islands, or leading to too much demand on processing loads. But again, various design and flow-statistical data will inform final choices on the ribbon dimension (or dimensions, if multiple sizes are utilized); the 31×11 size is simply exemplary. If one or more depth-sensing cameras is employed within one or more of the STCM modules, these ribbon values might even be tuned to the Z-axis of the measured surface element. And a final note: the choice of each these numbers being an odd number rather than being some even number or a classic power of 2 is A) it doesn't matter too much from a Coiled AllPose perspective, and B) an odd number allows picking an absolute center pixel for the ribbon, something that can come in handy when debugging otherwise unwieldy code. Central pixel integral values can help chase down numeric/algorithmic bugs.

The Dedicated Coiled AllPose Processing Unit Being Fed by an STCM

Be it a cloud-based unit or some beefy CPU/GPU/TPU/VPU/FPGA/ASIC physical box, this section details how to achieve Teraflop levels of processing for the Coiled AllPose explicit identification module, when paired with a 25 cm^3 STCM camera module.

As noted, the final digital product output of the STCM data stream is a listing of candidate surfaces, each with associated metadata. We now detail how this data output is transformed into Coiled AllPose input 31×11 ribbons. Recall that the output STCM stage two is on the order of 400 Kbytes per frame. Input data for the Coiled AllPose identification module comprises the relatively connected surfaces that form the bases for many 31×11 candidate ribbons. Per frame time then, a new 128 by 1024 x-y-extent sheet of roughly half-filled surfaces comes out of STCM stage two. Because we do not want to worry about artificial borders being created, we buffer the previous 128 by 1024 sheet of the earlier frame time to combine it with a new one, such that candidate 31×11 ribbons can easily "cross the border" over the leading edge of the new frame into the trailing edge of the frame before that.

Figure 11:
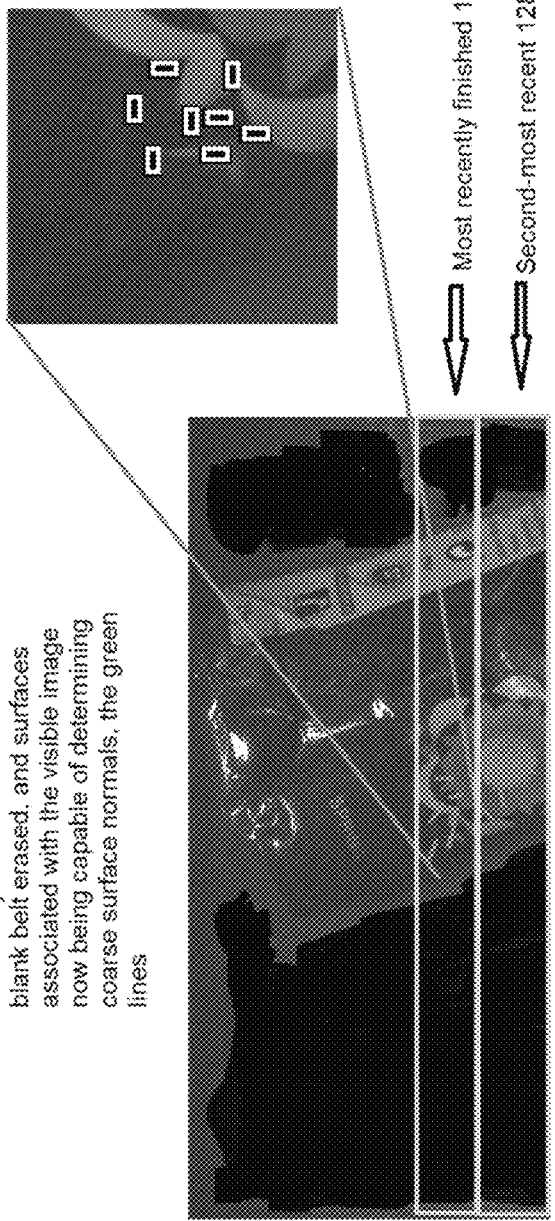
FIG. 11 provides additional information about the ribbons depicted in FIG. 10.

FIG. 11 graphically summarizes the data flow situation and illustrates what a first sub-stage within the CAP module does. The figure shows that it seeks to place a redundant mosaic of 31×11 ribbons into the known outlines of the candidate surface lists of the last two fully processed frames. The spacing and orientation of these 31×11 ribbons can stretch across well over an order of magnitude in processing-power implications for the processing unit to be described in this section. Imagery can be sampled sparsely to keep the processing unit at a less costly level, or the economics of hyper-sorting can lead to use of Teraflop-level processing, and hence a very dense and redundant draping of 31×11 ribbons. The worth of the resulting data and refined product will dictate what cost the market will bear.

This disclosure contemplates a denser placement of 31×11 ribbon locations than may sometimes be used, simply to keep with the 2030 theme and to get the processing number sticker shock out of the way. A 2021 version of all this can then be implemented with lesser density ribbon samplings and more modest Teraflop-level custom-designed processing units. FIG. 11 radically under-represents the typical many tens of thousands of 31×11 ribbons that are being derived from these pixels and assigned coarse surface normal.

Each ribbon has a surface-normal estimation which is central to estimating what apparent scale is presented to the five-camera STCM, where tilted surfaces will generally present a denser packing of the HyperSep hexagons patterns than a flat surface presentation of those hex patterns. Given better and better performance from the STCM in making these surface normal estimations allows for an order of magnitude reduction in Pose-Space searching, mainly because you can so constrain your estimations on expected scale. Pose-space itself can be sub-divided and assigned to unique separate correlation engines, further optimizing image data in to correlate value out. Given that tilted surfaces, where a 31×11 ribbon has some clear pre-relationship to the tilt axis, presents itself along some line as itself just a scaled version of the 16V by 14H hexagon pattern, every ribbon thus knows roughly what scale range it ought to discover in some detection, and thus uses the proper scale range Coiled AllPose correlate vectors accordingly, as further detailed in the Coiled AllPose documents.

This last paragraph is a long version of saying that scale, as a classic unknown attribute in digital watermarking applications, can now be estimated to within a very useful +/−few percent range, which is typically good enough for detection of signal even if one is off by a few percent. This all presumes a standard hexagon density.

Current experimentation on the required densities of Coiled AllPose space for a 16V by 14H hexagonal pattern are conservatively found to be around 128K lengths of an entire Coiled AllPose correlation loop. Somewhere along this long loop, there will be a close enough replica of an acquired data ribbon element, 31×11, such that a decent "no corruption other than the curve of the Coiled AllPose loop" correlation can usually produce a very large fraction of the full set of 341 coin flip correlation points, say 300 or even higher, on pure non-corrupted high signal level samples. This is usually good enough in real world situations, then, where all manner of imaging and object noise source will bring this correlation level significantly lower, so the idea is generally that you only lose maybe 10% of bit correlations in the pure noise-free scenario. This kind of thing is more art than science, in practice. A study of FIG. 9 will reveal some very subtle looks at how the linear sampling of a typical camera interacts with the very subtly curved samplings of the CAP loop. Due to the linear/curved disparity, one never gets "exactly on" between the linear samplings and the CAP loop, but quite good levels of correlation can still be achieved.

The 31×1 vector is correlated with the 128K vector (using FFTs, as described in the cited Coiled AllPose patent documents), and a few correlation points along this very long correlation will find a few points that pop out from, say the 99.99% of the binomial expectation distribution. These are our first stage candidates. There are typically many dozens, mostly wrong, resulting from just one 31×1 by 128K×1 correlation primitive. After all, by definition, 1 in 10000 points will at least kick over this threshold if the binomial distribution 99.99% point says so.

Figure 12:
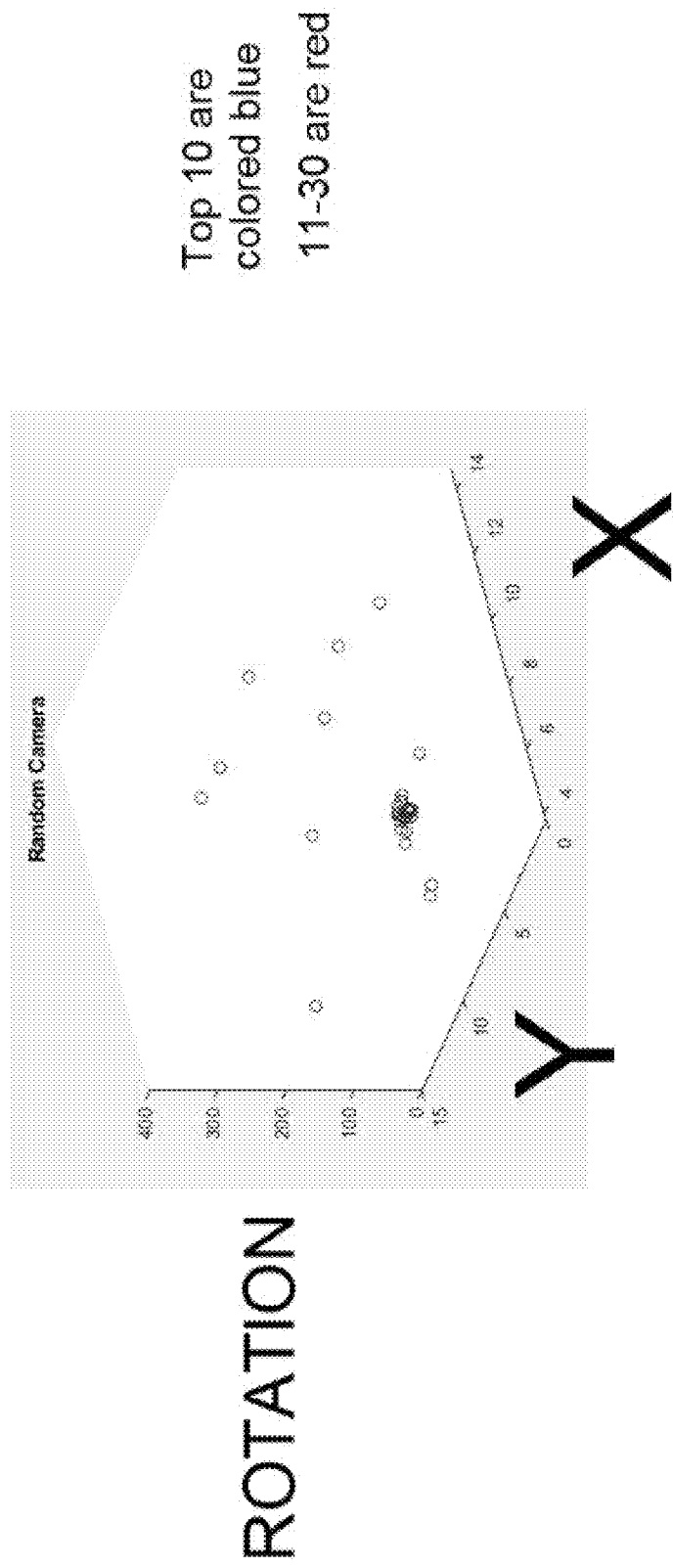
FIG. 12 shows how top candidate pose parameters, such as rotation, x-translation, and y-translation, tend to clump to indicate a particular surface pose.

This is why we do this again on the 31×1 vector "just above" the first one, and the next one above, and the next one above that, etc., until we do all 11 of the 31×11 ribbon. If we scatter plot the resulting above-threshold correlation-indicated Pose states, for all 11 31×1 vectors, we can immediately see that the correct answer for an appropriately marked item with the hexagon signatures shows up as a nice clumping in Pose Space. FIG. 12 is a somewhat cryptic view of this in that the fuller discussion behind FIG. 12 is better found in the cited Coiled AllPose documents. But it can be seen that, given these uncorrupted samplings of a random camera looking at the pure signal of a HyperComb sheet, then input in to the CAP process, usually produces around 10 or so of the top peaks all finding the correct Pose answer. We need this multitude of "close" answers as the real-world situation of dirty crumpled surfaces will hack these clumps down into much noisier version on a per-ribbon basis. It then takes typically many ribbons of weak signal to slowly add up to bona fide high confidence HyperSep signal detection, again as detailed in the cited documents.

Suffice it to say that all of this works quite well on quite real and quite distorted objects, provided one has adequate processing capability. The following discussion details how this processing of data produced from stage two of the STCM (about 64K-byte coming out of each frame, at 160 frames per second) can be accomplished with 2020 processing norms.

There is essentially one parameter that governs how we are able to process this data stream with the hardware and/or cloudware allotted to a single STCM: how many 31×11 ribbons per second are we going to try to process? In an exemplary embodiment of CAP on the 16V×14H HyperComb tile of FIG. 8, the profiled execution of the processing of a 31×11 is dominated by 11 128K inverse 1 dimensional FFTs. One of these 128K inverse FFTs on a contemporary standard PC requires on the order of 20 microseconds to execute, using compiled C code or the like. Now at 160 frames per second, we have 6.25 milliseconds to crunch as many ribbons as we can. Even if all processing were devoted to this task, this would still process less than 300 ribbons per frame time if we just plug a normal 2020 PC into the STCM. This simply will not do, especially since the STCM is already quite busy with its own stage one and stage two processing previously described. So, presently, we cannot avoid requiring "a dedicated box." even if that box resides in the cloud. Either way, every 25 cm swath of belt along some 1 or 2 or 3 meter belt is going to want its own STCM to be at the very least processing a few thousand 31×11 ribbons per frame time. So this processing box, be it in the MRF building or remote, can be spec'd to handle for example 5000 31×11 ribbons per frame time, which entails then 55,000 128K inverse FFTs. A recommendation is to at least use optical fiber carriers from the STCM(s) to some IT friendly location locally, or to some appropriate optical pipe to some third party cloud-service. Per second, this is 55,000×160 or 8,800,000 128K iFFTs per second. With a rough estimation that fixed point FFTs require several million operations per FFT, and given the nearly 10 million iFFTs we wish to process per second, we find ourselves in TeraFlop land. But the excellent news in 2020 is that the word TeraFlop does not connote the same monster that it did 20 to 10 years ago. Specifically for GPUs, and also for certain forms of ASICs. TeraFlop boxes are economically viable—presuming that the overall economics of this technology can support STCM price tags in the couple of thousands of dollars (US) per STCM. In 2030 and even 2025 terms, specifically with a global scale opportunity to take the next step function on the quality and quantity of recyclate as a motivator, it is hard not to imagine these Teraflop levels of processing will case their way back to the sub $1000 or even sub $100 price point in 2020 dollars.

It should be mentioned that the 5000 31×11 ribbons per frame time per STCM unit is a matter for eventual empirical verification, and is dependent on specifications such as "99% of all registered types of HyperSep materials" will be detected. If one is willing to accept 98%, or 95% detection rates on recyclates, then this strongly influences how many ribbons per frame need to be processed.

An economy in ribbon processing can also be achieved by training a machine-learning system to recognize which candidate ribbons within captured imagery present the best odds of yielding good correlations with the 128K Coiled AllPose data. This involves a training phase in which different image patches are presented to the system, together with identification of a particular 31×11 ribbon therein, and a label indicating the degree of correlation achieved with the 128K Coiled AllPose data. After being presented thousands or millions or more of such examples, the network can adapt its parameters to learn to predict which ribbons have the best prospects for correlation. Once trained, the system can act as a filter—identifying ribbons having what seem to be promising prospects for correlation for processing, while skipping other ribbons. Reference is made to cited patent 10,664,722 for additional details.

Some additional processing expedients are detailed in the following section.

Processing Tricks for the CAP Processor Box on Copious Amounts of Repetitive 128K Correlations The details of how Coiled AllPose operates invites an elegant approach to the architecture for efficiently calculating the very large amount of 128K 1 dimensional iFFTs. This is described in prose initially. In short, the very small length of 31 in the 31×1 elemental correlation leads us to re-examine the classic use of the FFT itself for the correlation operation. This FFT approach to convolution is preferred to explicit by-the-textbook convolution. But in some instances, correlation can be a competitive approach to the FFT if one of the two operands is very small in comparison to the other. Moreover, examining the strengths of modern GPUs and ASICs, one finds that operations such as simple adds can be quite simply implemented using gates, with just a few clock cycles producing results. Our use of the number 31 in the 31×11 ribbon is precisely a candidate for looking at such brute-force correlation alternatives as set in the GPU/ASIC modern context.

So this trick is based on the insight that one is convolving a 31×1 vector, call it "r," with a 1D vector that is orders of magnitude larger at 128K×1—call it "c" for the CAP vector. The classic approach of convolution by performing the operation IFFT(FFT(r)*FFT(c)), and then identifying a peak or peaks, is avoided.

With one vector, r, being only 31 elements long, this allows for a very direct approach to only manipulating some scaled version of the direct CAP loop itself, i.e., the direct correlate-vector c, with no need for its Fourier domain counterpart. The r vector in its most basic form is the oct-axis output of operating of the 2D surface lists pumped out from STCM stage two. In the exemplary embodiment, oct-axis values can take on only 9 states, which reduce to the set $\{-4,-3,-2,-1,0,1,2,3,4\}$. The number "1" in this list is special, because when it multiplied with the CAP loop, the CAP loop is the result. And likewise when a 1 shows up in the second element of the 31×1 ribbon vector, same thing, only there has been a "shift by one place" of the CAP loop. The value "0" is also simply-handled, as the product with the 128K CAP loop is zero. Fortunately, a histogram showing the frequencies of the 9 different oct-axis values shows a pronounced peak around "0". So the cases of oct-axis=0 and oct-axis=1 are among the most common. The remaining complication is all the other values, and the summation. An accumulator can be used to address this final complexity.

All of this simply says to an ASIC designer: this operation comprises multiple single-shifts, a small set of whole-vector multiplies (which can be implemented using look-up-tables if hardware constraints allow), and then accumulates. All this can be implemented straight-forwardly with a few million gates or so using basic ASIC tools. So "the box" we are talking about is likely to be realized as a chip. Naturally, there will need to be support chips handling the I/O at the rates we are anticipating (millions of 31×11 ribbons per second), still giving us a kind of box, but a simpler box than earlier detailed.

Scale-Normalizing the 31×11 Ribbons Prior to Coiled All-Pose Processing

One data product of the "T" part of STCM—the "topo"—is the creation of a topographic profile of objects on the moving belt. This is inherent to the list of surfaces with x, y and z spatial coordinates. As indicated by FIG. 11, this can give rise to surface normal vectors. These in turn can be used to "scale adjust" or "scale-normalize" the 31×11 ribbons before they are sent into the CAP processing unit.

Recall that the HyperComb pattern is formed on objects at a standardized size. The distance from the camera to the conveyor belt is known and fixed. The largest apparent scale variation of HyperComb patterns depicted in captured imagery is due to the object surfaces not being flat on the conveyor. That is, their surface normals don't point at the cameras. As is familiar, there is an apparent compression in scale that attends image capture from such an inclined surface, that is proportional to the cosine of the surface normal angles. If the surface normal points straight up, the cosine function is 1.0, and there is no scale compression. With increasing tilt comes increasing compression. And the tilt can be in two dimensions (in the direction of belt travel, and across the belt), giving rise to a double cosine relationship. The resulting scale distortion is desirably undone.

Figure 13:
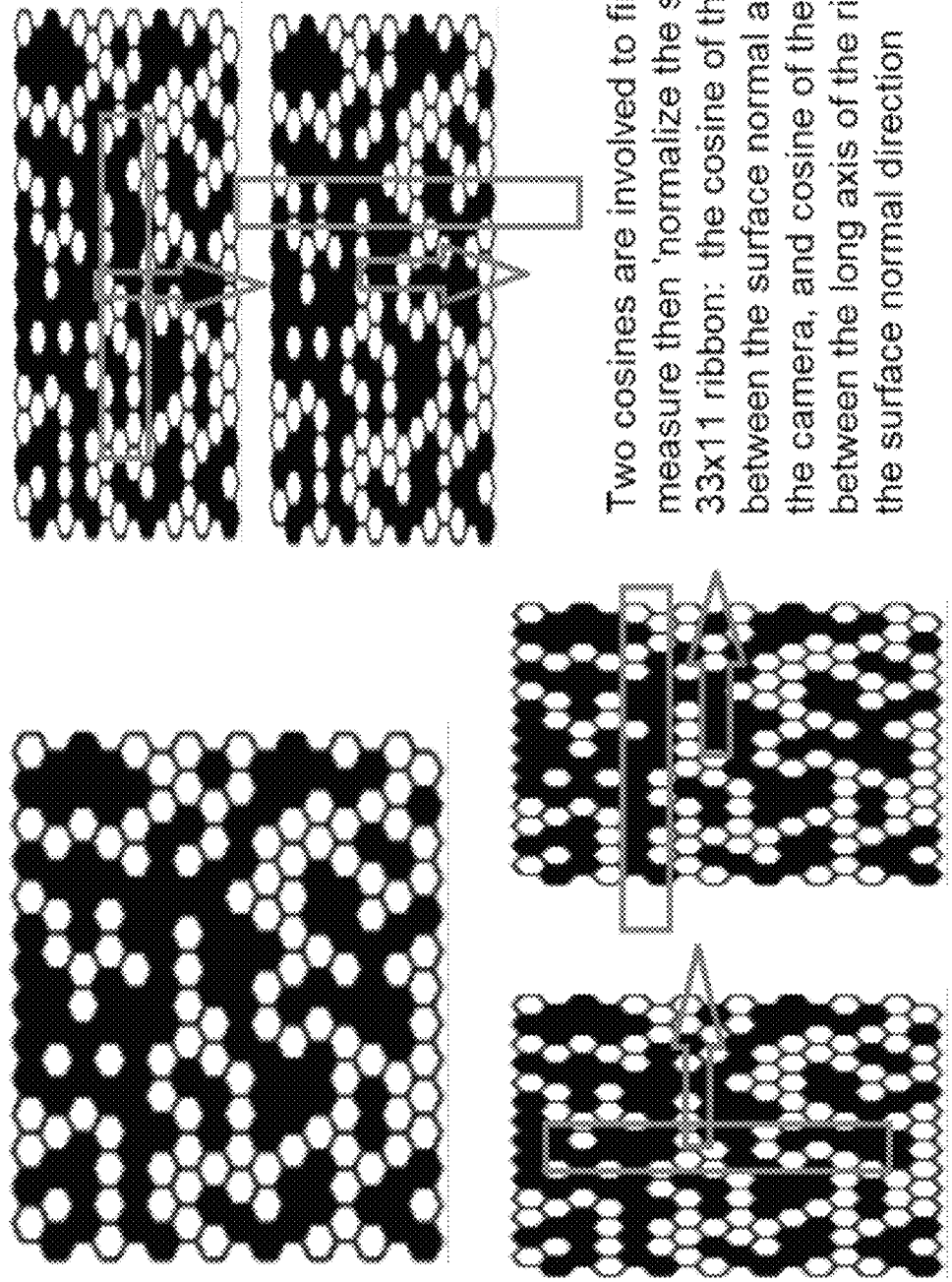
FIG. 13 shows how an illustrative data marking pattern is apparently compressed in certain depictions, depending on pose.

FIG. 13 outlines the geometric fundamentals that form the basis for slightly adjusting the scale of the 31×11 ribbons before they are fed into the CAP processing module to un-do the tilt-dependent compression. Recall the "waxel" concept in the cited documents, in which watermark elements are extracted by sampling the imagery at an array of pixel locations determined based on the scale, rotation and translation with which the imagery depicts the object. In like fashion, once the surface normal of any given ribbon has been determined, its double cosine relationship characterizes the compression of the HyperComb pattern depicted in the imagery. The system samples the captured data at points dependent on the two dimensions of surface tilt, to effectively de-compress the two dimensions of scale compression.

By such sampling arrangement, scale compression is largely reversed. This allows for the Coiled AllPose processing to largely ignore scale as a pose component, enabling it to focus on the unknowns of x translation, y translation and rotation, as FIG. 12 has shown.

Decision-Making within CAP First Stage HyperSep Hexagon Guide Signal Detection

We have discussed the basic building blocks for how objects marked with the HyperSep Guide signal will produce reasonably high correlation values within these 31×11 ribbons, and discussed how some given object being viewed will hopefully have many dozens if not even hundreds or thousands of these higher correlation ribbons randomly draped around their surfaces. But to this point, these ribbons are basically on their own and not communicating with each other or operating within some higher level of coordinated decision making. They are just ribbons that seem to have a slightly higher than normal level correlation value with the unique guide signal of FIG. 8. What is now in order is to elucidate this higher level of decision making as a process of collecting together a series of probability events, ultimately building a signal-detection confidence metric that is tested against some much higher false positive likelihood threshold. False positive target specifications are usually empirically based and involve this accumulation of some specific signal presence, usually as an accumulation of correlation events against some known reference—in our case the uniquely spatially arrayed 1's and 0's of the HyperComb hex tile of FIG. 8. In two-stage detectors as discussed, even this very high confidence correlation on a guide signal is just a prelude to the payload decoding stage, where further levels of confidence will be added to the mix.

There are two philosophies for the decision-making process; we term one "human mathematical," and the other "artificial intelligence." Each breaks down into a range of choices and directions, with approaches like machine learning and neural nets falling under AI. In the end, the two will merge, but for the purposes of explaining a best-mode of a technology, we here concentrate a bit more on the "human mathematical" form.

A nexus of these two philosophies is that some of the detailed descriptors describing raw data inputs to thresholded peak detectors can be recast as "feature vectors" in subsequent AI implementations. The raw input data can be the same ribbon-correlate values, along with metadata on where those ribbons find hot spots along the very long Coiled AllPose vector.

FIG. 12 illustrates a decision making process using "human mathematics." Matlab has a clump finding code function that can be employed. The code receives, as input, the top N pose-space candidates (i.e., those having the highest correlations). A clump-finding (clustering) algorithm is then applied to identify groups of poses that cluster around certain values. These values are provided as output data, identifying the most likely poses. (Alternative algorithms include K-means clustering, and algorithms detailed in the Wikipedia article "Cluster Analysis," which is incorporated herein by reference.)

As noted, these pose candidates can alternatively be provided to an AI/machine learning routine, trained on such, and it, too, would yield an output classifying the input as including a HyperSep guide signal or not, and if so, at what rotation, X and Y translation.

Decoding Digital Watermark Payloads; Microphase Locking

Applicant again refers the reader to the cited patent documents for information on how digital watermarking commonly utilizes a two-signal encoding and decoding process: one signal for existence and synchronization information, and the other carrying "the payload."

In an illustrative embodiment of the present technology, three signal components are employed: reference and payload signals, and additionally the HyperSep honeycomb guide signal. This latter signal is simply added to the other two.

In the illustrative embodiment, the HyperSep signal is used to detect very small patches of watermarked imagery—without reliance on the other two signals. Patches of imagery found to have the HyperSep signal are essentially pre-qualified as worthwhile. And each comes with a Pose state indicating its rotation and translation. (As noted, scale—after tilt correction—is essentially invariant.) This pose data allows these pre-qualified patches of imagery to be placed and counter-rotated in a mosaic—reconstructing bits of the original 2D watermark block as an assembly of quilted pieces. Some of the watermark block—between the quilted bits of ribbon—is still unknown; those values are set to zero. The composite block thereby reassembled can be submitted to the 2-component watermark detector for extraction of the payload.

In some embodiments the quilted pieces are not just 31×11 ribbons of imagery. The boundaries are such ribbons are trial-extended—a few pixels, or pairs of pixels, at a time in each direction. At each step, the correlation is examined to see if it still meets a threshold test. For example, the 31×11 ribbon of pixels is shifted two places towards one end and re-checked—is the correlation still good? (Many of the intermediate correlation computations can be re-used since, e.g., most of the values are the same.) Likewise for other ends. Likewise for rows that extend the ribbon beyond the initial 11. Each time the boundary of the patch is extended, if the CAP correlation continues to meet the threshold test. A rectangular ribbon can thus serve as a seed from which a larger, possibly irregularly-shaped excerpt can be grown. The resulting, enlarged excerpt—and others similarly derived—can be included in the quilted composite. At the edges, where the correlation falls-off, the quilt values can be set to zero.

Once a quilted signal block is assembled—either of ribbon excerpts exclusively, or from a combination of differently-shaped image fragments—a correlation can be performed with the usual reference signal component of the 2-component watermark signal, to judge a quality of the watermark synchronization. An iterative process can then follow, with the translation being successively nudged by small amounts to determine if refinement of translation yields a higher quality synchronization (i.e., higher correlation with the reference signal). Steps on the order of a tenth or a quarter of a waxel can be used, in x- and y-dimensions. The synchronization-adjusted quilted signal block that results from such process can then be submitted for watermark decoding.

Watermark detectors following the teachings of the cited documents are largely agnostic to the presence of other signals. These other signals are commonly host artwork signals in which watermark signals may be embedded, but also include signals such as the reference signal and, here, the HyperSep guide signal. However, to optimize detection, the reference signal component and/or the HyperSep guide signal, can be subtracted from the quilted signal block prior to submission for watermark decoding, to further enhance signal to noise ratio of the payload component of the watermark signal.

Reiterating STCM-L and STCM-M, Along with all Other Possible Optical Scanning of Recyclate Flows FIG. 1A and other figures involving the STCM have largely fully described what precisely a full STCM looks like, this brief section goes back to FIG. 1A now and describes what the dash-L form of the STCM is, and likewise the dash-M form.

As briefly mentioned in the main section on the STCM, L stands for "lite," and M stands for "mobile," STCM. STCM-L is presented to be just less numbers of both cameras and LED lighting bands than the full STCM. The main idea here is that other places in an MRF facility, or other facilities related to providing services to an MRF, may all want some baby version of the STCM. Likewise, field inspectors might be equipped with applicant's methods of using a mobile phone with strobing LEDs as a mobile STCM-M (c.f., Spectra ID).

Other Forms of Deterministic Identification

Digital watermarking is not the sole technical approach for "deterministic" identification of recyclable objects (in the dichotomy of "deterministic" vs. "probabilistic"). A standard GTIN-based barcode is another technical approach, as are 2-dimensional QR-codes and their many variants.

Applicant posits that the more information, the better. If the information is deterministic, better-still. A decode of half a payload from a torn 1-D GTIN barcode is a large step toward explicit identification of an object, and with cooperation of other modules within the RMIP, can help lead to a green bullseye event and/or a blue GTIN ID event. The idea that a "partial read" is not informative is not true here. It is valuable in the overall task of identifying and describing objects. A full read of a 1-D barcode, after all, is simply an explicit GTIN ID event.

Machine Learning and Artificial Intelligence Applied to the Recyclate Sorting Application, Making Use of No or Partial Explicit Identification, and Utilizing the Information-Gathering Capabilities of the Camera System Arrangements As noted earlier, there is virtually no limit to the types of identification that can be profitably employed in the present technology. Machine learning and artificial intelligence will continue to grow in importance in a RMIP platform arrangement. Indeed, harkening to descriptions of how RMIP modules can cooperate with each other, it is expected that AI/ML will become more and more an assistant in the detection of the HyperSep guide signal as the years go on. The early stages of this detection will certainly operate with minimal or no filtering of inputs to that detector. But by including some simple AI/ML preprocessing of pixel data, and much more efficient versions of the real-time processing units (CPU/GPU/ASIC) can be realized.

The additional information contained within the 8-band spectral structure of the STCM is a multiplier not only on the ability to read classic digital watermarks, and the HyperSep guide signals, but this extra information is a "feature vector booster" of the first order. More spectral data, better results.
Single-Object-Present Decision Making, ID Resolving and the Creation of an Initial Object-ID-Event 3-Dimensional Map Referring to FIG. 1, box 5 explicitly captures all of the outputs from the individual ID processes, both Deterministic ID outputs and Probabilistic ID outputs. We can generally refer to this box as the "ID Resolver and ID Event-Map Creator." Anticipating the long-term robustness of the RMIP platform, we must anticipate that up to a dozen or more individual ID modules may be feeding into this coordination process, thus highlighting the need for so-called "resolving" of what is expected to be more than one ID for many if not most objects.

But before this ID resolving takes place, a fundamental problem within image processing must also take place: Object discretization. Aka object recognition, i.e. making determinations that a singular object is present, while also determining the image-coordinate extent of that object. The co-existent problem is that some singular object has not been fractured into two parts due to some overlying object or strip of some other object.

Complicating these tasks is that the previous stages of processing have formed a unified 3 dimensional albedo surface map, which is richer in information content than a typical 2 dimensional image.

It is best to begin with describing illustrative output requirements of this box 5 in FIG. 1. Its primary job is to create a clean and clear 3-dimensional-surface map of discretely defined objects, with each object assigned a spatial extent within that map, desirably together with probability statements on its very existence as a discrete object and on the integrity of its map-extent estimates. This is the place that an object-ID-event takes its first hold. Later stage metadata processing may ultimately reject the rarely mischaracterized discrete object, but at this stage, a discrete line is created in the spreadsheet of FIG. 4 for this object-ID-event, 3d surface map coordinate-extents are attached to that line, and various pertinent probabilistic values can be attached to various column-values on that newly created spreadsheet-ID-event line.

A nominal example of an object-ID-event would be the reading of a Material-ID digital watermark off an object by the Materials ID Maps/Metadata Box 10 in FIG. 1, with such a reading including metadata to the effect that some specific ID payload was read over a surface area of 3 centimeters by 5 centimeters, centered at belt location X=13.4 centimeters in the belt-swath axis and 1.6 centimeters from top-of-first-frame when that object first appeared in the 25 cm3 imaging cube. The output of the Materials-ID box process 10 would include a >99.99% confidence metric on the ID payload itself, and a nominal +/−1 mm standard tolerance probability that the surface edges of the object conform to some "map blob" that better described the exact shape of the object as seen collectively by all five cameras over 8 frame times. Spectricity information would also be included as a function of the map blob of the object, itself with probability codes on the accuracy of those spectricity estimates. This example of an output from box 10 becomes an example of a nominal "pass through" of box 5, where most if not all of the heavy lifting of creating an Object-ID-event has been done, its mapping conditions have been defined along with probabilities thereof, and all that remains is to check this information against the outputs of the other ID boxes for the same map region: did other ID modules also produce discrete-object ID information for this exact 3 cm×5 cm area? Did the IR detector system find an IR signature and report it as such?

By highlighting this nominal example of a successful Materials-ID-event as the first example for how box 5 functions, applicant illustrates that this type of ID event is the preferred baseline for this disclosure. This is the main point of marking plastics and other materials with their own precise identification codes: just get it right the first time (in sorting detection), and all the other methods of identification can be used to help place such material identification into broader contexts and richer data fields. The probabilistic certitude with which box 5 can create a new object-ID-event line in FIG. 4 is maximized with all forms of deterministic IDs which garner >99% probability values. Thus, the role of box 5 becomes more of a housekeeper and coordinator of the compilation and "cross-consistency checker" for ID modules potentially all reporting a positive ID of an object with such-and-such spatial extent.

But box 5 is of course also designed to work with other situations as well. In early-market eras, where materials-ID digital watermarking remains only a small fraction of objects being fed through optical sorting machines, box 5 will take on more central decision making roles, especially with the most basic act of making the call on whether there is a new object-ID-event line to be created or not, for some specific map region on the moving belt. A separate nominal case then becomes the case where none of the deterministic ID modules has reported an ID detection in some given region, yet one or more of the probabilistic modules has reported something of note, i.e. some candidate detection event to which box 5 should be alerted. Two very simple examples here would be a) that some Near-Infrared detector has reported a very high confidence NIR spectral signature for some specific region, or b) some taggant-tuned ID module has reported a high likelihood taggant-present event. In both of these cases, given that these ID modules will be governed by rules of identification-confidence before they report such events, box 5 will likely follow the same process it did with the deterministic ID module events, saying colloquially "if it's good enough to pass the ID modules' ID confidence tests, then it is good enough for me to create a new object-ID-event line in the FIG. 4 streaming spreadsheet."

In acknowledgment of the uncertainty that probabilistic methods introduce, a "conflicts" field (column) is included in the spreadsheet of FIG. 4. Filling this field is an explicit task of box 5. In the case where one or more ID modules makes the case to form an object-ID-event line and yet there might be conflicting information about the ID of the object, its spatial extent, its orientation, etc., box 5 will be tasked with flagging various types of conflicting information between the ID modules, flagging this particular line for further investigation by later metadata processing modules, or feeding back such regions back into the ID modules so that they can have a second go at the pixels in question. This latter option points out that perhaps even a 16-frame buffer hardware accommodation is a reasonable design consideration for the overall STCM unit.

Reviewing box 5, it takes in all the outputs from the ID modules and generates newlines in the streaming object-ID-events spreadsheet. A pipe back to the original inputs to the ID modules is optional for initial verification and/or pruning of these newlines. Each newline desirably will have certain belt-map and probabilistic confidence metrics, even if such metrics attain >99.99% certainty.

Optimizing Via Hashing and Caching: The Creation of HashMaps for Both ID-2-Material/Product Metadata Fetching and for Image-Processing Algorithm Choices for Specific Object Metadata Extraction Box 15 of FIG. 1 depicts a module that accepts the output of box 5 and performs a task which is generally about computational efficiency and removing redundancy and overload from further downstream processing. The two words "hash" and "cache" figure prominently, two words which are familiar in computer science. The word HashMap is coined for this disclosure.

Hashing is a well-known technique whereby certain larger, more complicated elements, groups and sets of data can be individually—or collectively—referenced by a unique series of bits determined from the input data. This hash thus becomes a convenient shorthand that can serve as an index, or pointer, which identifies not only the larger set of data from which it is derived, but also can identify results of previous and subsequent processing. Caching is the well-known technique of saving previous large sets of information in active memory structures. For large quantities of data that are referenced often within computations, caching helps speed up computations and minimize data communication channel requirements. These are naturally abbreviated descriptions; the reader is referred to a vast range of public sources for further details.

If one considers the potential combinatorial complexity represented by the output data of the FIG. 4 spreadsheet, one might assume that each object will yield a nearly-unique combination, or signature, of data elements. But certain component data recur frequently, as do certain combinations of data.

Such coincidences of recurrent data can be identified by data analysis, e.g., by computing histograms (e.g., over hours, days or weeks) that count how many spreadsheet output rows have certain columns of data with the same values—individually, or in pairs, triples, etc. Such data that occur repeatedly can be denoted by a short code, or hash. The code can be derived by a mathematical operation applied to the set of elements (e.g., concatenating the last two symbols of each data in the set), or an arbitrary code can be assigned to correspond to the input data.

Desirably, there is some fuzziness to the process (in accord with the principle of fuzzy hashing), so that different input data can yield the same output code—provided each input data is within a respective tolerance (fuzziness) of a nominal value.

Returning to FIG. 1, box 15 performs the following algorithm: it reviews the streaming spreadsheet created by box 5, examines one or more specific columns/fields from each new row, and creates hash values for one or more combinations of column data. (A combination can include a single column data element, individually.) This is done by mathematically operating on the column value(s) to yield a hash code, or by using the column value(s) to look-up a corresponding hash code in a table where codes for different combinations of data are stored. (Each new combination of data may be assigned a new hash code by the table, e.g., sequentially.)

By way of example, a hash code may be derived, or looked-up, on the basis of column D in FIG. 4 (GTIN). Another hash may be determined on the basis of column J combined with column W (Brand, and Sleeve Material). Another code may be determined on the basis of column L combined with column W (Abbreviated Product Name, and Sleeve Material). Another code may be determined on the basis of column E (ISO Implicit-ID A). Another code may be determined on the basis of columns E, F and G (ISO Implicit-IDs A, B, C). Etc., etc.

The hash code—whether computed from the spreadsheet data, or looked-up using the spreadsheet data—is compared with a list of recurring codes (a Hash library). If a match is found, the code is added to the row of spreadsheet data. The addition of a hash code to the spreadsheet row indicates that this row corresponds to an item whose characteristics are seen repeatedly, and for which similar further processing may be appropriate.

When box 15 writes a hash code to the spreadsheet row, it reads from the row the spatial position data earlier-stored, and updates a 2D map data structure—identifying this spatial region on the map, and annotating it with one or more hash codes. This map is the HashMap. Typically, only hash values that recur are found on this map.

Ongoing operation can continue to analyze spreadsheet statistics, e.g., by histogram, to identify any combinations of data that begin to newly recur, in which case the Hash library is updated accordingly, and corresponding new codes begin appearing as HashMap annotations.

Arrangements like the foregoing permit later stages to base their operations on data stored in the HashMap, without needing to be concerned with the more nuanced data of the full streaming spreadsheet. The HashMap, and at least the most common entries in the Hash library, are typically stored in cache memory, as they are data that are fetched frequently during system operation.

The GTIN/Material ID Hash Table

A special class of Hash values are those associated with GTIN product identifier codes of 2020, and the in-process advanced forms of IDs that will become part of materials-ID standards, as implemented by digital watermark encoding directly into materials themselves. Any given MRF will be processing weekly and monthly populations of objects which do change over time, but they also maintain certain stable properties in terms of what specific items are being detected and processed. Naturally, the physical sorting machinery is interested in the precise ID properties derived either from Product-IDs or from material-IDs, with preferences toward the latter material-IDs, simply because the sorting system is directly interested in which materials get sorted into which directions.

In all of this activity, a great deal of repetition is happening, most especially in the act of reading a product-ID GTIN code and then quickly (within milliseconds typically) fetching information about that product and its known material properties. But there will always be small variations on product configurations (size, regional differences, state of food being detected, etc.) where the product-ID by itself does not simply point to one specific material-ID value but potentially to a wide variety of further considerations that the sorting machinery must be alert to. Even with material-IDs that are more direct, there are still variations that might come from other columns in the spreadsheet that might modify how the sorting machinery will operate.

These various combinations, over hours and days and weeks, still only add up to a few tens of thousands or perhaps a few hundreds of thousands of recurring scenarios, which then lend themselves to hashing and the creation of special Hash libraries directed at this more critical area of information that drives the physical sorting network. Such recurring events do need to be learned over some period of time, such as days, and perhaps they are tuned to specific known sources of waste (this day was from Long Beach and this other day was from Seal Beach, e.g.), but once compiled such libraries can be advantageously utilized by previous box 5, as well as the machinery of the physical sorting network.

The Image-Derived Metadata Algorithm Hash Table and the Subsequent Execution of Metadata Extraction from the Final 8-Band 3 Dimensional Surface A more complicated Hash table can be assembled and maintained by processing box 20 of FIG. 1. If processing power were infinite, we would simply have some large library of several hundred "garden variety" image processing and specialized image metadata hunters all examining the 8-band final surface pseudo-pixels, perhaps concentrating on the areas defined by the event HashMap. Color processing, internal shape processing, many forms of food and other contaminant detection algorithms, edge detector, etc., the list goes on and on. With such infinite resources, the individual object-ID-event lines will then fill in 100's of new columns worth of information for every ID'd object.

Barring infinite computing resources, then next best thing is to have a library of image processing routines available, but being selective in which algorithms are invoked for specific Object-ID-events and its associated spatial region. This is the reason for processing box 20: it not only helps build and maintain this large library of image processing routines, but more centrally it is the process that assigns metadata processing resources to specific, individual object-regions. The box 22 then performs the called-for component tasks, placing results into the streaming spreadsheet. In all of this activity, the same concepts of HashMaps and caching applies: many of these processing functions are repeated, so hash values and associated cached execution code all contribute to efficient system implementation.

Example of Using the HashMap to Link to and Execute Specific Image Processing Routines Specifically Aimed and Food Contamination Metadata Measurement A critical need in the recycling community is dealing with contamination, such as residue food and other products in containers, and container closures, when sorting and processing recyclate. This is but one of many applications of the earlier-detailed HashMap.

FIG. 15 illustrates cooperation that takes place between the outputs of the streaming HashMap from box 15 of FIG. 1, and then subsequent boxes and associated processes. This section details a specific example of a positively ID'd product and material that is known (via the various database look-up procedures described in this disclosure) to be a Heinz ketchup container, at risk for having liquid or dried ketchup residue.

The first thing to note about FIG. 15 is the overall depiction of the what amounts to the output of the 8-frame compositor box, previously discussed as being fed to the ID modules, but now noting the arrow item 30 (FIG. 1) which also forms the belt-map-basis for the HashMap, where the arrow item 32 indicates the placement of object-ID-events onto this facsimile of the belt itself. (The Z-height of the map is not depicted in FIG. 15.)

FIG. 15 explicitly calls out the dimensions of the 3.125 cm by 25 cm physical strips of the belt, item 50. Item 55 indicates that the strips with thinner borders are strips which are still being processed within the 8-frame compositor, whereas item 60 indicates that for the thicker bordered strips, all 8 frames have been fully processed, fed to the ID processing modules and have already begun to generate discrete object-ID-events, replete with general map coordinates of where that object is located.

Item 62 in FIG. 15 points out two example object-ID-events, depicted here as blobs with some uniquely identified, high-level HashMap identifier drawn within the blob. Particularly note item 65, with a hash code identifier labelled HMX3 as a stand-in for hash codes that may be longer than this short identifier (for the sake of keeping the figure not too cluttered). Item 65 also goes off the STCM imaging border, and will generally be detected by the neighboring STCM as well. The operations of this section and other sections will thus coordinate activities with neighboring STCM when processing objects which cross the borders. Likewise, most object-ID-events cross over the borders of the 3.125 cm belt-lengths, and need to be stitched back together as one object-ID-event by box 5 of FIG. 1.

Item 70, "HMW2," is the specific subject of this section. This is an object which, via the ID hash codes fetched from box 23 of FIG. 1, is now known by box 20 of FIG. 1 to be a 14 ounce Heinz plastic ketchup container, made of PET plastic. Knowing this, item 34 in FIG. 1 indicates that this identification information can now be used by the HashMap creation processes (box 15) to pull up very specific sets of image processing routines which, among many other higher level image processing routines that will be called-up for more general purpose metadata processing, are specifically tuned to search for liquid or dried Heinz ketchup residues. This whole set of hashcodes for both ID link data as well as usually dozens of hash codes for algorithms, gets attached to the list of hash codes belonging to the hash code identifier HMW2, then further placed into the mapped object-ID-event. All of these hash codes then become instructions for box 22 on which algorithm libraries to go fetch and apply, guided by this existing knowledge of what the object probably is. Item 77 in the figure attempts to make this point quite clearly by attaching the colloquial phrase "Look for Heinz ketchup residue," attached to one very specific algorithm hash code. This list of ID hash codes and algorithm hash codes attached to item HMW2 can become very long, even up to dozens and hundreds over time, all depending on how valuable the extra metadata and fetched ID-link data is desired to be placed into the final flowing spreadsheets of FIG. 4, as coordinated by oval 25.

Item 80 in FIG. 15 indicates that the objects in question are only a few inches to feet not past the 25 cm^3 imaging area, yet a great deal is already known about these objects since the hash code methodology and the called-up algorithms will nearly always be part of a large cache memory system. Item 80 indicates that these objects now await their fates within the physical sorting system. The Heinz ketchup residue algorithm "3&&dTsje&" will typically return a scalar value, between 0 and 10, indicating a relative degree of ketchup contamination (with 0 being perfectly empty). This value can be used to control subsequent sorting, so that cleanest PET plastics are routed to one bin, while contaminated PET plastics go in another bin. Additionally or alternatively, the item contamination is logged, e.g., to provide score data for assessing the quality of a recyclate bin in which this bottle is ultimately included. (The degree of contamination can be assessed on a count of pixels identified as likely ketchup residue, optionally as a fraction of the count of pixels filling the product outline on the belt—where such outline is available.)

Different forms of contamination can naturally be detected by different algorithms. Many such algorithms are based on results of spectral analysis, across the multiple wavelengths of data collected by the STCM system (see, e.g., our cited patent publication 20140293091). One particular arrangement employs a convolutional neural network (see, e.g., our cited patent 10,664,722), that is trained using multi-spectral imagery depicting Heinz ketchup residue in Heinz PET plastic bottles, captured with STCM illumination/camera systems. Plastic bottles are not perfectly clear at all optical wavelengths; some wavelengths are absorbed more, some less. Similarly, the ketchup has distinctive optical properties (e.g., varying absorption), including some outside our range of (visible light) perception. By training a neural network on actual sample imagery that depicts the presence and absence of Heinz ketchup in Heinz containers (and on synthetic imagery derived from actual sample imagery, as detailed in the cited patent), ketchup detection can reliably be sensed by the neural network, and the degree of contamination assessed.

Once such a network is trained, the weighting parameters thereby derived can be stored, and are later loaded into a general purpose convolutional neural network whenever the system (e.g., HashMap) indicates that a particular Heinz ketchup bottle is detected. Imagery depicting the excerpt of the belt where the ketchup bottle is detected is input to the thus-configured neural network, and a score is generated indicating a degree of ketchup contamination for that bottle at that belt location. Sorting actions can be tailored in response to the sensed contamination.

Once such a model (e.g., network weights) is trained for Heinz ketchup in a particular container, it can be tested to judge suitability for detecting Heinz ketchup in other containers, and for detecting other brands of ketchup in their respective containers. The model may be found to be suitable as-is. Alternatively, different bottle chemistries, or different ketchups' compositions, may be different enough that the network should be retrained for one or more such variants using multi-spectral imagery specific to those cases. But such retraining can start from the network parameters developed for the cited Heinz ketchup case—greatly speeding the training process.

While a convolutional neural network is referenced in this example, artisans will recognize that detection can take other, diverse forms. One such alternative is classification by a support vector machine.

Another form of contamination is the presence of a bottle cap on a plastic (or glass) bottle. Sensing of such contamination can proceed using multi-spectral image analysis—by a trained neural network, or otherwise—examining imagery in proximity of an identified item for the color spectra of the associated closure. Mountain Dew drink has closures that humans perceive as lime green. Canada Dry ginger ale has closures that humans perceive as Kelly green. 7-Up drink has closures that humans perceive as carrot orange. Coke Zero drink has closures perceive as black with white stripes. Etc. The system can look up such metadata in a local or on-line data structure, using the item identification. Again, all closures have further spectral features in wavelengths beyond human perception, which are sensed by the STCM modules.

Reference is made, here and elsewhere, to proximity (or item outline, etc.). Proximity can be set at an empirically-determined static value, e.g., 10 cm. Or it can vary, based on the item metadata. If metadata identifies an item as a 1.5 liter Coke bottle, proximity can be regarded as 327 mm (the height of the bottle—metadata that the system can again look-up in a local or online data structure, using the item identification). If the metadata identifies the item as a 13.2 oz. Coke bottle, proximity can be regarded as 193 mm. Etc. Proximity thus defines an area of pixels associated with a product. The area is commonly circular, based on the longest dimension of the item. However, if multiple locations on the belt are detected as associated with a particular item (such as multiple proximate locations at which a particular Digimarc Barcode are detected), then the item area denoted by the HashMap can be refined accordingly.

Figure 16A:
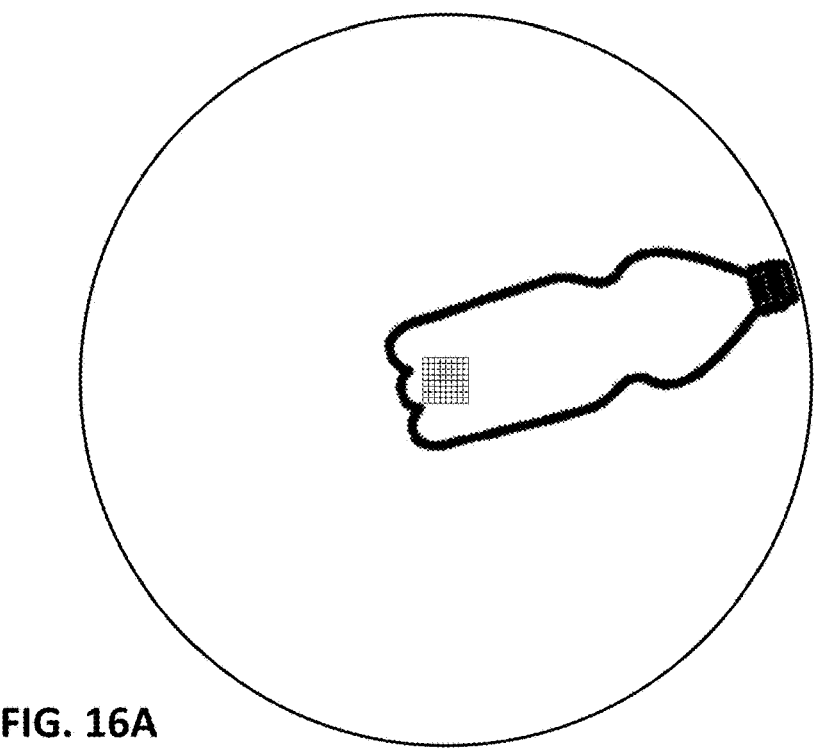
FIGS. 16A-16D illustrate how a bottle bearing a machine-readable mark that identifies the bottle and its shape, enables a range of possible bottle positions to be determined.
Figure 16B:
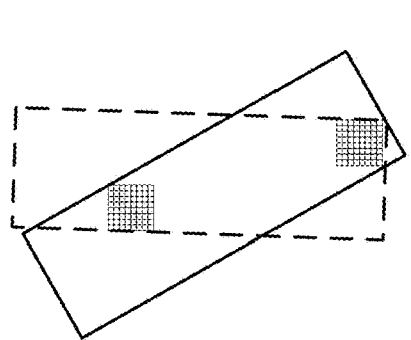
Figure 16C:
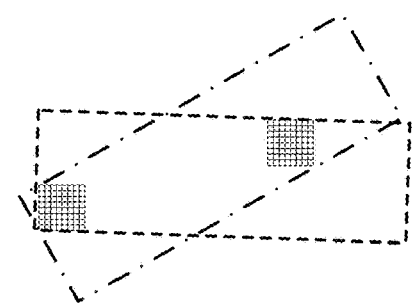
Figure 16D:
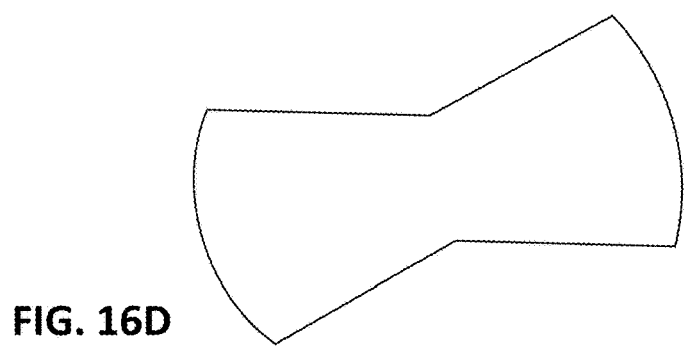

Referring to FIG. 16A, if a Coke bottle is identified by data collected at one position on the belt (e.g., a solitary 1D barcode, or a solitary patch of digital watermark data), and the dimensions of the bottle are known (from metadata lookup) to be 23.5 cm in height by 6.5 cm in width, then the bottle—if not crushed—can occupy space anywhere within a circle 23.5 cm in diameter, centered on the identified location. If, however, the bottle is identified from watermarking detected at two patches that are 16 cm apart, this distance between the detection locations constrains possible areas on the belt occupied by the bottle; a region smaller than a circle of 23.5 cm diameter can be determined. This is shown by FIGS. 16B-16D. The solid line in FIG. 16B shows one possible position of a 23.5×6.5 cm bounding box that encompasses both locations. The dashed line shows another. FIG. 16C shows another such pair of bounding boxes that encompass both locations. In the aggregate, the geometrical constraints imposed by the two detection locations, and the rectangular dimensions of the bottle, define an hourglass-like shape where the bottle can lie on the belt, as shown in FIG. 16D. This can be the HashMap area of pixels associated with the Coke bottle that can be analyzed for contamination. Naturally if identification of the bottle is based on features sensed at more than two locations, then the shape of the constrained area can be refined even further. (Some spatial dilation can be applied to the computed shape to account for expansion of bottle width due to crushing.)

Contamination can be sensed using features other than color. An example is texture. Most plastic closures are ribbed—with closely-spaced ridges and valleys. A&W root beer bottle closures have about 5 ribs per centimeter. Other closures can have larger or smaller ribbing. Such ribbing is a distinctive feature, especially in the spatial frequency domain, where its uniform frequency characteristic yields a distinct spectrum. Thus, imagery proximate to a detected item position can be transformed to the spatial frequency domain (e.g., by an FFT), and the resulting spectrum examined for presence or absence of features indicating presence of closure ribbing associated with that item.

In some embodiments, contamination detection employs a neural network that is trained not just with multi-spectral image features, but also with spatial-frequency domain spectra. Again, labeled imagery, e.g., depicting Mountain Dew bottles with and without associated closures, are presented to the network for training, to tune associated weighting parameters. The network will learn what combinations of color spectra, and spatial frequency features, are associated with closures on Mountain Dew bottles, and so can recognize same reliably. If HashMap or other data indicates a Mountain Dew bottle is sensed, then this can trigger the system to examine proximate imagery to assess contamination by presence of the particular closure associated with Mountain Dew bottles. Again, bottles with closure-contamination can be sorted into bins separate than bottles without closures, so that bales of having different plastic purities can be compiled accurately.

It will be recognized that closure sensing—as just described—can be used as evidence (metadata) that helps characterize, and identify, an associated bottle. If a ribbed closure is detected, and its color is sensed as Kelly green, rather than lime green, this is evidence that the bottle is a Canada Dry ginger ale bottle, rather than a Mountain Dew drink. Thus, sensed closure information can be among the metadata compiled in the FIG. 4 spreadsheet, on which item identification can be based.

Proprietary Hash Codes, Algorithms and Object-Interrogation Instructions

MRFs struggle to make a profit selling recyclate as their only revenue-generating activity. Collecting data on some sub-set of objects, as directed by a paying client, can represent a new revenue option for MRFs. The HashMap and its hash-callable algorithms for contamination, etc., can be adapted to apply customer-specified analysis algorithms to imagery depicting customer-specified types of objects.

Consider a pharmaceutical company that produces a prescription dog heart worm medication and packages it in bottles marked with conventional GTIN data (as a UPC code) identifying the product. The product is not sold direct to customers by the pharmaceutical company, but rather is sold through distributors, including Distributor A and Distributor B. Each has its own permitted sales territory: Distributor A is permitted to sell only in the US; and Distributor B is permitted to sell only in Canada. For forensic tracing or other purposes, the pharmaceutical company also marks each bottle with a serialization code, e.g., by a steganographic digital watermark. The payload of this watermark conveys data indicating the date of manufacture, the lot number, and whether it was manufactured for Distributor A or Distributor B.

When such a bottle is encountered in a waste stream, the recycling system may read the product GTIN data, and consult a look-up table to determine the type of plastic. The bottle is then routed to a recycling bin corresponding to that plastic type in the usual manner.

The pharmaceutical company, however, is interested to monitor diversion of product from Canada to the US (e.g., by unauthored grey market resellers). It thus contracts with the MRF. In accordance with the contract, whenever the MRF detects the product's GTIN in the waste stream, it runs further image analysis on imagery proximate to the product's detection on the belt. This further image analysis applies a digital watermark decoding process to the imagery, to extract the serialization code, indicating whether the product was manufactured for sale by Distributor A or Distributor B. In accordance with the contract, the MRF emails a monthly report to the pharmaceutical company, indicating the number of units of each type encountered in the waste stream: a count for Distributor A and a count for Distributor A. The pharmaceutical company may have contracts with MRFs in Los Angeles, Chicago, Miami and New York City. Normally, the reports show just a few of the Canadian bottles (marked to indicate Distributor B) in each of these markets, amounting to less than 2% of the detections. But one month the numbers take a sudden turn, and the Los Angeles MRF reports that 20% of these bottles are marked to indicate the Canadian distributor. Alerted to the diversion, the pharmaceutical company can begin investigating.

The image analysis that the pharmaceutical company requests can require proprietary information. For example, it can require a decryption key to "unlock" encryption with which the serialization code is encoded. Thus, only with information from the pharmaceutical company can this extra image analysis proceed.

In other situations, no proprietary information may be required to collect desired information. Consider milk jugs of the next decade that are steganographically-encoded with digital watermark data that conveys not just the GTIN identifier for the product, but also the product expiration date. This information is encoded in an open fashion—using a format and a protocol that has been published to enable decoding by anyone using public software tools.

Imagine that a particular lot of DairyPure chocolate milk (a hypothetical brand of milk distributed in Houston) is found to be contaminated. News reports indicate that one person is gravely ill, and the product has been recalled from store shelves. But it is not yet known how many jugs of the contaminated milk have already been consumed. The company's stock price has tanked on the news, in the publicity following the initial announcement. A diligent hedge fund analyst wants an edge—she wants to know if the drop in stock price is overblown, or whether the resulting liability could bankrupt the company. The hedge fund quickly contracts with MRFs in Houston to run decoding software each time a jug of DairyPure chocolate milk is encountered in the waste stream, to identify the expiration date information, and to provide hourly counts of items, and respective expiration dates, back to the hedge fund. From such data the hedge fund analyst finds a big stock drop is warranted—there are dozens of empty jugs of the contaminated milk found in the first hours of analysis. She concludes the stock will go down much further when the magnitude of the problem is fully understood by other traders, so she short-sells a large block of the stock accordingly. For extracting such information from its waste stream, the MRF pockets a handsome fee.

Oil companies, like ExxonMobil, may contract with MRFs for real time information about recyclate, generally, for different types and grades of plastic. Recycled plastic competes against virgin plastic produced by such companies. Information about recyclate soon to enter the market can be used by producers of virgin plastics to trade on the futures markets—locking-in prices for next month's sale of, e.g., virgin PET, based on information about the volume of recyclate PET that will soon be entering the market.

A serialization code conveyed by a package (e.g., by a digital watermark payload) may comprise a set of literal values for different data fields (distributor ID, purchaser ID, lot number, manufacture date, expiration date, manufacturing plant, etc.). In other arrangements the serialization code is a generally unique identifier (GUID) that is incremented for each successive package that is printed. The producer maintains a database that associates each identifier with the set of different data field values respectively-corresponding to that package. In the former case, anyone who can decode the watermark can access the data. In the latter case, decoding the watermark yields just a number that is meaningless without access to the producer-maintained database. Depending on the information provided by the customer to the MRF (e.g., decryption keys and access to database), the data the MRF extracts from products and reports to the customer can vary, e.g., comprising an encrypted watermark payload comprising a GUID or a set of literal data, a decrypted GUID, a set of (plaintext) literal data decoded from product packaging, a set of literal data accessed by the MRF from the customer's database using a decrypted GUID, etc.

A customer can specify a variety of products for which it wants specific further-analysis algorithms executed. Identifiers of these hash-callable algorithms are appended to the product 32 packets represented in FIG. 1. The algorithms are subsequently fetched and performed by box 22 processes, and results placed into corresponding fields within the object-ID-event spreadsheet streams of FIG. 4. The specific events that trigger these additional algorithms are parsed for delivery to the buyer by the data client server. As noted, the analysis can employ proprietary software algorithms, keys or data provided by the customer, or can use software available from code libraries maintained by the MRF for such purposes.

At some MRFs, customers can "buy" particular products for analysis—being the only party to whom the MRF will deliver data relating to such products. If multiple parties are interested in a particular product, rights to such data can go to the party that submits the highest bid in a periodic auction, e.g., monthly. At other MRFs (or for other products), multiple parties can contract for data for a single product.

The Synthesis and Piping Out of the Object-ID-Event Spreadsheet to the Information-Client Server To the extent processing box 15 of FIG. 1 first generates the initial data feed and HashMap for the subsequent parallel activities of ID data fetching and further metadata measurement, the processing step represented by oval 25 is where the resulting data accumulates, and this processing step decides which event lines remain and which are pruned, and then furthermore which column fields are filled in with values on a case by case basis, per object-ID-event. In a mature RMIP situation, one should expect that near 100% of the newlines generated in box 5 will wind up also being output from oval 25. Indeed, some of the image processing library functions called in box 20 may find additional objects not detected by the lower ID modules and might even suggest adding a newline to the spreadsheet streams, a decision that should be handled by processing oval 25.

The Treasure Hunt and the STCM/RMIP

All mining operations are keenly attuned to their sources. This is what the STCM/RMIP provides to the treasure hunt of recycling; it is the ultimate arbiter on whether an MRF is finding profitable product, and cost-efficiently extracting that product.

The quality of recyclate feed supplies is a key discussion point in dialog within the global recycling community. One metropolis versus another one right next door; one part of the ocean versus another; one landfill versus another; one collections vendor versus another; one reverse-vending manufacturer versus another. These are all treasure hunts. The search for the lowest cost supply of material that produces the best yield is the treasure hunt; the search for profitable mining.

Database Aspects of the Identification Platform: From Reactive to Pro-Active Identification Standards and their Evolution ISO, the International Standards Organization, is in a class by itself when it comes to standards relevant to implementation of the present technology. Prototypes turn into mass-scaled operations via no other pathway.

This is a reason the first column of FIG. 4 is an ISO identification ID, and that column U is as explicit as possible on this ISO foundation. The evolution of standards is the story of how new, early adopter trials and prototyping eventually lead to commercially successful trials which then lead to broad and global scale adoption.

Likewise, GS1 has been the central actor in the proliferation and use of the classic 1-D barcode, encoding GTIN data within that structure. Combining standards created by ISO with globally deployable identification frameworks created and maintained by GS1, the stage can be set for attaching the information associated with products and materials to the object-ID-events of FIG. 4 and other figures.

Creation of a Global Recycling Identification Repository (GRIR) would enable multi-directional data sharing. Initial provision of data from existing product data repositories through said GRIR to recyclers must be expanded to include what can be captured at the MRF and returned to the GRIR, including essential details such as specific weights and measures by recyclate and therefore attributable directly to company/producer based on product identifiers, percentages for purity, etc. Future expansion can expand to include market data and market enabling knowledge such most efficient recyclers for specific materials, demand generation, financial market information, regulatory data for compliance measurement. Imagine being able to track location of pickup of item to recycling compared to its point of production.

Generating and Publishing Highly Qualified and Standardized Identification and Material Quality Metrics This section drills down on column U of FIG. 4; the "meets ISO metadata standard X" column. Discovering the "optical attributes" of some object is as broad a topic as is known in the field of image processing. All of the columns in FIG. 4 to the right of column U are a graphic metaphor for this breadth, while the explicit title of column U emphasizes that such lists and practices and innovations can all make their way into stable and well-utilized ISO standards. Those standards can be implemented within the STCM/RMIP framework, so long as such frameworks meet the ISO standards. Then, as indicated in FIGS. 3 and 4, if an observation of some given object passing by on a conveyor belt meets those specific standards set by either the latest ISO metadata standard, or some ISO metadata standard within the library of ISO standards, then that object gets an affirmative in column U, and generally an affirmative attached to which exact "best" ISO standard it adhered to.

A note should be made here that other forms of "ad hoc standards" can also be created and they would generally follow the exact same form of presentation and numeric population as the ISO standards. A case in point here might be for hedge funds within financial markets: let us imagine that some trading company wants to deeply study the real-time flows of specific classes of plastics, and their interest is in the predictable quality/quantity that, on a weekly basis, could affect the ratios of virgin supply versus recyclate supply; they then make trading decisions based on such information; they may hire five imaging processing specialists to develop very tuned processing techniques which become yet another module in the RMIP, contracting with MRFs to put in such a module; they then might be the sole authorized client for such metadata; the image processing engineers would/should model their routines and verifications using the same principles illustrated in column U and their rightward columns.

The Legal Term "Certification" and its Technology Backbone: How Brand Owners and Packaging Manufacturers can Mitigate the Risk of Regulations, Fines and Public Dis-Trust Governments have and will continue to play a central role in recycling and the quest for a global circular economy. 2020 witnesses vastly different activities and actions by Governments both domestically as function of state, federal and local authorities, as well as globally. A common theme to all these activities is one form or another of regulation and rules. The capability to precisely define such regulation and rules is the multi-billion dollar elephant in the room. Waste identification systems and their capabilities are central to how regulations and rules can be fashioned, evolve and represent a level playing field for corporate interests. For completeness sake, this document briefly addresses the two related technical topics of a) standards and b) certification.

Figure 18:
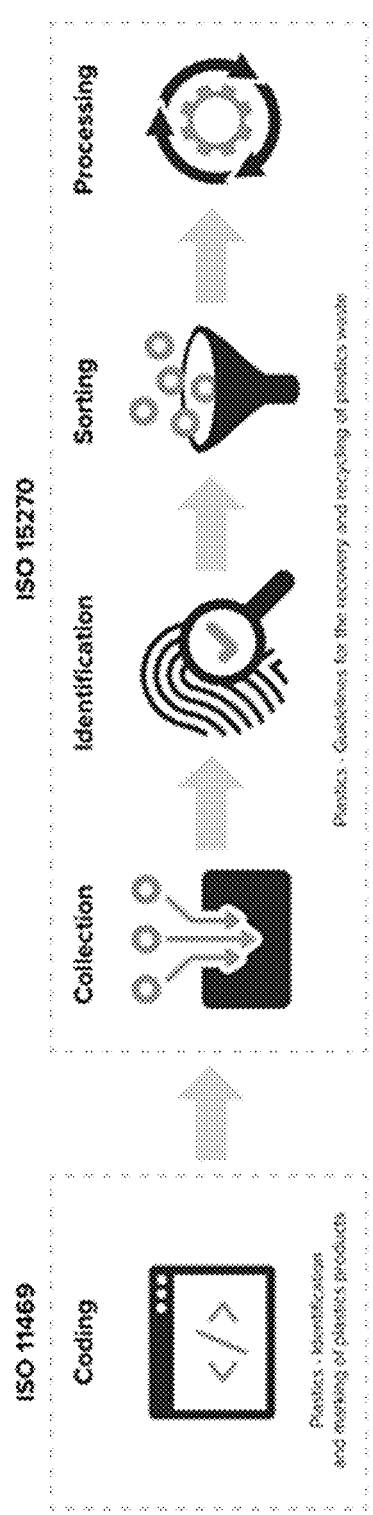
FIG. 18 identifies certain international standards relevant to aspects of the present technology.

Standards are the relatively easier topic to tackle first. In the international standards world, definition of plastics terminology underpins applications standards that govern both the identification and the recovery/recycling industrial processes (described explicitly in ISO 11469 and ISO 15270, respectively, as well as others; see FIG. 18).

Standards exist to ensure industry interoperability, and to provide a basis for quality control and quality assurance. As standards are produced and ratified, they provide a basis for certification.

Certification is important. Certification represents a desired end-state for Brands and Packaging Manufacturers who are required to teach their employees and their customers what the rules are and how to follow them. Certification also indicates an assurance of quality—of process execution and of production output (e.g. purity of recyclate). Such certificate of compliance provides the ecosystem confidence with respect to their particular interests, from equipment manufacturers to recyclers, to financial markets and regulatory agencies. (A case in point in 2019 is Germany's efforts to create a legally binding "German Packaging Ordinance.")

The Technological and Standards-Based Certification of MRF "Leavings"

Not to be forgotten is that MRFs themselves will always be large producers of waste. The mining industry uses the term "leavings," as do many MRFs do already. A well-designed and performing RMIP can be an integral player in measuring such leavings and in forming the basis for standards and practices surrounding these leavings.

The Technology's Place within a Process Flow Overview of a Materials Recovery Facility FIG. 1A provides a high level view of where one can place one of these STCM's with generally a form of the RMIP attached to the central one, and less well-endowed RMIPs possibly attending to the –L and –M forms of the STCM. MRF operations and process flows are perhaps as complicated as any type of petroleum refining or mining operation today. As such, the need for, sub-monitoring and interim monitoring of flows is constantly present. The –L and –M forms of the STCM are posited just for this adaptability to most sections of MRF material flows.

A Brief Discussion on the Technology's Operations Costs

The STCM unit costs will be dominated by the cameras and the LED lighting modules. Use of modern scientific CMOS or equivalent sensors is posited at least for the 2025 timeframe cameras if not even sooner. These cameras are getting very close to photon-level diminishing returns point in terms of their raw lighting sensitivities. The reason for pushing this date out a bit is that they currently are expensive in the mid-$5000 range to even much higher at $15000 to $20000. At five cameras a unit, with multiple STCM units across a 1 or two meter wide belt, then costs eclipsing $100K just for the cameras becomes a bit of a sticker shock, provided we are not looking at the broadest economic implications of a completely functional marketplace represented in FIG. 5. Either way, this is expensive.

LED modules also spendy. For a large bank of LEDs, comprising perhaps 1000 individual LED elements, this will run into the few thousands of dollars for every "full" STCM hood. LED prices for high efficiency high brightness, however, are becoming ever more reasonable. One factor is the use of high-intensity UV or Blue LEDs to pump phosphors overlaying the LED die. These can be tuned to suit colors and emission bands—examples are specific colors and IR wavelengths, all pumped from blue LEDs (commonly to suit the specific photosynthetic and metabolic biochemistry in horticulture of specific plants). Likewise for indoor lighting, the hue of lights generated by phosphors can give very carefully tuned or smoothened illumination spectra, from narrow bands to broad flat whites.

Compact LED units in the excess of 10K lumens are common. These are predominantly made with phosphors for "white" for lighting/automotive headlights, etc., but also can be fabricated with color emitting phosphors for wavelengths anywhere from UV up into the IR.

It is expected that if this technology can get deployed in many MRFs, then purchase order volumes in this industry might be able to first get into the thousands of units and then tens of thousands, providing the necessary commoditization pricing pressure for units having prices diminish.

The overall costs of implementing this technology are likely to well eclipse the "up front" costs of the physical equipment basis of the STCM plus the RMIP. The software and network maintenance and expansion of the information-client server may dominate the annual operating cost of the technology. Costs of this annual upkeep will directly be driven by the value of the data products in the client base: starting with the post-object-ID-event sorting client. Each client category will determine what amount of spend is warranted in the serving of that category's need.

The Nexus of FIG. 3 with FIG. 5

If the reader places these two figures next to each other, applicant suggests that we consider several symmetries existing in FIG. 5 that are direct consequences of FIG. 3, which, get back to a question posed earlier in this disclosure: How exactly does an increase in refinement-identification impact the quality and quantity of the sellable materials, and how can digital visibility on the flows of these materials affect the futures and spot-sales of those materials within existing and next-gen marketplaces?

The flow of these object identification events started out as the central player between the left and right boxes within the material flow clients of FIG. 5. This question as posed is rather strictly confined to this left-center-right symmetry of FIG. 5, and its impacts on the lower two boxes of the symmetric marketplaces which cover a) ingestion of materials and b) selling of physical product output as marketplace activities. Then you have active and passive observers on those markets; for-profit versus non-profit participants; those with very real-time and reactive modes of participation versus those who can easily find their itches scratched by monthly data summaries. Thus applicant suggests that the upper two boxes in effect represent the more dollar-conscious and real-time clients with the upper left box, and then the more cerebral, non-profit and more longitudinal clients in the upper right client box. All of these boxes of course can blur together or have their overlaps, but applicant felt this concluding section was appropriate because the intent is to show, as clearly as is possible, this direct link between a step function in material identification and the immediate effects it can have on clients and markets.

HyperCoded Objects as a Singular Diversion Class of Objects

Figure 20:
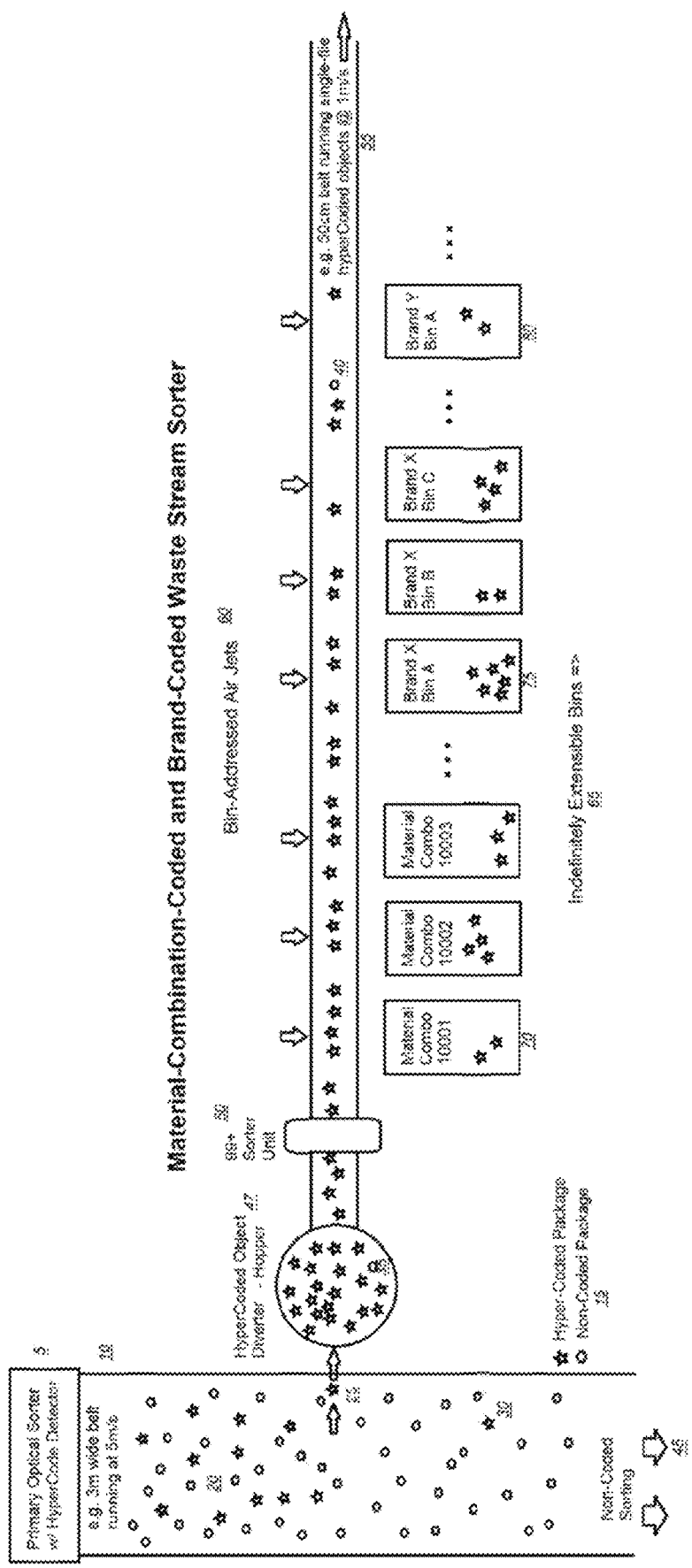
FIG. 20 shows certain aspects of a waste stream sorter employing principles of the present technology.
Figure 21:
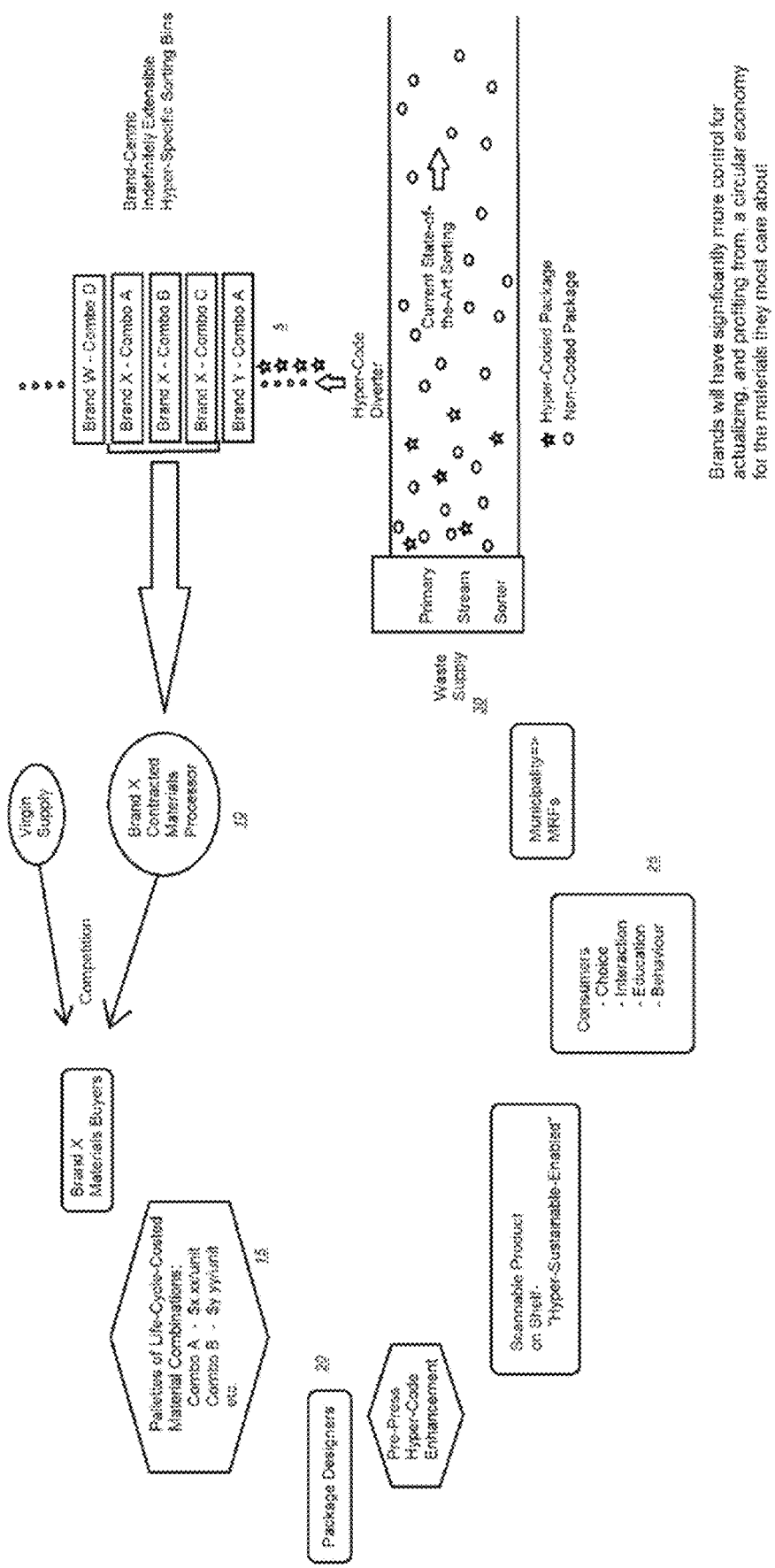
FIG. 21 shows a flow of materials according to certain aspects of the present technology.

This section will use the terms "hyperCode" and "hyperCoded" in a highly explicit way for the purpose of walking through FIGS. 20 and 21.

Specifically, "hyperCode" will represent a specific class of processing that has been applied to a surface of an object. The highest level description of this surface processing is that one way or another a string of 1's and 0's have been impressed onto a surface, such that an optical sorting camera system can read these 1's and 0's. More specifically then, data within these 1's and 0's can communicate to a sorting system that the object has been encoded in such a way the object is intended to be directed toward a single-file, linear conveyor belt where some specific bin along that conveyor belt is where that object needs to land. In lay terms, if I am hyperCoded, then there is a specific bin waiting for me as my destination.

Turning now to FIG. 20, the overall title to the figure is "Material-Combination-Coded and Brand-Coded Waste Stream Sorter." These two initial hyphenated terms of the title break down the more generic "hyperCode" into two of the largest sub-classes of objects and their identification. Material-combinations refer to some definable set of material names that belong to an object, such as PVC plastic, where a combination can be even just one type of material. Most modern consumer package goods have at least two types of materials associated with them, especially if one wishes to classify the inks used in printing of labels as part of the class of materials. Further discussion associated with label 70 in FIG. 20 will describe these Material-Combination-Codes. Brand-Coded is just like what it says, the Brand manufacturer of an object is identified, and usually with than identification, some form of further identification is present which can help direct an object to its destination bin. Discussion labels 75 and 80 with further explore these identifications.

FIG. 20 has, in the upper left corner, label 5, indicating that a stream of waste (not depicted above the box 5) is flowing underneath an optical sorting unit which is equipped with detection capabilities described in this application and those cited above. Here label 5 is explicit that said detector inside the sorting unit is hyperCode aware; it can read these hyperCodes and report its findings to downstream physical sorting units.

Label 10 indicates a supposedly typical configuration of a waste stream sorter (generally of the direction these systems are all headed toward) where a conveyor belt might be 3 meters wide, travelling at 5 meters per second. Figures as these are entirely adjustable as matters of cost and throughput of waste, measured usually against quality of the thus-sorted output materials.

Label 15 near the bottom of the moving belt indicates that we are only wishing to track two types of objects: those that have been hyperCoded and those which have not. Stars and Circles accordingly. The figure attempts a reasonable 50-50 mixture that might represent some timeframe a few years from the filing of this application.

Label 20 merely points to the idea that these two classes of object co-exist rather randomly as part of some typical waste stream. The spatial density of these objects exhibits some modest level of separation of objects. The very choices of 3 meter wide belts and 5 meters per second are somewhat driven by this desire for a modicum of separation of objects on the belt.

Label 25 is meant more as a metaphorical operation as opposed to a literal "snatching an object at a 90 degree angle from the belt." The idea here is that there are several available mechanisms whereby object of one class can be separated from objects of a second class. By describing this as label 25 and its associated "diverter" terminology, an attempt is made here to allow for further separations of the non-code objects (the circles) via current sorting methodologies. The main point is that hyperCoded objects need to initially find their way from the main belt into some form of "Hopper," here depicted as a simple circle, implying as it often does a funnel.

But before describing such a funnel, label 30 finds a star still on the main belt long past the diverter, and label 35 and 40 find circles within the HyperCode supplemental sorting unit. Such objects represent classic notions of the false negative in the case of label 30, and false positives in the cases of labels 35 and 40. All systems are not perfect and need to make accommodations for such errors. False negatives (30) are usually just chalked up to slightly lower efficiencies in a sorting system, not a massively important problem, while false positives are a much bigger deal if such false positives ultimately find their way into erroneous bins. The idea behind the 99+ Sorter unit, 50, soon to be described, is that any non-coded circles 35 making their way into the hopper eventually keep going on the linear conveyor belt 55 to some non-depicted reject bin at the end of the belt. In a similar vein, label 45 makes it explicit that non-coded objects (and false negative coded objects) can still travel toward existing, current forms of object sorting.

Back to the diversion process 25, we can conceptualize that most hyperCoded objects will find their way into a physical arrangement intended to take a wide diversity of physically shaped objects and physically sort those objects into a classic "single file" to be placed onto the conveyor belt 55. Practitioners are encouraged to utilize any and all creativity available for outputting such a single file, given whatever physical range of objects are intended for hyper-sorting. Indeed, early days implementation of this single file sorting system may place limits on the physical attributes of packages, potentially not allowing certain types of packages to be hyperCoded if in fact they will cause problems for early designs of the single-file creation and maintenance units.

Label 50 is indicating what here is called the 99+ Sorter Unit. In its simplest form, this unit basically replicates the detection operation on objects that already took place in the primary optical sorter, 5. Rationales behind placing a second camera unit hovering over this new single file object stream include:

- Verification of identification
- Detailed placement data of the object on the new conveyor belt
- A second bite at the apple for measuring object attributes such as crumple state or contamination
- Attainment of literal >99.9% false positive rejection states Label 55, already introduced, also presents potential typical values on the conveyor belt width and speed. Of special note is the slower identified speed. Practitioners can by all means speed this back up to the same 5 meters per second as the main belt. But, the idea depicted here is that at this point in the sorting process, quality of sorting should far outweigh quantity as those two fight their classic battle. If the purity and quality of end sorting can directly drop to the bottom line for the purity and quality of purchasable product, then spend the capital dollars on a second or third or fourth linear conveyor belt rather than sacrifice in terms of sorting data generation.

Label 60 refers to the text and the multitude of downward facing arrows. In short, objects get blown into bins when they are supposed to be blown. No intention here to say that this is not an art to itself, just saying that this is what happens; many diverter technologies are familiar to artisans. The quality of the sorted materials is directly affected by any errors in blowing an object into an adjacent bin. Earlier sections of this application point out that rudimentary aerodynamic properties of objects can be estimated based on optical data from the 99+ sorter unit 50.

Label 65 makes explicit that the number of individual bins is not inherently constrained. The "address space" for hypercodes can easily reach into the millions and beyond, so it really is a physical plant real estate issue which limits the number of bins that a given MRF might accommodate. Also as previously alluded to, if a "wall" is eventually hit, creative ways are available to keep the line moving, or, alternatively, a second or third or Nth sorter stream can be set up, replete with their own 99+ sorter units.

Label 70 comes back to the individual bins that are assigned to "definable" material-combinations. This list itself can be quite large, if overall economics so dictate. The underlying idea is that at least initially, an ad hoc group can form temporary codes for specific combinations of materials that existing in consumer packaged goods. These combinations then get assigned a unique ID number, and presumably with that, a unique resting place (bin) within a MRF. There are economic pressures in the extreme being placed on Brands to get more sophisticated in their materials-use and combinations of materials, this disclosure brings forth a specific solution for keeping up with this sophistication.

In one embodiment, each bin is dedicated to items having a different multi-layer or other composite compositions. For example, one bin can be for polyethylene terephthalate (PET) bottles having polyvinyl chloride (PVC) shrink labels. A second bin can be for PET bottles having polyethylene terephthalate glycol-modified (PETG) shrink labels. A third bin can be for PET bottles having oriented polystyrene styrene (OPS) shrink labels.

A fourth bin can be for bottles formed by multi-layer extrusion, with an inner layer of PET, followed by an ethylene and acrylic acid (EAA) adhesive layer, followed by an interior layer of ethylene vinyl alcohol (EVOH—an oxygen barrier), followed by another EAA adhesive, followed by a PET regrind layer (e.g., PET recovered from an earlier thermal forming process, where it may have been trimmed as flash or otherwise rejected), followed by an exterior layer of PET to which a UV filtering agent, or a coloring agent, has been applied.

A fifth bin can be for multilayer pouches having an inner polypropylene film (for contact with food), laminated to a nylon layer (for strength), laminated to an aluminum foil layer (a light/gas/odor barrier), laminated to an outer layer of polyester.

A sixth bin can be for similar multilayer pouches but having an ethyl vinyl acetate (EVA) inner layer.

A seventh bin can be for similar multilayer pouches but having a low density polyethylene (LDPE) inner layer.

Myriad other combinations can be similarly handled, including items with barrier layers formed of paper, vapor-metalized polyethylene terephthalate, vapor-metalized cast polypropylene, biaxially-oriented polypropylene, biaxially-oriented nylon film, etc.

In some arrangements the collection bins can be positioned in a 2D array rather than linearly, and air blow-outs can launch an item to a nearer or further bin in accordance with the item's ID.

(Such an arrangement can include a system that transports potentially-recyclable objects of a waste stream, an illumination system configured to illuminate the waste stream, and a camera system that produces image data depicting an object in the waste stream. Means, such as described earlier, are used to produce data identifying the object type. A processor is configured to create a virtual physical model of the object, using data from the camera system or metadata associated with the identification data, and to estimate orientation of the object in the transport system. Such arrangement further includes an N by M array of collection bins, where N>1 and M>1. The system is also equipped with an array of pneumatic blowing ports with different orientations, operable to divert the object into a first bin, in the N by M array of bins, where the first bin corresponds to objects of the identified object type. Such an arrangement, realized on a small scale suitable for certain third world settings, can be wheel-barrow-fed, and can singulate objects onto a launching area through which the pneumatic blowing ports operate. The blowing ports launch items of different plastic compositions into different bins in the N by M array of bins, based on their plastic types.)

Contents of the bins can be dispatched for recovery processing tailored to their respective combinations of materials. Different recovery processes may use different solvents, and/or different temperatures and/or different mechanical separation techniques, etc., to recover and separate the constituent parts.

Labels 75 and 80 round out the walk-through of FIG. 20, pointing out that extremely large consumer brands may wish to simply purchase their own bins inside MRFs and then later have significantly higher amounts of control on exactly how their packages are recycled and their materials re-purchased.

This last paragraph is then a segue to the introduction of FIG. 21.

This is quite central to the optimal use of the system described in FIG. 20. This is the who-cares and who-will-use-it diagram. An oft-spoken truism in the recycling community is that our civilization's real path to progress will begin with the brands, and with their relationship to their customers, ultimately facilitated by real systems and well-designed economies of scale. FIG. 21 aspires to capture this at a sufficiently granular yet not over-granular level.

Label 5 in FIG. 21 is pretty much depicting all of FIG. 20 with slightly different terminologies applied to bins and combos, focusing in now of the Brand-Coded objects.

Label 10 goes out of its way to have the word "contracted" . . . . Brands now can choose exactly how their materials get reprocessed. To be super crass and crude, Coca-Cola need no longer worry about Pepsi plastics showing up in their recycled material purchases, and of course vice versa. These are not abstract issues, they lie at the heart of the challenges which must be solved in a highly competitive global CPG industry.

Label 15 is equally critical: designers, 20, need to know which "bins are out there" so that as they make product design decisions, they are following a well-costed palette of material choices. If there are compelling reasons to go with new choices, no problem, create a new "bin Z" for your company, define what goes into bin Z, they make it happen.

Skipping through this diagram, the almighty consumer is the penultimate pulse on whether the virtuous wheel starts to spin or not. Using mobile devices, consumers can now simply "ask" the object what's up with you? Are you hyper-recylable? If yes, I vote for you with my purchasing dollars.

Finally label 30 completes the material flow cycle back to the MRF. A circular economy actualized.

CONCLUDING REMARKS

Having described and illustrated the principles of our inventive work with reference to illustrative examples, it will be recognized that the technology is not so limited.

For example, while the focus of this disclosure has been on recycling of plastics, it will be recognized that the same arrangements likewise find application in the recycling of other materials, such as paper goods, glass and metals.

Although the Rapid Material Identification Platform detailed above processes data from the SpectraTopo Camera Module of FIG. 2, this is not essential. The RMIP can similarly be used on prior art optical sorting equipment. There are many mature and in-use optical systems today that do not have the optical sampling thoroughness of the detailed STCM of FIG. 2, but their captured optical data can nevertheless feed certain aspects of the RMIP. Likewise, such existing art optical sorters can be adapted, with the present technology, to produce data products akin to FIGS. 3 and 4, with simply less fields and perhaps much lower populations of filled fields.

Reference was made to recognizing ketchup residue by a neural network, and identifying a plastic type (probabilistically) from its near infrared reflection. It will be recognized that in these cases, and others, materials have spectral "signatures" comprised of their reflectances at different optical wavelengths. With LEDs that produce illumination in eight different band, the present STCM enables detection of 8-band spectral signatures. Reflectance within each band can be expressed in various ways, e.g., as a percent, ranging from 0 to 100. Thus, each signature is a vector of 8 numbers, each between 0 and 100. To recognize plastics and other materials from their spectral signatures, a sensed signature derived from the present STCM is compared against a library of reference signatures, to find the reference signature that most-closely matches.

Correlation is one way of performing this comparison—element-wise multiplication of each element of the sensed signature with the corresponding element of the reference signature, and summing the products. The reference signature with the highest resulting sum is probably the matching material, assuming the reference signature library has a signature for the tested material. In the case of residue detection, it should be recognized that an alternative to neural network-based detection is signature-based detection, e.g., comparing the reference spectral signatures for dried and liquid ketchup against corresponding reference signatures, to determine whether either comparison yields a correlation value that exceeds a threshold.

Although the focus of this disclosure has been on identification of plastics for sorting, there is commonly a pre-sort operation in which a rough review of the waste stream is performed to remove things that clearly aren't candidates for recycling (e.g., bowling balls, chicken bones). Robotic manipulators can be used to remove errant items. The watermark technology detailed herein (e.g., the HyperComb pattern) can play a role at this pre-sort stage, too. For example, a vision system controlling the robot can perform a quick analysis of imagery for presence of the HyperComb pattern. The quick analysis does not yield the confidence of later processing stages (e.g., it may detect the HyperComb pattern with only a 99.9% confidence). But if an item flagged for removal is sensed to likely have such a HyperComb pattern, then a determination that an item should be removed as errant can be over-ruled, and the item can pass with other suitable waste for more accurate identification and sorting.

While the illustrative system uses 8 spectral bands, other systems can use more or less (desirably more). Plastic identification, in particular, is aided by multiple different spectral bands in the infrared (including near-infrared), as it can be difficult to distinguish among different plastic formulations using visible light spectra. (There is a proposal to infuse certain plastics with chemical additives, or taggants, to make them more readily distinguishable using spectral signature methods, although there is some resistance to adding additional chemicals to food packaging.)

An earlier-detailed system employed three stages to progressively extract surfaces and luminance data from raw camera data. It will be recognized that the functions of the three stages are not cleanly divided (e.g., ribboning can be performed as part of stage three, or can be performed by a watermark detector fed with a 2D pane, etc.). Moreover, not all of the processing detailed above in connection with the three stages is necessary, and simpler embodiments can naturally be employed (typically with some slight impairment of the resulting data). And, of course, operations described as an aspect of one stage can instead be implemented as part of another, etc.

It should also be recognized that technologies detailed herein, e.g., involving the HyperComb pattern, and expedients to its detection, find application outside of materials recovery facilities and recycling. Likewise with other aspects of the detailed embodiments.

While reference has been made to binary data, and sheets of 1's and 0's, etc., it should be understood that binary forms of representation are not essential to the present technology. In other implementations different symbol alphabets can be employed, e.g., representing data in a ternary or hex system.

Although applicant is partial to identification of recyclable objects by deterministic methods, probabilistic methods such as neural network or other machine learning-based item recognition can also be important, as referenced above. A challenge, however, is in collecting images suitable to train such systems.

One approach is to arrange a closed-loop transport system, on which multiple exemplars of common recyclable waste items, e.g., Coke soft drink bottles or Dasani water bottles, in various states of crumpledness, are conveyed. A camera system captures images of the bottles on the conveyor. The transport system also includes an agitator at one point (e.g., a chain draped in the path of the belt)—to disrupt the bottles on the conveyor, changing their position for the next time they are imaged by the camera system. The images thereby collected can serve as training images for the neural network, depicting actual exemplars of particular types of bottles found in a representative MRF environment, at a virtually unlimited variety of poses.

In some embodiments the transport loop includes a free fall, where the bottles are dropped a distance of several meters, and imaged just before they reach the end of their fall. Depending on the drop height, each bottle will have reached a particular velocity, such as 3 or 5 meters per second—akin to their velocity on an MRF conveyor belt.

It is useful, when training a neural network, that the training images depict, as faithfully as possible, the items it will later need to recognize. Collecting images of bottles in motion, moving at speeds like those found in an MRF, is advantageous because such images include actual blur artifacts, which are difficult to otherwise accurately simulate. Such an apparatus can run for hours or days, developing a large corpus of training images (for which the subject of the image is known with certainty).

Reference was made to serializing items with identifiers, that are associated with metadata in a data structure. One possible application of such technology is for fast food packaging to be encoded with such serialization codes. An item of packaging is read by a point-of-sale scanner when the item is purchased by a customer, and the customer's ID (e.g., a name or other identifier from a credit card, or other personally identifiable information) is stored in association with that particular item of packaging in the data structure. If the item is later found as roadside trash, its provenance can be determined, and the purchaser may be penalized for littering. A product may be similarly sold in a container meant for re-use (e.g., a drink bottle). If the container is thereafter discovered in a municipal waste stream, a penalty may be assessed. Conversely, if a returnable bottle is properly returned, the serialization code can be read and the last custodian of the bottle is then identified through the data structure. A refund of a deposit or other premium can then be credited to an account of that person.

In some instances a product manufacturer may dump surplus packaging into a municipal waste flow—possibly with an intent to skew MRF statistics to indicate more widespread use of the packaged product than is actually the case. If the packaging is serialized, such data may help reveal the dumping action. For example, if a waste flow is found to have items having each serialization code with in the range {27234, 27235, 27236 . . . 27288} then this suggests a source of packaging other than bona fide user consumption. If a metadata repository for such items is expected to be updated by different vendors of the item—each of which is authenticated, e.g., with a digital signature—then the absence of expected metadata also suggests dumping.

Possibilities abound for the camera system. For example, there are lens constructions with multiple focal lengths; there are 3D printed/etched lenses; there are segments or concentric rings, or combinations. Such approaches can give multiple views in a single image. Different focal length segments can be color- or polarization-filtered to allow polarization or color changes to have differing camera depths of focus and focal lengths.

By including a color camera in the system (perhaps a separate camera to the other STCM cameras, or one of the STCM cameras), a scene a bit ahead of the STCM zone can be viewed, and illumination can be dynamically varied in response. For example, colors of the illumination channels can be chosen based on object colors in the camera field of view (e.g., where red packaging (commonly printed as yellow and magenta) is seen in pixel histograms for image regions, then illumination can be controlled accordingly to increase contrast for watermark recovery.) Still further, lighting may be controlled regionally within the camera system field of view, such that a red item at one side of belt is illuminated differently than a blue item at other side.

Interferometric imaging can also be used. Laser light sources of different colors can be sequentially employed. For example, the laser light can be beam-split, and then routed by mirrors to illuminate the belt from two directions. (Beam expander optics can be used after the mirrors, to flood the viewing area with light.) Alternatively, the light source can be split as above, but only one is expanded to illuminate the viewing area. The reflected source image is mixed with the other split beam (serving as a reference beam) using another beam-splitter, and the resulting pattern is imaged by the camera.

Source polarization can be used, e.g., employing an electro-optical modulator.

Surface microtopological texture on plastics will show up in interferometric image. There is no requirement to convert to a depth image, as the noted oct-axis filter will remove absolute depth, leaving just high-frequency edges (i.e., local changes in depth due to the surface texture watermark).

Although the focus of this disclosure has been on processing raw waste, the detailed principles can be used in connection with processed waste. For example after waste has been shredded the pieces can be examined for Hyper-Comb or other identifying information, and the pieces then sorted and processed accordingly. In some instances the information from such pieces might best be read from the underside of the conveyor, which can be accomplished by cameras that watch a flow of pieces as they are propelled across a gap between two belts, or fall from one belt onto another.

Naturally, the detailed technology can be used in other contexts, such as systems used in homes or business for waste collection, or on trash collection trucks.

In connection with hashing, it will be understood that the hashing function can be the identity function. Particularly when the input data is short, it can be expedient to use the input data itself—rather than substitute a different, potentially-longer, hash identifier.

Figure 17:
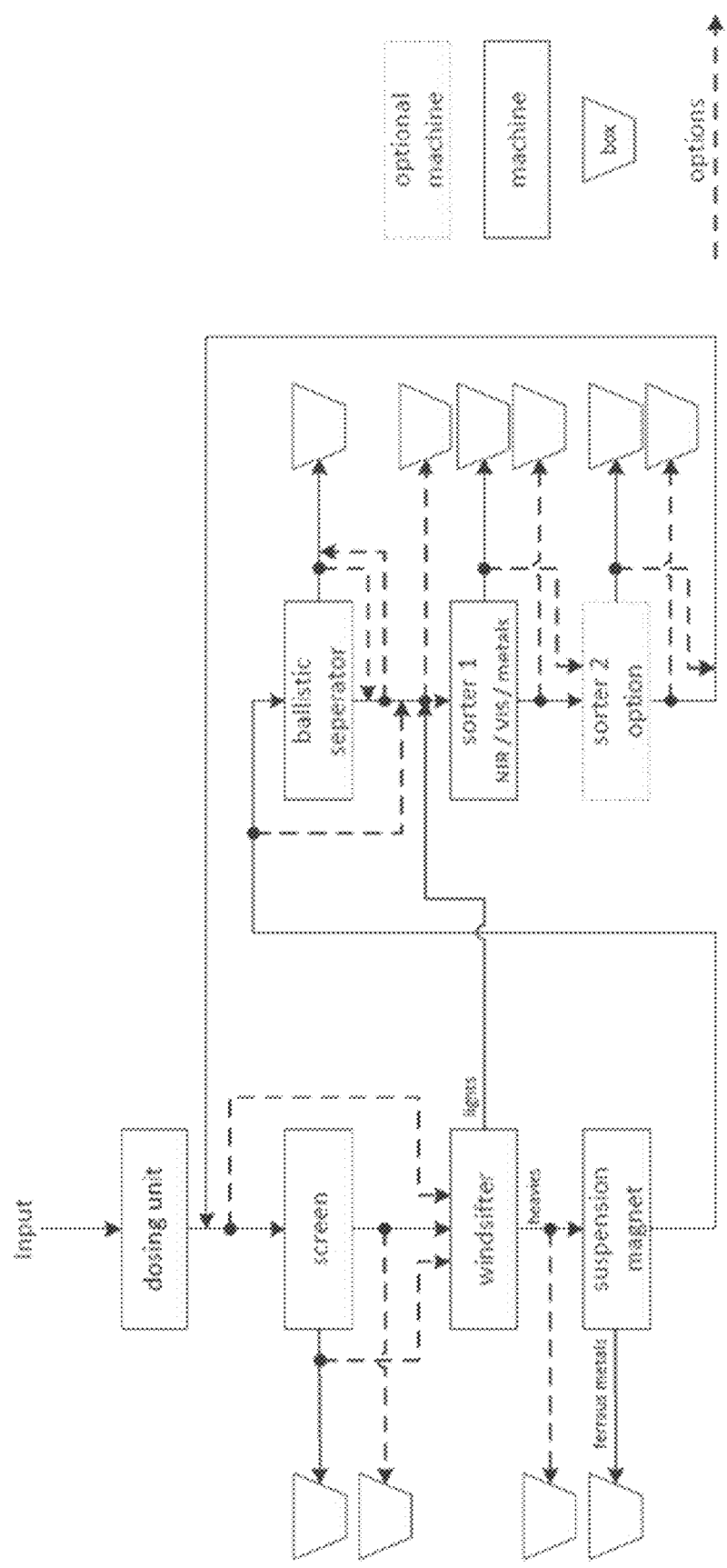
FIG. 17 details aspects of item separation equipment that may be present in an illustrative materials recovery facility.

To provide a broader view of a Materials Recovery Facility, FIG. 17 is a view of the many different stages that may be found in a MRF. (This drawing is from literature published by Nationaal Testcentrum Circulaire Plastics, a non-profit effort financed by the Dutch Government to facilitate and accelerate development of industrial sorting of different plastic streams from municipal waste.)

This disclosure began with identification of applicant's earlier work on which the present technology builds. Primary among these are applications 62/968,106 and PCT/US20/22801. It should be understood that the technology detailed herein can be incorporated into the embodiments described in the those applications. Likewise, features from the those applications can be incorporated into embodiments of the presently-detailed embodiments. The present specification should be read as if these two related applications (and the other cited documents) are literally presented herein.

Regarding diversion and separation of individual items from waste streams into appropriate receptacles, or onto further conveyors, such operations can be performed by known means, such as solenoid-operated plungers, stepper motor-controlled arms, forced air jets, etc. Exemplary separation and sorting mechanisms are known to the artisan, e.g., from patent publications U.S. Pat. Nos. 5,209,355, 5,485, 964, 5,615,778, US20040044436, US20070158245, US20080257793, US20090152173, US20100282646, US20120168354 and US20170225199. These mechanisms are here-referred to as "sorting diverters," or simply "diverters" for short, and their operation is typically controlled in accordance with the type of plastics identified. Other approaches can naturally be used, including vortex ring approaches (both air and water).

It will be understood that the methods and algorithms detailed above can be executed using computer devices employing one or more processors, one or more memories (e.g. RAM), storage (e.g., a disk or flash memory), a user interface (which may include, e.g., a keypad, a TFT LCD or OLED display screen, touch or other gesture sensors, together with software instructions for providing a graphical user interface), interconnections between these elements (e.g., buses), and a wired or wireless interface for communicating with other devices.

The processes and system components detailed in this specification can be implemented as instructions for computing devices, including general purpose processor instructions for a variety of programmable processors, such as microprocessors and systems on a chip (e.g., the Intel Atom and i9 series, the ARM A8 and Cortex series, the Qualcomm Snapdragon, and the nvidia Tegra 4). Implementation can also employ a variety of specialized processors, such as graphics processing units (GPUs, such as are included in the nVidia Tegra series, and the Adreno 530—part of the Qualcomm Snapdragon processor), and digital signal processors (e.g., the Texas Instruments TMS320 and OMAP series devices, and the ultra-low power Qualcomm Hexagon devices, such as the QDSP6V5A), etc. These instructions can be implemented as software, firmware, etc. These instructions can also be implemented in various forms of processor circuitry, including programmable logic devices, field programmable gate arrays (e.g., the Xilinx Virtex series devices), field programmable object arrays, and application specific circuits—including digital, analog and mixed analog/digital circuitry. Execution of the instructions can be distributed among processors and/or made parallel across processors within a device or across a network of devices. Processing of data can also be distributed among different processor and memory devices. Cloud computing resources can be used as well. References to "processors," "modules" or "components" should be understood to refer to functionality, rather than requiring a particular form of implementation.

Implementation can additionally, or alternatively, employ special purpose electronic circuitry that has been custom-designed and manufactured to perform some or all of the component acts, as an application specific integrated circuit (ASIC).

Software instructions for implementing the detailed functionality can be authored by artisans without undue experimentation from the descriptions provided herein, e.g., written in C, C++, Visual Basic, Java, Python, Tcl, Perl, Scheme, Ruby, etc., in conjunction with associated data.

Software and hardware configuration data/instructions are commonly stored as instructions in one or more data structures conveyed by tangible media, such as magnetic or optical discs, memory cards, ROM, etc., which may be accessed across a network. Some embodiments may be implemented as embedded systems—special purpose computer systems in which operating system software and application software are indistinguishable to the user (e.g., as is commonly the case in basic cell phones). The functionality detailed in this specification can be implemented in operating system software, application software and/or as embedded system software.

Different of the functionality can be implemented on different devices. Different tasks can be performed exclusively by one device or another, or execution can be distributed between devices. In like fashion, description of data being stored on a particular device is also exemplary; data can be stored anywhere: local device, remote device, in the cloud, distributed, etc.

Other recycling arrangements are taught in patent documents U.S. Pat. Nos. 4,644,151, 5,965,858, 6,390,368, US20060070928, US20140305851, US20140365381, US20170225199, US20180056336, US20180065155, US20180349864, and US20190030571. Alternate embodiments of the present technology employ features and arrangements from these cited documents.

This specification has discussed various embodiments. It should be understood that the methods, elements and concepts detailed in connection with one embodiment can be combined with the methods, elements and concepts detailed in connection with other embodiments. While some such arrangements have been particularly described, many have not—due to the number of permutations and combinations. Applicant similarly recognizes and intends that the methods, elements and concepts of this specification can be combined, substituted and interchanged—not just among and between themselves, but also with those known from the cited prior art. Moreover, it will be recognized that the detailed technology can be included with other technologies—current and upcoming—to advantageous effect. Implementation of such combinations is straightforward to the artisan from the teachings provided in this disclosure.

While this disclosure has detailed particular ordering of acts and particular combinations of elements, it will be recognized that other contemplated methods may re-order acts (possibly omitting some and adding others), and other contemplated combinations may omit some elements and add others, etc.

Although disclosed as complete systems, sub-combinations of the detailed arrangements are also separately contemplated (e.g., omitting various of the features of a complete system).

While certain aspects of the technology have been described by reference to illustrative methods, it will be recognized that apparatuses configured to perform the acts of such methods are also contemplated as part of applicant's inventive work. Likewise, other aspects have been described by reference to illustrative apparatus, and the methodology performed by such apparatus is likewise within the scope of the present technology. Still further, tangible computer readable media containing instructions for configuring a processor or other programmable system to perform such methods is also expressly contemplated.

To provide a comprehensive disclosure, while complying with the Patent Act's requirement of conciseness, applicant incorporates-by-reference each of the documents referenced herein. (Such materials are incorporated in their entireties, even if cited above in connection with specific of their teachings.) These references disclose technologies and teachings that applicant intends be incorporated into the arrangements detailed herein, and into which the technologies and teachings presently-detailed be incorporated.

In view of the wide variety of embodiments to which the principles and features discussed above can be applied, it should be apparent that the detailed embodiments are illustrative only, and should not be taken as limiting the scope of the invention.

The invention claimed is:

1. A method of processing imagery in an optical sorting system, said method comprising:
   capturing imagery of a waste stream of moving items that includes a first item and a second item, the first item being deformed from its original configuration by crumpling so that captured imagery of the first item depicts a first surface region and a second surface region without depicting an intervening surface region found in an original configuration of the first item;
   processing the captured imagery to identify 10 or more excerpts of image data;
   analyzing said excerpts to identify a first group of excerpts that are phase coherent with each other, said analyzing identifying at least one excerpt that is not phase coherent with said first group of excerpts; and processing image information from said first group of phase coherent excerpts to obtain a first item identifier for the first item, by decoding an encoded indicia formed on said deformed first item.

2. The method of claim 1 in which each excerpt of image data is a ribbon excerpt, with one axis longer than a second, orthogonal axis.

3. The method of claim 1 that further includes separating said first item from said waste stream based on a plastic type, said plastic type being indicated by said decoded first item identifier.

4. The method of claim 1 that further includes checking a watch list based on said decoded first item identifier, determining from said watch list that said first item is of interest to a party, and archiving imagery of said first item from said waste stream for later delivery to said party, wherein said watch list does not indicate that the second item is of interest.

5. The method of claim 1 that further includes consulting a data structure with said decoded first item identifier to identify a further analysis algorithm that should be run on imagery depicting said first item, and running said identified further analysis algorithm, wherein said data structure does not identify that said further analysis algorithm should be run on imagery depicting said second item.

6. The method of claim 5 in which said further analysis algorithm comprises a contamination assessment algorithm.

7. The method of claim 1 that includes decoding the first item identifier using image data depicting part of the first surface region, and also using image data depicting part of the second surface region, wherein due to said crumpling a first surface normal from a centroid of said part of the first surface region diverges from being parallel with a second surface normal from a centroid of said part of the second surface region by more than ten degrees.

8. The method of claim 7 wherein the first surface normal and the second surface normal diverge by more than thirty degrees.

9. The method of claim 1 that includes:

analyzing said excerpts to identify a second group of excerpts that are phase coherent with each other, the first group of excerpts and the second groups of excerpts having no excerpt in common;

estimating first pose information for the first surface region using imagery in the first group of excerpts;

using said first pose information to obtain first estimates of information for decoding of the first item identifier from imagery in the first group of excerpts;

estimating second pose information for the second surface region using imagery in the second group of excerpts;

using said second pose information to obtain second estimates of information for decoding of the first item identifier from imagery in the second group of excerpts; and decoding the first item identifier using the first estimates of information and the second estimates of information.

10. The method of claim 1 that includes identifying plural of said excerpts as depicting the first item rather than the second item, and decoding said first item identifier from the encoded indicia depicted in imagery including said plural excerpts.

11. The method of claim 1 that includes identifying plural of said excerpts as depicting the first item rather than the second item due to statistical consistency of indicia pose data derived from said plural excerpts.

12. The method of claim 1 in which said analyzing includes:

determining a first translational offset of the encoded indicia depicted in a first excerpt;

determining a second translational offset of the encoded indicia depicted in a second excerpt;

determining a third translational offset of the encoded indicia depicted in a third excerpt;

determining that said first, second and third translational offsets are consistent with placements of said first, second and third excerpts in the captured imagery; and concluding, from said determination of consistency, that said first, second and third excerpts are phase coherent.

13. The method of claim 1 in which the first item identifier identifies an object comprised of multiple parts of different plastic compositions, and the method includes diverting the first item for processing with other such items comprised of multiple parts, and away from processing for items of a single plastic composition.

14. The method of claim 6 that includes sorting items in said waste stream, in part, based on various levels of contamination associated therewith, said levels of contamination being estimated by said further analysis algorithm.

15. A system comprising:

a plurality of cameras for capturing imagery of a waste stream of moving items that includes a first item and a second item, the first item being deformed from its original configuration by crumpling so that captured imagery of the first item depicts a first surface region and a second surface region without depicting an intervening surface region found in an original configuration of the first item;

one or more processors; and one or more computer-readable media storing instructions that, when executed by the one or more processors, cause the system to perform operations comprising:

processing the captured imagery to identify 10 or more excerpts of image data;

analyzing said excerpts to identify a first group of excerpts that are phase coherent with each other, said analyzing identifying at least one excerpt that is not phase coherent with said first group of excerpts; and processing image information from said first group of phase coherent excerpts to obtain a first item identifier for the first item, by decoding an encoded indicia formed on said deformed first item.

16. The system of claim 15, wherein each excerpt of image data comprises a ribbon excerpt, with one axis longer than a second, orthogonal axis.

17. The system of claim 15, wherein the operations further comprise separating said first item from said waste stream based on a plastic type, said plastic type being indicated by said decoded first item identifier.

18. The system of claim 15, wherein the operations further comprise:

checking a watch list based on said decoded first item identifier;

determining from said watch list that said first item is of interest to a party; and archiving imagery of said first item from said waste stream for later delivery to said party;

wherein said watch list does not indicate that the second item is of interest.

19. The system of claim 15, wherein the operations further comprise:
consulting a data structure with said decoded first item identifier to identify a further analysis operation that should be run on imagery depicting said first item; and running said identified further analysis operation;
wherein said data structure does not identify that said further analysis operation should be run on imagery depicting said second item.

20. The system of claim 15, wherein said further analysis operation comprises a contamination assessment operation.

21. The system of claim 15, wherein the operations further comprise decoding the first item identifier using image data depicting part of the first surface region, and also using image data depicting part of the second surface region, wherein due to said crumpling a first surface normal from a centroid of said part of the first surface region diverges from being parallel with a second surface normal from a centroid of said part of the second surface region by more than ten degrees.

22. The system of claim 21, wherein the first surface normal and the second surface normal diverge by more than thirty degrees.

23. The system of claim 15, wherein the operations further comprise:
analyzing said excerpts to identify a second group of excerpts that are phase coherent with each other, the first group of excerpts and the second groups of excerpts having no excerpt in common;
estimating first pose information for the first surface region using imagery in the first group of excerpts;
using said first pose information to obtain first estimates of information for decoding of the first item identifier from imagery in the first group of excerpts;
estimating second pose information for the second surface region using imagery in the second group of excerpts;
using said second pose information to obtain second estimates of information for decoding of the first item identifier from imagery in the second group of excerpts; and
decoding the first item identifier using the first estimates of information and the second estimates of information.

24. The system of claim 15, wherein the operations further comprise identifying plural of said excerpts as depicting the first item rather than the second item, and decoding said first item identifier from the encoded indicia depicted in imagery including said plural excerpts.

25. The system of claim 15, wherein the operations further comprise identifying plural of said excerpts as depicting the first item rather than the second item due to statistical consistency of indicia pose data derived from said plural excerpts.

26. The system of claim 15, wherein said analyzing includes:
determining a first translational offset of the encoded indicia depicted in a first excerpt;
determining a second translational offset of the encoded indicia depicted in a second excerpt;
determining a third translational offset of the encoded indicia depicted in a third excerpt;
determining that said first, second and third translational offsets are consistent with placements of said first, second and third excerpts in the captured imagery; and
concluding, from said determination of consistency, that said first, second and third excerpts are phase coherent.

27. The system of claim 15, wherein the first item identifier identifies an object comprised of multiple parts of different plastic compositions, and the operations further comprise diverting the first item for processing with other such items comprised of multiple parts, and away from processing for items of a single plastic composition.

28. The system of claim 20, wherein the operations further comprise controlling sortation of items in said waste stream, in part, based on various levels of contamination associated therewith, said levels of contamination being estimated by said further analysis operation.

* * * * *